US006194487B1

(12) United States Patent
Morimoto et al.

(10) Patent No.: US 6,194,487 B1
(45) Date of Patent: Feb. 27, 2001

(54) METHOD OF MANUFACTURING MODIFIED PARTICLES

(75) Inventors: Kiyofumi Morimoto; Takahiro Horiuchi, both of Yamatokoriyama; Shigeaki Tasaka, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/190,566

(22) Filed: Nov. 12, 1998

(30) Foreign Application Priority Data

| Nov. 14, 1997 | (JP) | 9-313999 |
| Jan. 6, 1998 | (JP) | 10-001102 |
| Feb. 5, 1998 | (JP) | 10-024954 |
| May 26, 1998 | (JP) | 10-144702 |
| Oct. 22, 1998 | (JP) | 10-301404 |

(51) Int. Cl.[7] ................................................ C08K 9/12
(52) U.S. Cl. ..................... 523/205; 523/208; 523/215; 528/59; 528/61; 528/65; 528/248; 528/266; 528/322; 528/370; 528/372; 528/374; 528/381; 528/391
(58) Field of Search ........................... 523/205, 206, 523/207, 208; 528/248, 266, 322, 499, 59, 61, 65, 370, 372, 374, 381, 391

(56) References Cited

U.S. PATENT DOCUMENTS

| 3,256,236 | * | 6/1966 | Herman et al. | 523/205 |
| 5,932,633 | * | 8/1999 | Chen et al. | 523/205 |
| 5,945,467 | * | 8/1999 | Iwata et al. | 523/208 X |
| 6,080,443 | * | 6/2000 | Date et al. | 523/205 X |

FOREIGN PATENT DOCUMENTS

| 0 794 017 A2 | 9/1997 | (EP) . |
| 52-009182 | 1/1977 | (JP) . |
| 62-225926 | 10/1987 | (JP) . |
| 07083820 | 3/1995 | (JP) . |

OTHER PUBLICATIONS

Fine Particle Engineering: Fundamentals and Applications of Distribution, M. Naito, et al., (1994), pp. 123–136.
Particle Engineering Association, Ed. Particle Engineering Manual, Nikkan Kogyo Newspaper Co. Printing, pp. 372–375.
Particle Engineering Associate, Ed. Particle Engineering Manual, Nikkan Kogyo Newspaper Co. Printing, pp. 580–582.

* cited by examiner

*Primary Examiner*—Fred Teskin
(74) *Attorney, Agent, or Firm*—Dike, Bronstein, Roberts & Cushman, LLP; David G. Conlin

(57) ABSTRACT

In the present method of manufacturing modified particles, a saturated vapor of a monomer B is produced in a condensing chamber, and then particles containing a monomer A, which differs from the monomer B and is polymerizable therewith, are introduced, along with an inert gas, into the condensing chamber through a particle intake. Then, a super-saturated vapor of the monomer B is created by reducing pressure using a pressurizing/depressurizing opening, thereby condensing the monomer B on the surface of the particles, and causing a polymerization reaction between the monomer A and the monomer B. With this method, spherical modified particles of uniform diameter, which include a polymer of the monomers A and B, can be obtained in a short time, by means of simple operations.

26 Claims, 5 Drawing Sheets

METHOD OF MANUFACTURING MODIFIED PARTICLES

FIELD OF THE INVENTION

The present invention relates to a method of manufacturing modified particles for modifying particles, for example, the surface of particles, and to a device for manufacturing such modified particles.

BACKGROUND OF THE INVENTION

Recent years have seen implementation of many surface modification methods, in which, in order to modify surface properties of various particles, these particles are treated with a surface-modifying agent to form a film of surface-modifying agent on the surface of the particles; methods, in other words, of manufacturing surface-modified particles by covering the surface of particles with surface-modifying agent. Methods of manufacturing surface-modified particles include the dry process, kneading methods, stirring methods using a medium (methods of performing surface modification in a liquid phase), methods of performing surface modification in a gaseous phase, the spray-dry method, etc.

For example, *Fine Particle Engineering: Fundamentals and Applications of Distribution,* (Japan Particle Industry and Technology Association, Ed., Asakura Shoten Co., Ltd., First Ed., First Printing, Jun. 25, 1994), pp. 123–36, discusses a method of manufacturing covered compound particles using a dry-type grinder (such as a high-speed rotation type impact grinder, grinding mill, ball mill, roll mill, medium stirring type grinder, or jet mill) to bond to the surface of particles in the form of a powder a different substance (surface-modifying agent) in the form of a powder, thereby modifying surface properties of the particles.

However, in the foregoing conventional particle-modifying method, surface modification processing causes the particles to become electrically charged, which makes it difficult to handle the particles thereafter. Moreover, an extremely long time is required for surface modification processing. A further problem is that the operations of surface modification processing are complicated, and require an expensive device. In addition, the foregoing particle modification method was unable to obtain spherical modified particles of uniform diameter which contain a polymer or are covered with a polymer film.

Another method similar to the foregoing method of manufacturing surface-modified particles is one in which the surface of particles is covered by condensing a vapor thereon, thus increasing the size of the particles. Methods of this type include, for example, a method of collecting dust particles using the dust collecting device disclosed in Japanese Unexamined Patent Publication No. 52-9182/1977 (Tokukaisho 52-9182), and the particle measurement method disclosed in Japanese Unexamined Patent Publication No. 62-225926/1987 (Tokukaisho 62-225926). A similar method is also disclosed in Japanese Unexamined Patent Publication No. 7-83820/1995 (Tokukaihei 7-83820). With each of the foregoing methods, spherical shape-modified particles of substantially uniform size can be obtained.

Further, since the chief object of the methods disclosed in each of the foregoing publications is simply to increase the particle diameter, substances such as water and alcohol, which are liquid at room temperature, are used as the vapor.

Further, EP 0 794 017 A2 discloses a method of forming a film of surface-modifying agent on the surface of particles by exposing them to a super-saturated atmosphere of the surface-modifying agent for modifying surface properties of the particles, causing the surface-modifying agent to condense on the surface of the particles.

However, the surface-modifying agent is vaporized in each of the foregoing methods; none of them gives any particular thought to forming on the surface of the particles a surface-modifying agent which is solid at room temperature and atmospheric pressure. This leads to the problem of limitation of the materials which can be used, because materials which do not vaporize, such as resins (polymers), cannot be used.

In this way, the foregoing conventional methods are unable to perform surface treating of particles using a surface-modifying agent which is solid at room temperature and atmospheric pressure, without electrically charging the particles, using a simple device and operations, and in a short time. For this reason, a method of manufacturing modified particles which is capable of performing surface modification of particles with a surface-modifying agent which is solid at room temperature and atmospheric pressure is called for, as is a manufacturing device for use therein.

SUMMARY OF THE INVENTION

The present invention was created in light of the foregoing problems with the conventional methods, and it is an object hereof is to provide a method of manufacturing modified particles which is capable of forming a film of surface-modifying agent made of polymer on the surface of particles, without electrically charging the particles, using a simple device and operations, and in a short time.

Further, another object of the present invention is to provide a method of manufacturing modified particles which is capable of obtaining, with simple operations and in a short time, spherical modified particles of uniform diameter, covered with a film made of a polymer of a monomer A and a monomer B.

A further object of the present invention is to provide a method of manufacturing modified particles which is capable of forming a thick polymer film on the surface of particles, and of forming a plurality of polymer films having different functions on the surface of particles.

With the foregoing conventional particle modification methods, byproducts, etc. produced in the polymerization reaction during surface modification processing, such as inorganic salts like sodium chloride and active gases like hydrochloric acid gas, and unreacted substances (substances which did not undergo a polymerization reaction) are mixed into or attached to the surface of the modified particles as impurities. Admixture or attachment of such impurities gives rise to problems such as, when the impurities are, for example, inorganic salts, difficulty in electrically charging the modified particles, deterioration of the modified particles, etc. in subsequent handling. In other words, admixture or attachment of impurities has adverse effects on the modified particles.

Accordingly, a further object of the present invention is to provide a method of manufacturing modified particles which is capable of resolving the foregoing problems by eliminating impurities, and a manufacturing device suited to manufacturing such modified particles.

In order to attain the foregoing objects, a method of manufacturing modified particles according to the present invention includes the steps of: exposing particles containing a monomer A to a super-saturated vapor of a monomer B, which differs from the monomer A and is polymerizable therewith; and condensing the monomer B on the surface of the particles, and causing a polymerization reaction between the monomers A and B on the surface of the particles.

With the foregoing method, since a film of the polymer made of the monomers A and B on the surface of the particles can be formed in a gaseous phase, surface modification of the particles can be performed using simpler operations and in a shorter time than with conventional methods. Consequently, the operations of the foregoing method are simple, and it can be implemented using a simple and inexpensive device.

Moreover, with the foregoing method, since surface tension acts on the film of the monomer B condensed on the surface of the particles, spherical modified particles of uniform diameter can be obtained. In addition, with the foregoing method, since the particles are not stirred, the modified particles are not electrically charged, and it is easier to handle the modified particles obtained.

Accordingly, with the foregoing method, spherical modified particles of uniform diameter, which contain a polymer of the monomers A and B, can be obtained with simple operations and in a short time.

Another method of manufacturing modified particles according to the present invention includes the steps of: exposing core particles to a super-saturated atmosphere of a monomer A, thus causing the monomer A to condense on the surface of the core particles; exposing the core particles with the monomer A condensed on the surface thereof to a super-saturated atmosphere of a monomer B, which differs from the monomer A and is polymerizable therewith; and condensing the monomer B on the surface of the core particles, and causing a polymerization reaction between the monomers A and B on the surface of the core particles.

With the foregoing method, since the particles are not stirred, the modified particles are not electrically charged, and it is easier to handle them. In addition, with the foregoing method, modified particles can be manufactured in a shorter time than with methods of manufacturing modified particles which use stirring, etc. of particles.

Further, with the foregoing method, vapors of the monomer A and of the monomer B are condensed on the surface of the core particles, and thus the liquid monomers A and B can be distributed more uniformly thereon. Further, with the foregoing method, since surface tension acts on the films of the monomers A and B condensed on the surface of the core particles, a polymer film of uniform thickness, made of a polymer of the monomers A and B, can be formed on the surface of the core particles, thus covering the core particles with the polymer film.

Accordingly, with the foregoing method, spherical modified particles of more uniform diameter, covered with a film made of a polymer of the monomers A and B, can be obtained with simple operations and in a short time.

A further method of manufacturing modified particles according to the present invention may include, after the polymerization step, the additional step of: eliminating impurities contained in the particles obtained in the polymerization step.

The foregoing method can eliminate impurities, including byproducts, etc. produced in the polymerization reaction during surface modification processing, such as inorganic salts and active gases, and unreacted substances (substances which did not undergo a polymerization reaction), i.e., impurities mixed into or attached to the modified particles. In other words, the foregoing method is capable of manufacturing modified particles from which impurities have been eliminated. Accordingly, since the adverse effects of impurities on the properties of the modified particles can be eliminated, in subsequent handling of the modified particles, for example, electrical charging is made easier, and deterioration of the properties of the modified particles can be minimized.

A further method of manufacturing modified particles according to the present invention preferably uses for the monomer A or the monomer B a compound having two or more sulfonyl halide groups.

With the foregoing method, by using for at least one of the monomers A and B a monomer which has two or more sulfonyl halide groups, the polymerization reaction can be performed faster than when using other combinations of monomers, and a polymer film can be formed more easily on the surface of the particles.

In order to attain the foregoing objects, a device for manufacturing modified particles according to the present invention includes: a particle introducing section, which introduces particles containing a monomer A; a condensing section, in which is formed a super-saturated vapor of a monomer B differing from the monomer A and polymerizable therewith; and a mixing section, which exposes the particles introduced by the particle introducing section to the super-saturated vapor of the monomer B formed in the condensing section, thus causing the monomer B to condense on the surface of the particles, and causing a polymerization reaction between the monomers A and B on the surface of the particles.

With the foregoing structure, the mixing section produces the modified particles by causing a polymerization reaction between the monomers A and B on the surface of the particles. In short, since the particles are not stirred in the mixing section, the modified particles obtained are not electrically charged, and thus are easily handled. In addition, with the foregoing structure, modified particles can be manufactured in a shorter time than with manufacturing methods which perform stirring, etc. of the particles. Consequently, a manufacturing device with the foregoing structure is simple and inexpensive, and its operations are also simple.

Moreover, with the foregoing structure, since surface tension acts on the film of the monomer B condensed on the surface of the particles, spherical modified particles of uniform diameter can be obtained. Accordingly, with the foregoing structure, a manufacturing device can be provided which is capable of obtaining, with simple operations and in a short time, spherical modified particles of uniform diameter, which contain a polymer of the monomers A and B.

Additional objects, features, and strengths of the present invention will be made clear by the description below. Further, the advantages of the present invention will be evident from the following explanation in reference to the drawings.

DESCRIPTION OF THE EMBODIMENTS

[First Embodiment]

Figure 1:
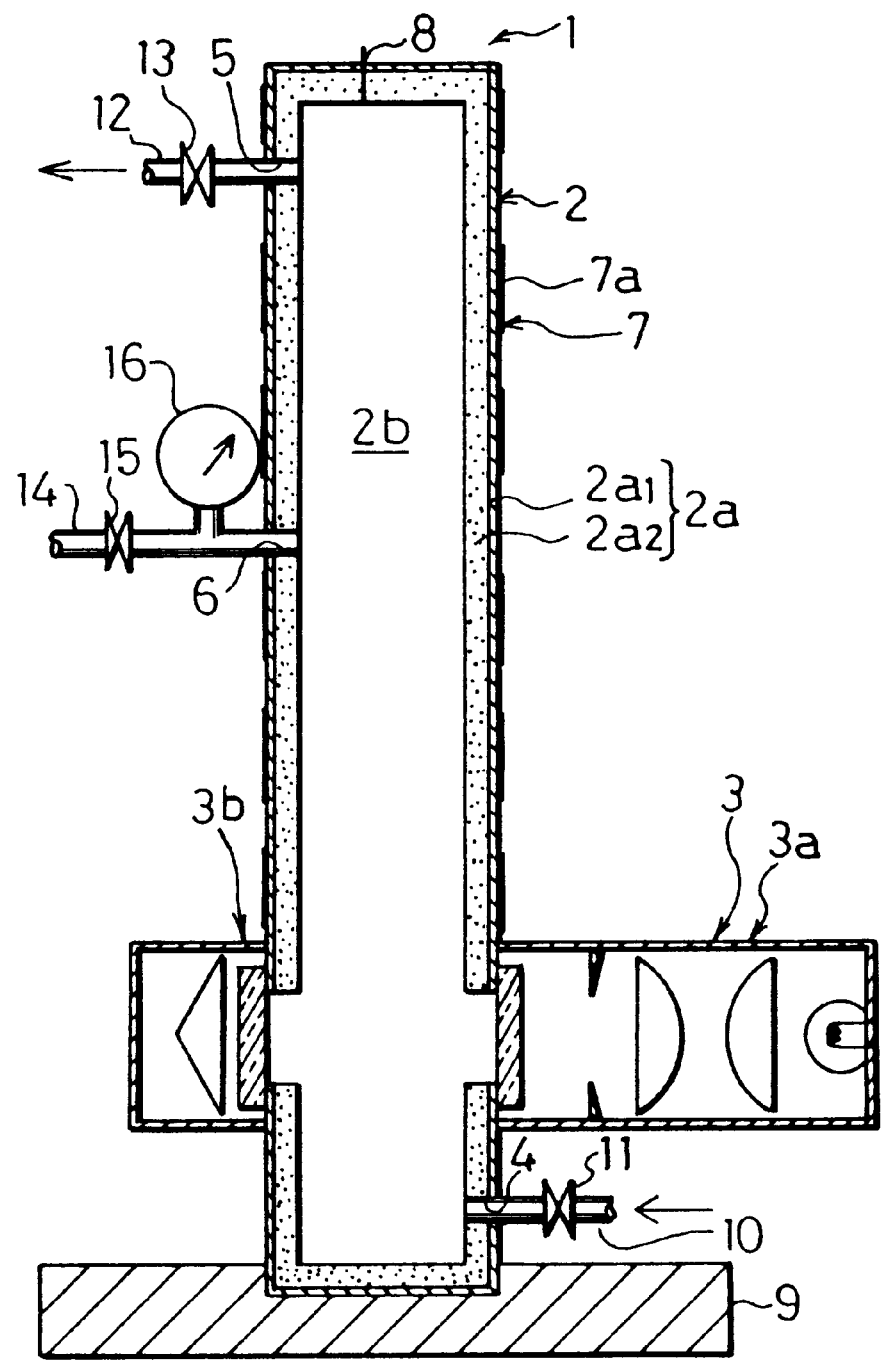
FIG. 1 is a cross-sectional drawing showing a particle modifying device according to an embodiment of the method of manufacturing modified particles according to the present invention.
Figure 2:
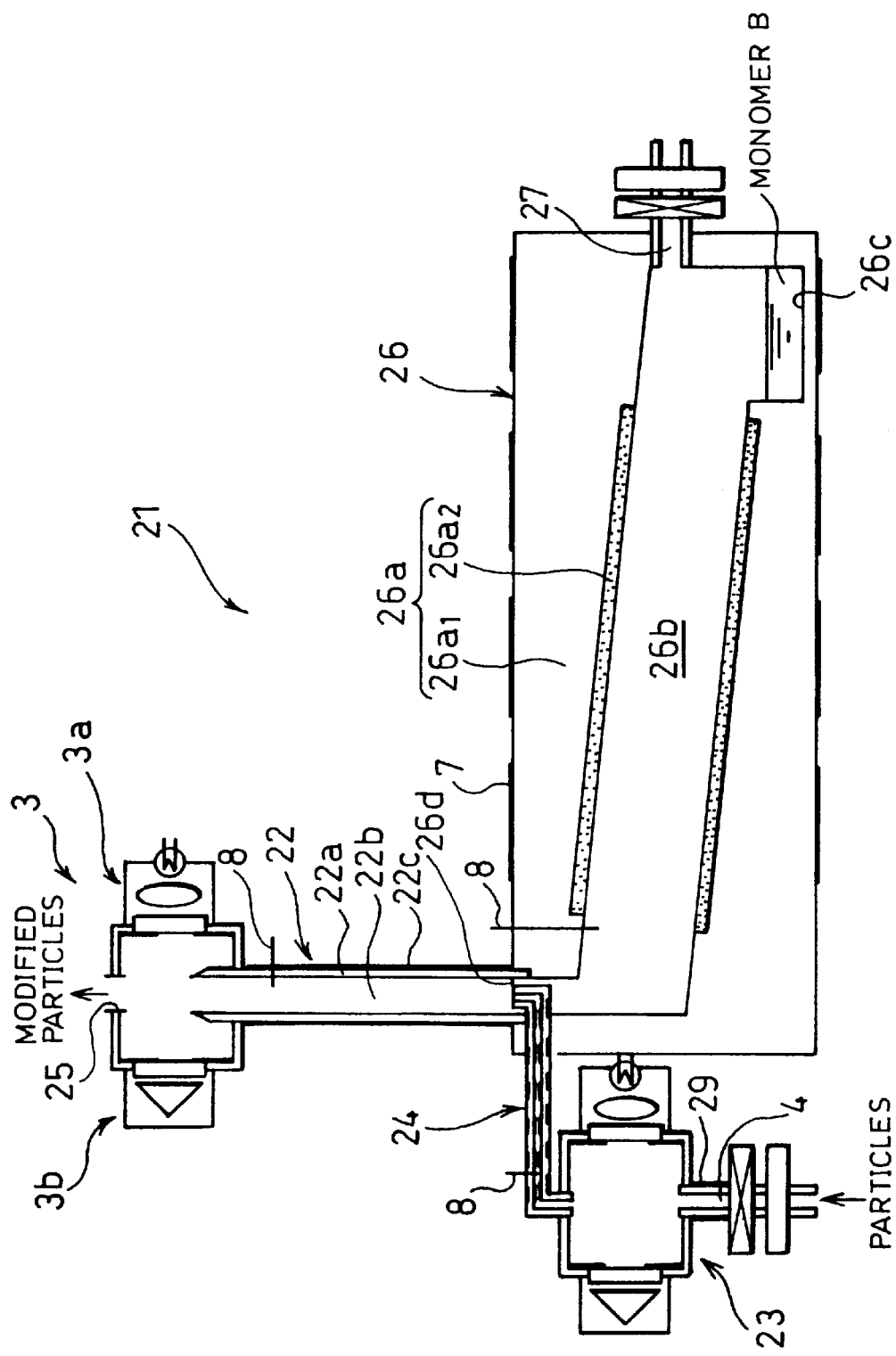
FIG. 2 is a cross-sectional drawing showing another particle modifying device according to an embodiment of the method of manufacturing modified particles according to the present invention.
Figure 3:
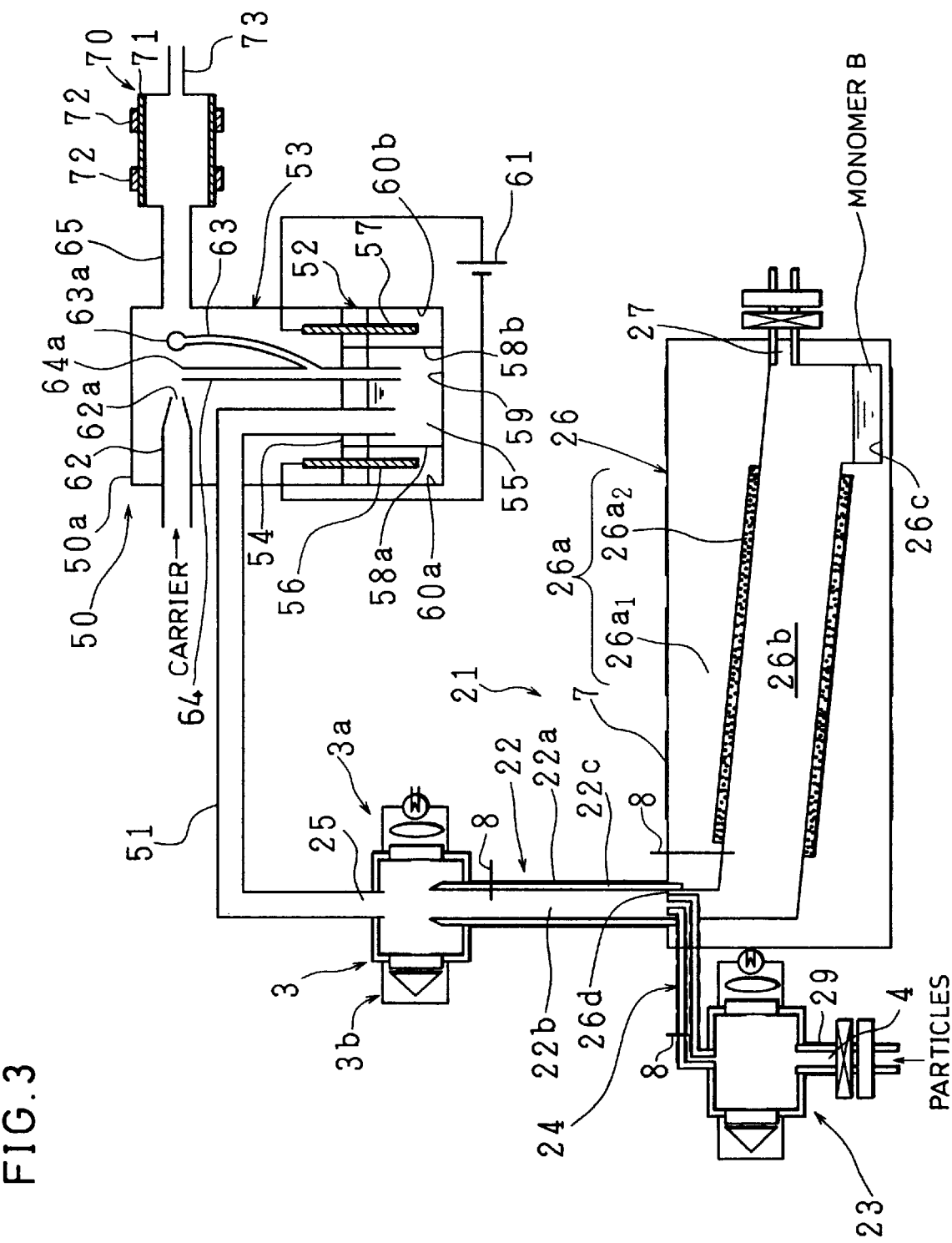
FIG. 3 is a cross-sectional drawing showing a further particle modifying device according to an embodiment of the method of manufacturing modified particles according to the present invention.

The following will explain one embodiment of the present invention with reference to FIGS. 1 through 3.

The method of manufacturing modified particles according to the present embodiment is a method of exposing particles containing a monomer A to a super-saturated vapor of a monomer B, which has a higher boiling point than the monomer A and is polymerizable therewith, thus causing the monomer B to condense on the surface of the particles, and causing a polymerization reaction between the monomers A and B on the surface of the particles.

Particles which may be used in the present embodiment include, for example, aerosol particles, mist particles, and fume. The primary particle diameter of these particles is preferably from several nm to several $\mu$m. Further, the particles in the present embodiment may be liquid particles, or they may be solid particles.

The particles in the present embodiment may be made of the monomer A alone, or they may be mixed particles obtained by mixing the monomer A with a base material. When particles made of the monomer A alone are used for the particles, spherical polymer particles of uniform diameter can be easily obtained. When mixed particles of the monomer A and a base material are used for the particles, the particles themselves can be given a plurality of functions.

For the base material in the foregoing mixed particles, inorganic particles, organic particles, etc. may be used. Examples of inorganic particles which may be used include particles made of water (water droplets); particles made of metals or metal compounds, such as titanium oxide, iron oxide, magnesium oxide, kaolinite, ocher, chrome yellow, Prussian blue, zinc sulfide, barium sulfate, aluminum hydroxide, ultramarine, calcium carbonate, silica, alumina, gold, silver, bronze, aluminum, alloys such as stainless steel, and magnetite black; and particles made of inorganic compounds, such as carbon black, glass beads, and ceramics. For carbon black, any type of carbon black manufactured by known methods such as the contact method, furnace method, thermal method, etc. may be used.

Examples of organic particles which may be used include particles made of saturated or unsaturated aliphatic hydrocarbon compounds (which may include a functional group), alicyclic hydrocarbon compounds (which may include a functional group), aromatic hydrocarbon compounds (which may include a functional group), and heterocyclic compounds (which may include a functional group). The functional group which the compound making up the organic particles may include is not limited to any group in particular, but may be, for example, a monatomic group such as an amino group (—$NH_2$), a hydroxyl group, an aldehyde group (—CHO), a halogeno group, a carboxyl group, a carbamoyl group, a haloformyl group (—CO—X, where X is a halogen), an isocyanate group, a nitro group, a sulfonyl group, an alkoxyl group, or a nitrile group; a diatomic group such as an imino group (—NH—), a keto group, a group which forms an ester bond shown by "—CO—O—" (hereinafter referred to as an "ester bond group"), a group which forms an amide bond shown by "—CONH—" or "—CO—NR'—" (where R' is a hydrocarbon group which may include a functional group) (hereinafter referred to as an "amide bond group"), a carboxylic anhydride group (—CO—O—CO—), or a sulfuryl group; or a triatomic group such as a nitrilo group.

Further, pigments and dyes, synthetic resin particles, latex particles, pharmaceuticals, etc. may be used for the organic particles. Examples of pigments which may be used include azo pigments such as azo lake pigments, insoluble azo pigments, condensed azo pigments, and chelated azo pigments; polycyclic pigments such as phthalocyanine pigments, perylene pigments, perynone pigments, anthraquinone pigments, quinacridone pigments, dioxazine pigments, thio-indigo pigments, isoindolinone pigments, and quinophthalone pigments; nitro pigments, nitroso pigments, and aniline black. Examples of dyes which may be used include acidic dyes (such as dye lakes like basic-dye-type lake and acidic-dye-type lake), basic dyes, direct dyes, reactive dyes, disperse dyes, oil-based dyes, food colorings, and fluorescent brightening agents. Examples of synthetic resin particles which may be used include polyester resin particles, polyamide resin particles, polyvinyl chloride resin particles, polyurethane resin particles, urea resin particles, polystyrene resin particles, particles of styrene-acrylic copolymers (copolymers of styrene and derivatives of (meth)acrylic acid), polymethyl methacrylate particles, melamine resin particles, epoxy resin particles, and silicone resin particles. With regard to pharmaceuticals, particles of aspirin, indomethacin, isoproterenol, etc. may be used.

In the present embodiment, the base material may also be particles (core particles) which are mixed solid particles obtained by mixing two or more solid substances; a solution of particles obtained by dissolving a solid substance such as a dye or a pigment in a solvent; particles dispersed in a liquid, obtained by dispersing a solid substance in a solvent; or mixed liquid particles, obtained by mixing two or more liquid substances. Examples of such solvents are water; alcohols such as ethanol, propanol, and butanol; polyhydric alcohols such as ethylene glycol and triethylene glycol; ketones such as methylethyl ketone and methylisobutyl ketone; nitrogen-containing heterocyclic compounds such as N-methyl-2-pyrrolidone and $\epsilon$-caprolactam; aliphatic hydrocarbons such as hexane; alicyclic hydrocarbons such as cyclohexane; amides such as N-methylform amide and N,N-dimethylform amide; ethers such as diethyl ether; amines such as diethylamine and triethylamine; sulfur-containing compounds such as dimethyl sulfoxide; and aromatic hydrocarbons such as toluene and xylene. The solvent used may be one of the foregoing alone, or two or more of the foregoing mixed together as needed.

The method of obtaining mixed particles of the monomer A and the base material is not limited to any method in particular. For example, a liquid monomer A and solid particles may be stirred together, thus attaching the monomer A to the surface of the solid particles.

In the present embodiment, it is sufficient if the monomers A and B are compounds capable of undergoing with each other a polymerization reaction such as polycondensation, but it is preferable if they are compounds capable of undergoing a polycondensation reaction together. It is even more preferable if one of the monomers is a compound having at least two electron-donating groups, and the other monomer is a compound having at least two electron-withdrawing functional groups capable of a condensation reaction with the electron-donating functional groups of the first monomer.

Specific examples of combinations of monomers A and B able to undergo a polycondensation reaction together include combinations such as (1) a combination of a compound having at least two amino or imino groups and a compound having at least two haloformyl groups, capable of producing a polyamide resin in a polycondensation reaction; (2) a combination of a compound having at least two amino or imino groups and a compound having at least two carboxylic anhydride groups, capable of producing a polyamic acid resin in a polycondensation reaction; (3) a combination of a compound having at least two amino or imino groups and a compound having at least two aldehyde groups, capable of producing a polyazomethine resin in a polycondensation reaction; and (4) a combination of a compound having at least two amino or imino groups (such as diamine) and a compound having at least two carboxyl groups (such as dicarboxylic acid), capable of producing a polyamide resin in a polycondensation reaction.

The foregoing combinations (1) through (4) are preferable because each has high reactivity, and the respective resins obtained by the reaction can be formed in a short time. Further, of the foregoing combinations, combinations (1) through (3) are even more preferable, because reactivity between the monomers A and B is especially high. Each of the monomers A and B may be a single monomer, or may be two or more monomers mixed together as needed.

Incidentally, polyamic acid resin is a resin capable of producing polyimide resin through a dehydration reaction (imidization) resulting from heating. Further, polyazomethine resin is a resin produced by the dehydration polycondensation reaction shown by the following reaction formula:

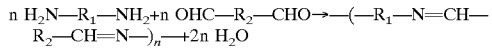

(Here, $R_1$ and $R_2$ are hydrocarbon groups, each of which may include a functional group.)

In the present invention, the compound having at least two amino or imino groups (hereinafter referred to as "polyamine") has a structure equivalent to a compound having two or more hydrogen atoms bonded to carbon atoms (hereinafter referred to as "compound (I)"), except that amino and/or imino groups are substituted for two or more (or, when compound (I) has an amino group or an imino group, one or more) of the hydrogen atoms of compound (I).

In the present invention, the compound having at least two haloformyl groups (hereinafter referred to as "polyacyl halide") has a structure equivalent to compound (I), except that haloformyl groups are substituted for two or more (or, when compound (I) has a haloformyl group, one or more) of the hydrogen atoms of compound (I).

In the present invention, the compound having at least two aldehyde groups (hereinafter referred to simply as "polyaldehyde") has a structure equivalent to compound (I), except that aldehyde groups are substituted for two or more (or, when compound (I) has an aldehyde group, one or more) of the hydrogen atoms of compound (I).

In the present invention, the compound having at least two carboxylic anhydride groups (hereinafter referred to as "polycarboxylic anhydride") has a structure equivalent to a compound having four or more hydrogen atoms bonded to carbon atoms (hereinafter referred to as "compound (II)"), except that carboxylic anhydride groups are substituted for four or more (or, when compound (II) has a carboxylic anhydride group, two or more) of the hydrogen atoms of compound (II).

Examples of compounds (I) and (II) include saturated or unsaturated aliphatic hydrocarbon compounds (which may include a functional group), alicyclic hydrocarbon compounds (which may include a functional group), aromatic hydrocarbon compounds (which may include a functional group), and heterocyclic compounds (which may include a functional group). Examples of the functional group which compounds (I) and (II) may include are, for example, a monatomic group such as an amino group, a hydroxyl group, an aldehyde group, a halogeno group, a carboxyl group, a carbamoyl group, a haloformyl group, an isocyanate group, a nitro group, a sulfonyl group, an alkoxyl group, or a nitrile group; a diatomic group such as an imino group, a keto group, an ester bond group, an amide bond group, a carboxylic anhydride group, or a sulfuryl group; or a triatomic group such as a nitrilo group.

Specific examples of compound (I) include methane, ethane, propane, butane, hexane, heptane, octane, nonane, decane, dodecane, 1-heptene, 2-propanol, 2-butanone, 2-hexanone, butanoic acid, pentanoic acid, dipropylamine, maleonitrile, cyclohexane, cyclohexene, methylcyclohexane, 1,3-cyclopentadiene, cyclopentanol, benzene, toluene, xylene, durene, ethylbenzene, cumene, fluorene, naphthalene, phenanthrene, 6-phenylphenanthrene, diphenylmethane, triphenylmethane, 3,3'-dimethylbiphenyl, stilbene, 1,4-benzoquinone, anthraquinone, anisole, chlorobenzene, bromobenzene, nitrobenzene, nitrotoluene, benzenesulfonic acid, benzoic acid, acetophenone, benzophenone, diphenylamine sulfate, diphenylsulfone, octafluorobiphenyl, phenol, benzoic ethyl, benzamide, thiobenzamide, benzoylene urea, pyridine, 1,2,4-triazole, acridine, purine, piperazine, thiophene, thiouracyl, furan, benzothiazole, benzotriazole, 2,4-dihydroxypyrimidine sulfate, 6,7-diisopropylpteridine phosphate, 2,6-dimercaptopyrimidine, 1,3-dimethyluracyl hydrate, 6-hydroxine-2-mercaptopyrimidine, and 5-hydroxypirazole.

Specific examples of compound (II) include, among the foregoing examples of compound (I), those compounds which include four or more hydrogen atoms bonded to carbon atoms.

Specific examples of polyamine include 1,3-diaminopropane, 1,6-hexanediamine, 1,10-diaminodecane, 1,4-diaminocyclohexane, 1,5-diaminonaphthalene, piperazine, and 4,4'-diaminostilbene. It is preferable if the polyamine is liquid at room temperature.

Specific examples of polyacyl halide include adipoyl chloride, terephthaloyl chloride, and sebacoyl chloride. Specific examples of polyaldehyde include terephthalaldehyde and isophthalaldehyde. Specific examples of polycarboxylic anhydride include 1,2,4,5-benzentetracarboxylic dianhydride, 3,3',4,4'-benzophenontetracarboxylic dianhydride, and 1,4,5,8-naphthalentetracarboxylic dianhydride. It is preferable if the polyacyl halide is liquid at room temperature.

In the present embodiment, the method of manufacturing modified particles should preferably be a method in which, after introducing particles containing the monomer A into a saturated vapor of the monomer B, adiabatic expansion of the monomer B is used to form a super-saturated vapor atmosphere thereof and condense the monomer B on the surface of the particles (hereinafter referred to as the "adiabatic expansion method"), or a method in which the foregoing particles are cooled and then introduced into a saturated vapor of the monomer B, and the vapor of the monomer B is condensed on the surface of the particles due to mixing under a temperature difference (hereinafter referred to as the "temperature difference mixing method").

In the adiabatic expansion method, it is preferable to introduce the particles along with an inert gas into the saturated vapor of the monomer B. Again, in the temperature difference mixing method, it is preferable to cool the particles along with an inert gas and then introduce the particles and the inert gas into the saturated vapor of the monomer B. Using an inert gas in this way to introduce the particles into the saturated vapor of the monomer B prevents effects inappropriate in a carrier gas for introducing the particles into the saturated vapor of the monomer B, such as reaction between the carrier gas and the monomer B or the particles. For the inert gas, nitrogen gas, helium gas, argon gas, etc. may be used.

Further, in each of the foregoing methods, the method of obtaining the saturated vapor of the monomer B may be by heating the monomer B, or by pressurizing the monomer B. Heating the monomer B is preferable, because it is then easy to cool the saturated vapor of the monomer B to obtain a super-saturated vapor thereof.

Next, the method of manufacturing modified particles according to the present embodiment will be explained specifically, discussing an example of implementation of the adiabatic expansion method using the particle modifying device 1 (manufacturing device) shown in FIG. 1.

As shown in FIG. 1, the particle modifying device 1 is chiefly made up of a condensing chamber 2 (condensing section, mixing section) and an optical detecting device 3, and the condensing chamber 2 includes a particle intake 4, a particle outlet 5, and a pressurizing/depressurizing opening 6. Further, the condensing chamber 2 is also provided with a heating device 7, which includes a heater 7a provided on an outer wall of the condensing chamber 2, and a thermometer 8.

The condensing chamber 2 is shaped as a long, narrow cylinder extending vertically, and stands on a base 9. The shape of the condensing chamber 2 is not limited to the foregoing shape, but, in view of suitability for particle modification processing, a vertically long shape like the foregoing is preferable to a horizontally long shape. The condensing chamber 2 includes a wall section 2a made up of an outer wall section $2a_1$ and an inner wall section $2a_2$, and a sealable processing space 2b formed within the wall section 2a. The inner wall section $2a_2$ is provided of a porous material made of ceramic, felt, etc. in order to allow impregnation of inner wall section $2a_2$ by condensate of the monomer B. When the inner wall section $2a_2$ made of a porous material forms the entire inner surface of the wall section 2a, as in FIG. 1, evaporation of condensate of the monomer B can be performed effectively. However, there is no limitation to this structure, and the inner wall section $2a_2$ may be partially provided as needed.

To the particle intake 4 is connected a particle introducing pipe 10 (particle introducing section) for introducing the particles into the processing space 2b. To the particle outlet 5, on the other hand, is connected a discharge pipe 12 for discharging the particles from the processing space 2b. To the pressurizing/depressurizing opening 6 is connected a pressurizing/depressurizing pipe 14 for increasing or reducing the pressure in the processing space 2b. The foregoing pipes 10, 12, and 14 are provided with valves 11, 13, and 15, respectively, for opening and closing flow through the respective pipes. Further, between the valve 15 and the pressurizing/depressurizing opening 6 is provided a pressure gauge 16 for measuring the pressure in the processing space 2b.

The optical detecting device 3 is for optically detecting diameter of particles and number concentration of particles within the condensing chamber, and includes a light projecting section 3a and a light receiving section 3b. The light projecting section 3a and light receiving section 3b are provided on the outer surface of the wall section 2a of the condensing chamber 2, facing each other on opposite sides of the condensing chamber 2.

In the optical detecting device, light projected by the light projecting section 3a travels through the processing space 2b to the light receiving section 3b. The light projected into the processing space 2b is scattered and weakened in accordance with the particle diameter and number concentration of particles in the processing space 2b, and the light projected into the light receiving section 3b is changed by this scattering and weakening. Accordingly, the particle diameter and number concentration of particles within the processing space 2b can be detected on the basis of an output from the light receiving section 3b.

Incidentally, in detecting particle diameter and number concentration of the particles, instead of the foregoing method using an optical detecting device, an image processing analysis method using an optical microscope or electron microscope, or another detecting method, may be used.

It is preferable to provide the particle modifying device 1 with the optical detecting device 3 because (1) diameter of the modified particles can be controlled; (2) efficiency of production of the modified particles can be adjusted; and (3) repeatability of particle diameter and number concentration of the modified particles can be improved.

The heating device 7 heats the inner wall section $2a_2$ and the processing space 2b of the condensing chamber 2. The thermometer 8 is provided in the wall section 2a of the condensing chamber 2, and measures the temperature of the inner wall section $2a_2$.

Next, the method of manufacturing modified particles using the particle modifying device 1 will be explained.

First, the inner wall section $2a_2$ of the condensing chamber 2 is impregnated with a predetermined quantity of the monomer B. Here, the monomer B used may be a compound which is liquid at room temperature, or a compound which is solid at room temperature but becomes a liquid or vapor (gas) upon heating, but it is preferable to use a compound which is liquid at room temperature, since it can be easily impregnated into a porous material. In addition, to rid the interior of the condensing chamber 2 of impurities which may form nuclei for condensation of the monomer B, the air in the processing space 2b is displaced by purified air. Then the valves 11 and 13 are closed, sealing the condensing chamber 2.

Next, in order to obtain a saturated vapor of the monomer B in the processing space 2b, the interior of the condensing chamber 2 is pressurized and heated. Pressurization is performed by opening the valve 15 and sending purified air into the processing space 2b through the pressurizing/depressurizing tube 14. By means of this pressurization, the pressure in the processing space 2b is raised to a predetermined pressure above atmospheric pressure. The pressure in the processing space 2b is measured by the pressure gauge 16. Heating of the processing space 2b is performed by the heating device 7, and the temperature within the condensing chamber 2 is measured by the thermometer 8.

Then the condensing chamber 2 is allowed to stand a suitable length of time, until a saturated vapor of the monomer B is obtained. In other words, the condensing chamber 2 is maintained in the foregoing heated and pressurized state. Incidentally, in order to obtain the saturated vapor of the monomer B, it is sufficient to perform the foregoing heating, and to perform the foregoing pressurization supplementarily as needed. Accordingly, the foregoing heating may be performed at atmospheric pressure or at a lower pressure. This also applies to the other examples to be discussed later.

By means of the foregoing steps, a saturated vapor of the monomer B, which will later surround the particles, is formed in the processing space 2b of the condensing chamber 2.

Next, the particles to be modified are introduced, along with an inert gas, from the particle introducing pipe 10, through the particle intake 4, and into the processing space 2b, after which the condensing chamber 2 is sealed. In this case, the particles are introduced as, for example, aerosol particles. Accordingly, the valves 11 and 13 of the particle introducing pipe 10 and the discharge pipe 12, respectively, are opened at the time of introduction of the aerosol particles, and when the inert gas and the aerosol particles have been introduced into the processing space 2b, the valves 11 and 13 are closed, putting the condensing chamber 2 in a sealed state.

Next, by opening the valve 15 of the pressurizing/depressurizing pipe 14, thus opening the processing space 2b to the atmosphere, the pressure in the processing space 2b is reduced to atmospheric pressure. By this means, the saturated vapor of the monomer B is adiabatically expanded. This puts the saturated vapor of the monomer B in the processing space 2b in a super-saturated state, and a quantity of the monomer B corresponding to the amount of change in vapor pressure (the difference between the respective vapor pressures in the saturated and super-saturated states) condenses on the surface of the particles. Then, a polymerization reaction takes place on the surface of the particles between the monomer B condensed thereon and the monomer A contained in the particles, thus producing modified particles partially or entirely made of a polymer of the monomers A and B. After the foregoing adiabatic expansion, the valve 15 is closed.

Thereafter, the modification-processed particles in the processing space 2b are discharged to the exterior of the condensing chamber 2, and processing is ended. At this time, the valves 11 and 13 of the particle introducing pipe 10 and the discharge pipe 12 are opened, and discharge is performed by, for example, introducing purified air through the particle introducing pipe 10, thus displacing the aerosol particles including the modified particles in the processing space 2b.

Next, the method of manufacturing modified particles according to the present embodiment will be explained specifically, discussing an example of implementation of the temperature difference mixing method using the particle modifying device 21 (manufacturing device) shown in FIG. 2. Here, for ease of explanation, members having functions equivalent to those of members shown in FIG. 1 will be given the same reference symbols, and explanation thereof will be omitted here.

The particle modifying device 21 includes a mixing section 22, a particle introducing pipe 24 (particle introducing section), a condensing chamber 26 (condensing section), etc. The condensing chamber 26 is shaped as a long, narrow cylinder or rectangular box extending horizontally. The shape of the condensing chamber 26 is not limited to the foregoing shapes, but, in view of suitability for particle modification processing in the particle modifying device 21, a horizontally long shape like the foregoing is preferable to a vertically long shape.

Provided in the interior of the condensing chamber 26 and extending longitudinally with respect thereto is a space 26b. The space 26b is provided in the shape of a rectangular box, and inclines vertically with respect to the longitudinal axis of the condensing chamber 26. The lower end of the space 26b is provided with a reservoir section 26c for holding the monomer B. By means of the foregoing incline, monomer B introduced into the space 26b which becomes attached to the inner wall of the condensing chamber 26 flows down into the reservoir section 26c.

At the end of the condensing chamber 26 toward the reservoir section 26c and opening into a space above it is provided a purified gas intake 27, and at the opposite end from the purified gas intake 27 is provided an outlet 26d opening upward from the space 26b. The condensing chamber 26 is also provided with a thermometer 8 and a heating device 7. The condensing chamber 26 includes a wall section 26a made up of an outer wall section $26a_1$ and an inner wall section $26a_2$, and the inner wall section $26a_2$, like the inner wall section $2a_2$ in the particle modifying device 1, is made of a porous material such as ceramic, felt, etc.

To the outlet 26d of the condensing chamber 26 is connected the mixing section 22, for mixing a saturated vapor of the monomer B with cooled particles, and condensing the monomer B on the surface of the particles. The mixing section 22 includes a pipe 22a, and inside the pipe 22a and extending longitudinally with respect thereto is a processing space 22b. The pipe 22a extends in a straight line, and, in the present particle modifying device 21, stands at an angle of approximately 90° with respect to horizontal. Further, the pipe 22a is provided with a cooling device 22c for cooling the processing space 22b. The pipe 22a is further provided with a thermometer 8 for measuring the temperature in the processing space 22b. The upper end of the mixing section 22 extends to a space between a light projecting section 3a and a light receiving section 3b of an optical detecting device 3. In the optical detecting device 3, above the upper end of the mixing section 22, is provided a particle outlet 25 leading to the exterior of the device.

The particle introducing pipe 24 is connected to the outlet 26d of the condensing chamber 26. The particle introducing pipe 24 is provided with the thermometer 8 for measuring the temperature in the particle introducing pipe 24. Further, an optical detecting device 23 is connected to the end of the particle introducing pipe 24 opposite the end connected to the outlet 26d. The optical detecting device 23 measures the particle diameter and number concentration of particles introduced into the outlet 26d of the condensing chamber 26 through the particle introducing pipe 24, and has a structure equivalent to that of the optical detecting device 3.

Further, a particle intake 4, for introducing particles into the outlet 26d of the condensing chamber 26 through the particle introducing pipe 24, is provided on the side of the optical detecting device 23 opposite the side thereof connected to the particle introducing pipe 24. The particle intake 4 is provided with a cooling device 29 for cooling the particles. The cooling device 29 is made of, for example, a Peltier element which performs cooling by means of the Peltier effect. Depending on the cooling temperature, devices other than a Peltier element may be used for the cooling device 29, such as devices which cool by organic solvents cooled by a coolant such as liquid nitrogen, water, or dry ice; devices which cool by ice water, water, etc. cooled by a Liebig cooler; etc.

Next, the method of manufacturing modified particles using the particle modifying device 21 will be explained.

First, in the condensing chamber 26, the reservoir section 26c is filled with the monomer B, and the inner wall section $26a_2$ is impregnated with the monomer B. In addition, to rid the interior of the condensing chamber 26 of impurities which may form nuclei for condensation of the monomer B, the air in the space 26b is displaced by purified air.

Next, after sealing the space 26b of the condensing chamber 26, in order to produce a saturated vapor of the monomer B in the space 26b of the condensing chamber 26, the condensing chamber 26 is heated by means of the heating device 7. When the heating device 7 operates, heat is transmitted through the outer wall section $26a_1$ to the inner wall section $26a_2$ and the space 26b, which are thus heated. The temperature within the condensing chamber 26 is measured by the thermometer 8. By means of the foregoing heating, a saturated vapor of the monomer B is produced in the space 26b.

Next, the particles to be modified, along with inert gas, are cooled by the cooling device 29, and introduced from the particle intake 4, through the particle introducing pipe 24, into the space 26b in the vicinity of the outlet 26d. In this case, the particles are introduced as, for example, aerosol particles. The cooled particles introduced into the space 26b, along with the saturated vapor of the monomer B filling the space 26b, are introduced into the processing space 22b of the mixing section 22. In the processing space 22b, the cooled particles are mixed with the saturated vapor of the monomer B, and are cooled by the cooling device 22c. By this means, the saturated vapor of the monomer B becomes super-saturated, and condensation of the monomer B on the surface of the particles occurs.

Then, a polymerization reaction takes place on the surface of the particles between the monomer B condensed thereon and the monomer A contained in the particles, thus producing modified particles partially or entirely made of a polymer of the monomers A and B. Thereafter, the modification-processed particles in the processing space 22*b* pass through the optical detecting device 3, and are discharged through the particle outlet 25, and processing is ended.

Impurities such as inorganic salts and active gases, produced during surface modification processing, are attached to the surface of or mixed into the modified particles discharged from the particle outlet 25. Impurities produced during surface modification processing depend in part on the combination of the monomers A and B, but include, for example, hydrochloric acid (active gas) produced by the dehydration polycondensation reaction shown by the following reaction formula:

$$n\ H_2N—R_3—NH_2+n\ ClOC—R_4—COCl \rightarrow —(—R_3—NHCO—R_4—CONH—)_n—+2n\ HCl$$

(Here, $R_3$ and $R_4$ are hydrocarbon groups, each of which may include a functional group.) Other examples of impurities are sodium chloride (inorganic salt) and water produced, when sodium hydroxide is used as a catalyst, by the dehydration polycondensation reaction shown by the following reaction formula:

$$n\ H_2N—R_3—NH_2+n\ ClOC—R_4—COCl+2n\ NaOH \rightarrow —(—R_3—NHCO—R_4—CONH—)_n—+2n\ H_2O$$

(Here, $R_3$ and $R_4$ are hydrocarbon groups, each of which may include a functional group.) Further, unreacted substances (substances which did not undergo a polymerization reaction) and, depending on the reaction conditions, catalysts such as sodium hydroxide (inorganic salt) may partially remain as impurities. Electrolytes like the foregoing sodium chloride and sodium hydroxide do not easily vaporize, and thus such impurities cannot be eliminated by heating the modified particles.

Accordingly, in order to obtain modified particles from which impurities have been eliminated, an impurity eliminating device 50, for example, may be connected to the particle outlet 25 of the particle modifying device 21, as shown in FIG. 3. The impurity eliminating device 50 is connected to the particle outlet 25 of the particle modifying device 21 via a modified particle introducing pipe 51. The impurity eliminating device 50 is made up of an impurity eliminating section 52 and, provided above it, an atomizing section 53. The impurity eliminating section 52 and the atomizing section 53 are divided from each other by a divider 54, which is fixed at a predetermined position within a container 50*a* by, for example, adhesive attachment.

The impurity eliminating section 52 is made up of two collecting sections 60*a* and 60*b*, provided on opposite sides of an introducing section 59. The introducing section 59 is separated from the collecting section 60*a* by an ion exchange resin film 58*a*, and from the collecting section 60*b* by an ion exchange resin film 58*b*. Further, the impurity eliminating section 52 contains (i.e., the introducing section 59 and the collecting sections 60*a* and 60*b* contain) a predetermined quantity of washing liquid 55, such as pure water.

The ion exchange resin film 58*a* allows positive ions to pass from the introducing section 59 to the collecting section 60*a*, but does not allow them to pass in the opposite direction. The ion exchange resin film 58*b* allows negative ions to pass from the introducing section 59 to the collecting section 60*b*, but does not allow them to pass in the opposite direction. The ion exchange resin films 58*a* and 58*b* allow water to pass, but do not allow the modified particles to pass.

The modified particle introducing pipe 51 and an atomizing liquid supply tube 64 (to be discussed below) are inserted into the introducing section 59 through the divider 54. The end of the modified particle introducing pipe 51 and the lower end of the atomizing liquid supply tube 64 extend below the surface of the washing liquid 55.

The collecting section 60*a* includes a negative electrode 56, and the collecting section 60*b* includes a positive electrode 57. The electrodes 56 and 57 are fixed to the divider 54, and part of each electrode 56 and 57 extends below the surface of the washing liquid 55. Further, a predetermined voltage is applied to the electrodes 56 and 57 by a direct-current power source 61, thus forming an electric field in the washing liquid 55.

The atomizing section 53 includes a nozzle 62, the atomizing liquid supply tube 64, a baffle 63, a particle transport pipe 65, etc., and continuously supplies modified particles from which the impurities have been eliminated to a drying device 70 (to be discussed below). An end 62*a* of the nozzle 62, an upper end 64*a* of the atomizing liquid supply tube 64, an end 63*a* of the baffle 63, and an opening of the particle transport pipe 65 are arranged substantially in a straight horizontal line.

The atomizing liquid supply tube 64 is fixed to the divider 54. The lower end of the atomizing liquid supply tube 64 extends below the surface of the washing liquid 55, and, by blowing a carrier such as inert gas or air horizontally across the upper end 64*a* of the atomizing liquid supply tube 64, the pressure inside the atomizing liquid supply tube 64 is reduced, thus siphoning the washing liquid 55, which contains modified particles from which the impurities have been eliminated, to the upper end 64*a* of the atomizing liquid supply tube 64.

The nozzle 62 is connected to the container 50*a* in a position opposite the particle transport tube 65, and supplies the carrier to the interior of the atomizing section 53. The nozzle 62 is connected to a carrier supply device (not shown) such as a pump. By blowing the carrier from the end 62*a* of the nozzle 62, horizontally across the upper end 64a of the atomizing liquid supply tube 64, the washing liquid 55 is atomized, and the washing liquid 55, containing modified particles from which the impurities have been eliminated, is put in a particulate (mist) state.

The baffle 63 is fixed to the atomizing liquid supply tube 64, and includes a spherical end 63a. By collision of the liquid particles atomized at the upper end 64a of the atomizing liquid supply tube 64 (i.e., the particles of the washing liquid 55 including the modified particles), along with the carrier, with the end 63a of the baffle 63, liquid particles of comparatively large diameter are eliminated.

Liquid particles of comparatively small diameter pass around the end 63a of the baffle 63 without colliding therewith, and reach the particle transport pipe 65. In other words, by using the baffle 63 to regulate the diameter of the liquid particles, the atomizing section 53 supplies the drying device 70 with liquid particles of comparatively small and uniform diameter.

As discussed above, the maximum diameter of the liquid particles to be supplied to the drying device 70 can be controlled as desired by adjusting the size of the end 63a of the baffle 63 as necessary. In addition, the quantity of liquid particles supplied per unit time can be controlled as desired by adjusting the atomizing conditions, such as the diameter of the atomizing liquid supply tube 64, the flow and flow speed of the carrier, etc. The liquid particles eliminated by the baffle 63 flow down the baffle 63, and are reused as the washing liquid 55.

One end of the particle transport pipe 65 is connected to the side of the container 50a opposite the side where the nozzle 62 is connected, and the other end thereof is connected to the drying device 70.

The drying device 70 is connected to the impurity eliminating device 50 via the particle transport pipe 65. To sides 71 of the drying device 70 are attached heaters 72, which are heating devices. By heating the drying device 70 using the heaters 72, the liquid particles passing through the interior of the drying device 70 are heated, and water therein is vaporized, thus drying the modified particles from which impurities have been eliminated. The dried modified particles are discharged through a particle outlet 73.

In order to use the impurity eliminating device 50 and the drying device 70 with the foregoing structures to manufacture modified particles free of impurities, modified particles containing impurities, manufactured in the particle modifying device 21, are first introduced, along with inert gas, through the modified particle introducing pipe 51 to the impurity eliminating section 52 of the impurity eliminating device 50. In other words, the modified particles containing impurities, along with inert gas, are bubbled into the washing liquid 55. In this way, the modified particles containing impurities are recovered by the washing liquid 55.

At this time, impurities which are electrolytes dissolve into the washing liquid 55 and dissociate into ions due to the electrical field formed by the electrodes 56 and 57, to which a voltage is applied. Then, positive ions are attracted through the ion exchange resin film 58a to the negative electrode 56. Negative ions, on the other hand, are attracted through the ion exchange resin film 58b to the positive electrode 57.

Accordingly, impurities are collected as ions by the collecting sections 60a and 60b, leaving in the introducing section 59 the modified particles, from which impurities have been eliminated, dispersed in the washing liquid 55.

Next, in the atomizing section 53, by blowing the carrier from the end 62a of the nozzle 62 horizontally at the upper end 64a of the atomizing liquid supply tube 64, the washing liquid 55 is made particulate, and the diameter of these liquid particles is regulated by means of the baffle 63. Then the liquid particles obtained are continuously supplied (introduced), along with the carrier, into the drying device 70 via the particle transport pipe 65. Incidentally, it is preferable to displace the interior of the atomizing section 53 in advance with a purified gas such as the inert gas, air, etc. to be used as the carrier.

As they pass through the interior of the drying device 70, the liquid particles supplied thereto are heated by the heaters 72, vaporizing the water contained therein. By this means, the modified particles free of impurities are obtained in a dry state. The dried modified particles free of impurities are then discharged from the particle outlet 73. In the drying device 70, it is preferable to perform drying to such an extent that the modified particles will not aggregate.

The foregoing method can eliminate impurities, including byproducts, etc. produced in the polymerization reaction during surface modification processing, such as inorganic salts and active gases, and unreacted substances (substances which did not undergo a polymerization reaction), i.e., impurities mixed into or attached to the modified particles. In other words, the foregoing method is capable of simply and continuously manufacturing modified particles from which impurities have been eliminated.

Accordingly, since the adverse effects of impurities on the properties of the modified particles can be eliminated, in subsequent handling of the modified particles, for example, electrical charging is made easier, and deterioration of the properties of the modified particles can be minimized.

Further, with the foregoing method, impurities are eliminated by dissolving in pure water (the washing liquid 55). In other words, since pure water (the washing liquid 55) is used in eliminating the impurities, modified particles free of impurities can be manufactured simply by drying after elimination of impurities. In addition, with the foregoing method, there is no danger of compounds used in eliminating the impurities becoming mixed into or attached to the modified particles as further impurities. Thus modified particles can be obtained from which impurities have been eliminated with certainty.

Incidentally, in the impurity eliminating device 50, there is no limitation to any particular timing for executing the operation A of bubbling the modified particles containing impurities, along with inert gas, into the washing liquid 55; the operation B of recovering the impurities by dissociating them as ions; and the operation C of atomizing into particles (mist) the washing liquid 55 containing the modified particles from which impurities have been eliminated. For example, it is possible (1) to execute operations A, B, and C in parallel (simultaneously); (2) to execute operation A first, then operation B, and finally operation C; or (3) to execute operations A and B in parallel, and then to execute operation C.

The drying device 70 need not be limited to the structure discussed above; any structure capable of drying the modified particles is satisfactory. Moreover, when there is no need to dry the modified particles, the drying device 70 may be omitted.

[Second Embodiment]

Figure 4:
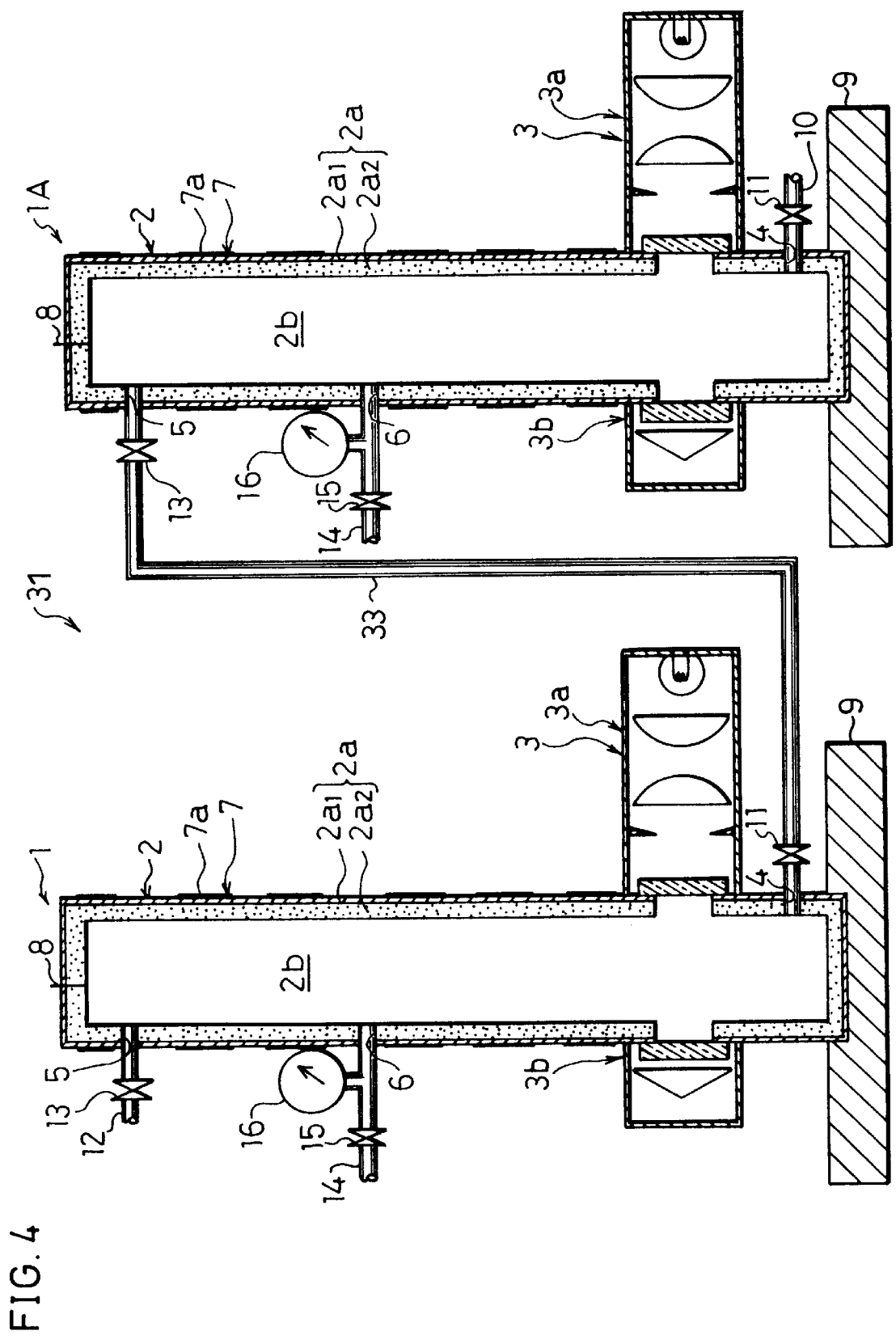
FIG. 4 is a cross-sectional drawing showing a particle modifying device according to another embodiment of the method of manufacturing modified particles according to the present invention.
Figure 5:
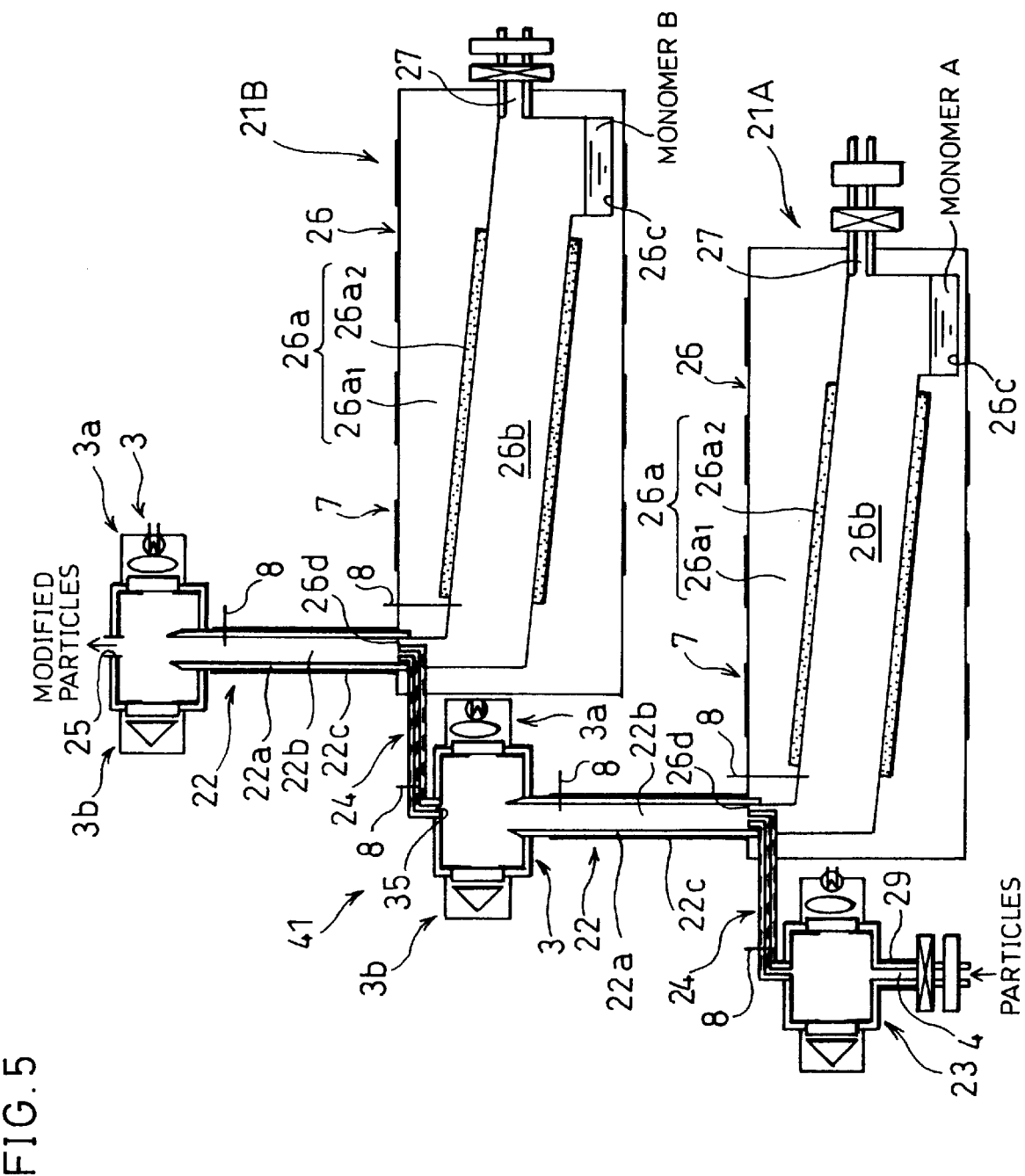
FIG. 5 is a cross-sectional drawing showing another particle modifying device according to another embodiment of the method of manufacturing modified particles according to the present invention.

The following will explain another embodiment of the present invention with reference to FIGS. 4 and 5.

The method of manufacturing modified particles according to the present embodiment is a method of exposing core particles to a super-saturated atmosphere of a monomer A, thus causing the monomer A to condense on the surface of the core particles; exposing the core particles with the monomer A condensed thereon to a super-saturated atmosphere of a monomer B, which has a higher boiling point than the monomer A and is polymerizable therewith, thus causing the monomer B to condense on the surface of the core particles, and causing a polymerization reaction between the monomers A and B on the surface of the core particles.

Core particles which may be used in the present embodiment include, for example, aerosol particles, mist particles, and fume. The primary particle diameter of these core particles is preferably from several nm to several $\mu$m. Further, the core particles in the present embodiment may be liquid particles, or they may be solid particles.

The various inorganic particles, organic particles, etc. listed in the first embodiment may be used for the core particles. Further, the core particles in the present embodiment may be particles made of a single substance, or they may be mixed particles made of a mixture of two or more substances. If the core particles are mixed particles made of a mixture of two or more substances, whether liquid or solid, the core particles themselves can be given a plurality of functions. The core particles may also be particles of a monomer which is polymerizable with the monomer B, or particles made of a mixture containing a monomer which is polymerizable with the monomer B.

The foregoing mixed particles may be mixed solid particles obtained by mixing two or more solid substances; a solution of particles obtained by dissolving a solid substance such as a dye or a pigment in a solvent; particles dispersed in a liquid, obtained by dispersing a solid substance in a solvent; or mixed liquid particles, obtained by mixing two or more liquid substances. The solvents listed in the first embodiment may be used as the foregoing solvent.

In the present embodiment, the monomer A and the monomer B used may be compounds equivalent to the monomers A and B used in the first embodiment.

In the method of manufacturing modified particles according to the present embodiment, the method of condensing a monomer (the monomer A or the monomer B) on the surface of the core particles should preferably be the adiabatic expansion method, in which, after introducing the core particles into a saturated vapor of the monomer, adiabatic expansion of the monomer is used to form a super-saturated vapor atmosphere thereof and condense the monomer on the surface of the core particles, or the temperature difference mixing method, in which the core particles are cooled and then introduced into a saturated vapor of the monomer, and the vapor of the monomer is condensed on the surface of the core particles due to mixing under a temperature difference.

In the adiabatic expansion method, it is preferable to introduce the core particles along with an inert gas into the saturated vapor of the monomer. Again, in the temperature difference mixing method, it is preferable to cool the core particles along with an inert gas and then introduce the core particles and the inert gas into the saturated vapor of the monomer. Using an inert gas in this way to introduce the core particles into the saturated vapor of the monomer prevents effects inappropriate in a carrier gas for introducing the core particles into the saturated vapor of the monomer, such as reaction between the carrier gas and the monomer or the core particles. For the inert gas, nitrogen gas, helium gas, argon gas, etc. may be used.

Further, in each of the foregoing methods, the method of obtaining the saturated vapor of the monomer may be by heating the monomer, or by pressurizing the monomer. Heating the monomer is preferable, because it is then easy to cool the saturated vapor of the monomer to obtain a super-saturated vapor thereof.

Next, the method of manufacturing modified particles according to the present embodiment will be explained specifically, discussing an example in which both condensation of the monomer A and condensation of the monomer B are performed by the adiabatic expansion method, using the particle modifying device 31 (manufacturing device) shown in FIG. 4. Here, for ease of explanation, members having functions equivalent to those of members shown in the foregoing Figures will be given the same reference symbols, and explanation thereof will be omitted here.

As shown in FIG. 4, in the particle modifying device 31, a particle modifying device 1 as a second stage is serially connected to a particle modifying device 1A, with the same structure, as a first stage. In the particle modifying device 31, the particle modifying device 1A (first stage) and the particle modifying device 1 (second stage) are connected by a transport pipe 33, which connects the particle outlet 5 of the particle modifying device 1A to the particle intake 4 of the particle modifying device 1. Incidentally, in the transport pipe 33, either the valve 13 toward the particle modifying device 1A or the valve 11 toward the particle modifying device 1 may be omitted.

Next, the method of manufacturing modified particles using the particle modifying device 31 will be explained.

First, the valves 11 and 13 of the particle modifying device 1A are opened. The monomer A is introduced, as aerosol particles, into the processing space **2*b* of the particle modifying device 1A through the particle intake 4, and the air in the processing space 2*b* of the particle modifying device 1A is discharged from the particle outlet 5. In this way, the air inside the processing space 2*b* of the particle modifying device 1A is displaced by the aerosol particles of the monomer A. Then the valves 11 and 13 of the particle modifying device 1A are closed, sealing the condensing chamber 2**.

Next, by opening the valve 15 of the particle modifying device 1A and sending purified air into the processing space **2*b* of the particle modifying device 1A through the pressurizing/depressurizing tube 14, the pressure in the processing space 2*b* of the particle modifying device 1A is raised to a predetermined pressure above atmospheric pressure. The processing space 2*b* of the particle modifying device 1A is also heated to a predetermined temperature by the heating device 7. Then the condensing chamber 2 is allowed to stand a suitable length of time at that temperature and pressure, thus producing in the processing space 2*b* of the particle modifying device 1A** a saturated vapor of the monomer A.

Next, the core particles are introduced, along with an inert gas, from the particle introducing pipe 10, through the particle intake 4, and into the processing space **2*b* of the particle modifying device 1A, after which the condensing chamber 2 is sealed. In this case, the core particles are introduced as, for example, aerosol particles. Next, by opening the valve 15 of the pressurizing/depressurizing pipe 14, thus opening the processing space 2*b* of the particle modifying device 1A to the atmosphere, the pressure in the processing space 2*b* is reduced to atmospheric pressure. This adiabatically expands the saturated vapor of the monomer A in the processing space 2*b* of the particle modifying device 1A, putting the saturated vapor of the monomer A in a super-saturated state, and the monomer A condenses on the surface of the core particles. After the foregoing adiabatic expansion, the valve 15 of the particle modifying device 1A** is closed.

Next, in the particle modifying device 1, in the same way as in the first embodiment (FIG. 1), a saturated vapor of the monomer B is produced. Next, the valves 11 and 13 of the particle modifying device 1A are opened, as are the valves 11 and 13 of the particle modifying device 1. By introducing purified air through the particle intake 4 into the particle modifying device 1A, the core particles with the monomer A condensed on the surface thereof are sent from the particle modifying device 1A, through the transport pipe 33, and into the particle modifying device 1. Thereafter, the valves 11 and 13 of the particle modifying device 1 are closed, thus sealing the condensing chamber 2.

Next, in the particle modifying device 1, in the same way as in the first embodiment (FIG. 1), the saturated vapor of the monomer B is adiabatically expanded, thus condensing the monomer B on the surface of the core particles on which the monomer A was previously condensed, and causing a polymerization reaction between the monomers A and B on the surface of the core particles. In this way, modified particles, made of the core particles covered with a film of a polymer of the monomers A and B, are obtained.

Finally, the valves 11 and 13 of the particle modifying device 1A and the valves 11 and 13 of the particle modifying device 1 are opened, and, by introducing purified air through the particle intake 4 of the particle modifying device 1A, the modified particles in the particle modifying device 1 are discharged by gas transport.

Next, the method of manufacturing modified particles according to the present embodiment will be explained specifically, discussing an example in which both condensation of the monomer A and condensation of the monomer B are performed by the temperature difference mixing method, using the particle modifying device 41 (manufacturing device) shown in FIG. 5. Here, for ease of explanation, members having functions equivalent to those of members shown in the foregoing Figures will be given the same reference symbols, and explanation thereof will be omitted here.

As shown in FIG. 5, in the particle modifying device 41, a first-stage particle modifying device 21A, having a structure equivalent to the particle modifying device 21 of the second embodiment, except that an outlet 35 replaces the particle outlet 25, is serially connected to a second-stage particle modifying device 21B, having a structure equivalent to the particle modifying device 21 of the second embodiment except that the particle intake 4, the optical detecting device 23, and the cooling device 29 are omitted. In the particle modifying device 41, the first-stage particle modifying device 21A and the second-stage particle modifying device 21B are connected by connection of the outlet 35 of the particle modifying device 21A to the particle introducing pipe 24 of the particle modifying device 21B.

Next, the method of manufacturing modified particles using the particle modifying device 41 will be explained.

First, in the first-stage particle modifying device 21A, a saturated vapor of the monomer A formed in the space 26b in the same way as in the first embodiment (FIG. 2) is introduced into the processing space 22b, and core particles cooled by the cooling device 29 are introduced, along with inert gas, from the particle introducing pipe 24, through the outlet 26d, and into the processing space 22b. In this way, in the processing space 22b of the first-stage particle modifying device 21A, the saturated vapor of the monomer A and the cooled core particles are mixed, putting the saturated vapor in the vicinity of the core particles in a super-saturated state, and condensing the monomer A on the surface of the core particles.

Next, the core particles with the monomer A condensed thereon in the processing space 22b of the first-stage particle modifying device 21A are introduced, along with inert gas, through the outlet 35 and the particle introducing pipe 24, and into the processing space 22b of the second-stage particle modifying device 21B, and a saturated vapor of the monomer B formed in the space 26b of the second-stage particle modifying device 21B in the same way as in the first embodiment (FIG. 2) is introduced into the processing space 22b.

In this way, in the processing space 22b of the second-stage particle modifying device 21B, the saturated vapor of the monomer B and the core particles cooled by the cooling device 22c are mixed, putting the saturated vapor in the vicinity of the core particles in a super-saturated state, and condensing the monomer B on the surface of the core particles on which the monomer A was previously condensed.

As a result, the monomers A and B undergo a polymerization reaction on the surface of the core particles, yielding modified particles made of the core particles covered with a film of a polymer of the monomers A and B.

Incidentally, the particle modification processing described in the present second embodiment may be performed on modified particles obtained by means of the manufacturing method of the first or second embodiment. Accordingly, the two steps described in the present second embodiment for forming a polymer film on the surface of particles may be repeated a plurality of times.

Specifically, modified particles obtained by the manufacturing method of the first or second embodiment may be exposed to a super-saturated vapor of a monomer C, thus condensing the monomer C on the surface of the modified particles, after which the modified particles with the monomer C condensed thereon are exposed to a super-saturated vapor of a monomer D, differing from the monomer C and polymerizable therewith, thus causing the monomer D to condense on the surface of the modified particles, and causing a polymerization reaction between the monomers C and D on the surface of the modified particles. For the monomer C, the foregoing compounds listed as examples for the monomer A, for example, are suitable. The monomers A and C may be different compounds, or they may be the same compound. Further, for the monomer D, the foregoing compounds listed as examples for the monomer B, for example, are suitable. The monomers B and D may be different compounds, or they may be the same compound.

By this means, a plurality of polymer films can be successively formed on the surface of particles, and thus a thicker polymer film can be formed. Accordingly, a polymer film of desired thickness can be formed even when a single polymerization reaction is unable to form a polymer film of a desired thickness because, for example, a monomer A is used with which a highly super-saturated vapor cannot be obtained.

In addition, when, as above, polymer films are formed on the surface of particles a plurality of times, at least two of the polymer films may be polymer films with mutually differing functions. Specifically, the combination of the monomers C and D can be different from the combination of the monomers A and B. In this way, modified particles can be obtained which are even more highly functional.

In what follows, the present invention will be explained in greater detail by means of Examples 1 through 16 according to the first and second embodiments, but the present invention is not limited in any way by these specific Examples.

EXAMPLE 1

Using the particle modifying device 31 shown in FIG. 4, modified particles were manufactured according to the method discussed in the foregoing second embodiment.

First, as the monomer A, 1,6-hexanediamine was placed in the condensing chamber 2 of the particle modifying device 1A. The interior of the condensing chamber 2 was pressurized through the pressurizing/depressurizing opening 6 and heated to 473 K using the heating device 7, yielding a saturated vapor of 1,6-hexanediamine.

Next, as the core particles, particles of titanium oxide having an average primary diameter of 0.5 μm were introduced, along with nitrogen gas, into the saturated vapor atmosphere of 1,6-hexanediamine through the particle intake 4. Then the saturated vapor of 1,6-hexanediamine was adiabatically expanded by reducing pressure through the pressurizing/depressurizing opening 6, yielding a super-saturated vapor of 1,6-hexanediamine. The titanium oxide particles were then exposed to the super-saturated vapor of 1,6-hexanediamine for 3 minutes, causing 1,6-hexanediamine to condense on the surface of the titanium oxide particles.

Next, as the monomer B, adipoyl chloride was placed in the condensing chamber 2 of the particle modifying device 1. The interior of the condensing chamber 2 was pressurized through the pressurizing/depressurizing opening 6 and heated to 423 K using the heating device 7, yielding a saturated vapor of adipoyl chloride. Then the titanium oxide particles with 1,6-hexanediamine condensed thereon were discharged from the condensing chamber 2 of the particle modifying device 1A, along with nitrogen gas, and introduced through the particle intake 4 into the saturated vapor atmosphere of adipoyl chloride in the condensing chamber 2 of the particle modifying device 1.

Then the saturated vapor of adipoyl chloride in the condensing chamber 2 of the particle modifying device 1 was adiabatically expanded by reducing pressure through the pressurizing/depressurizing opening 6, yielding a super-saturated vapor of adipoyl chloride. The titanium oxide particles were then exposed to the super-saturated vapor of adipoyl chloride for 3 minutes, causing adipoyl chloride to condense on the surface of the titanium oxide particles. By this means, a polycondensation reaction between 1,6-hexanediamine and adipoyl chloride took place on the surface of the titanium oxide particles, producing polyamide resin. This yielded modified particles (1), made of titanium oxide particles covered with a film of polyamide resin. When measured by the optical detecting device 3, the diameters of the modified particles (1) were found to be substantially uniform, with an average primary diameter of 1 μm.

EXAMPLE 2

Using the particle modifying device 1 shown in FIG. 1, modified particles were manufactured according to the method discussed in the foregoing first embodiment.

First, adipoyl chloride, as the monomer A, was mixed with carbon black, yielding mixed particles with an average geometric diameter of 0.5 μm. Next, as the monomer B, 1,6-hexanediamine was placed in the condensing chamber 2 of the particle modifying device 1. The interior of the condensing chamber 2 was pressurized through the pressurizing/depressurizing opening 6 and heated to 473 K using the heating device 7, yielding a saturated vapor of 1,6-hexanediamine.

Next, the foregoing mixed particles, along with nitrogen gas, were introduced through the particle intake 4 into the saturated vapor atmosphere of 1,6-hexanediamine. Then the saturated vapor of 1,6-hexanediamine was adiabatically expanded by reducing pressure through the pressurizing/depressurizing opening 6, yielding a super-saturated vapor of 1,6-hexanediamine.

The mixed particles were then exposed to the super-saturated vapor of 1,6-hexanediamine for 3 minutes, causing 1,6-hexanediamine to condense on the surface of the mixed particles. By this means, a polycondensation reaction between adipoyl chloride contained in the mixed particles and 1,6-hexanediamine took place on the surface of the mixed particles, producing polyamide resin. This yielded modified particles (2), made of carbon black covered with a film of polyamide resin. When measured by the optical detecting device 3, the diameters of the modified particles (2) were found to be substantially uniform, with an average primary diameter of 1 μm.

EXAMPLE 3

Using the particle modifying device 1 shown in FIG. 1, modified particles were manufactured according to a method equivalent to that of Example 2.

First, 1,2,4,5-benzentetracarboxylic dianhydride, as the monomer A, was mixed with carbon black, yielding mixed particles with an average geometric diameter of 0.7 μm. Next, as the monomer B, 1,4-diaminocyclohexane was placed in the condensing chamber 2 of the particle modifying device 1. The interior of the condensing chamber 2 was pressurized through the pressurizing/depressurizing opening 6 and heated to 473 K using the heating device 7, yielding a saturated vapor of 1,4-diaminocyclohexane.

Next, the foregoing mixed particles, along with nitrogen gas, were introduced through the particle intake 4 into the saturated vapor atmosphere of 1,4-diaminocyclohexane. Then the saturated vapor of 1,4-diaminocyclohexane was adiabatically expanded by reducing pressure through the pressurizing/depressurizing opening 6, yielding a super-saturated vapor of 1,4-diaminocyclohexane.

The mixed particles were then exposed to the super-saturated vapor of 1,4-diaminocyclohexane for 3 minutes, causing 1,4-diaminocyclohexane to condense on the surface of the mixed particles. By this means, a polycondensation reaction between 1,2,4,5-benzentetracarboxylic dianhydride contained in the mixed particles and 1,4-diaminocyclohexane took place on the surface of the mixed particles, producing polyamic acid resin. This yielded modified particles (3), made of carbon black covered with a film of polyamic acid resin. When measured by the optical detecting device 3, the diameters of the modified particles (3) were found to be substantially uniform, with an average primary diameter of 1.2 μm.

EXAMPLE 4

Using the particle modifying device 1 shown in FIG. 1, modified particles were manufactured according to a method equivalent to that of Example 2.

First, terephthalaldehyde, as the monomer A, was mixed with carbon black, yielding mixed particles with an average geometric diameter of 0.6 μm. Next, as the monomer B, 1,10-diaminodecane was placed in the condensing chamber 2 of the particle modifying device 1. The interior of the condensing chamber 2 was pressurized through the pressurizing/depressurizing opening 6 and heated to 473 K using the heating device 7, yielding a saturated vapor of 1,10-diaminodecane.

Next, the foregoing mixed particles, along with nitrogen gas, were introduced through the particle intake 4 into the saturated vapor atmosphere of 1,10-diaminodecane. Then the saturated vapor of 1,10-diaminodecane was adiabatically expanded by reducing pressure through the pressurizing/depressurizing opening 6, yielding a super-saturated vapor of 1,10-diaminodecane.

The mixed particles were then exposed to the super-saturated vapor of 1,10-diaminodecane for 3 minutes, causing 1,10-diaminodecane to condense on the surface of the mixed particles. By this means, a polycondensation reaction between terephthalaldehyde contained in the mixed particles and 1,10-diaminodecane took place on the surface of the mixed particles, producing polyazomethine resin. This yielded modified particles (4), made of carbon black covered with a film of polyazomethine resin. When measured by the optical detecting device 3, the diameters of the modified particles (4) were found to be substantially uniform, with an average primary diameter of 1 μm.

EXAMPLE 5

Using the particle modifying device 1 shown in FIG. 1, modified particles were manufactured according to a method equivalent to that of Example 2.

First, 1,5-diaminonaphthalene, as the monomer A, was mixed with C.I. Pigment Blue 199 (Ciba-Geigy Japan Limited product; a pigment), yielding mixed particles with an average geometric diameter of 0.7 μm. Next, as the monomer B, adipoyl chloride was placed in the condensing chamber 2 of the particle modifying device 1. The interior of the condensing chamber 2 was pressurized through the pressurizing/depressurizing opening 6 and heated to 423 K using the heating device 7, yielding a saturated vapor of adipoyl chloride.

Next, the foregoing mixed particles, along with nitrogen gas, were introduced through the particle intake 4 into the saturated vapor atmosphere of adipoyl chloride. Then the saturated vapor of adipoyl chloride was adiabatically expanded by reducing pressure through the pressurizing/depressurizing opening 6, yielding a super-saturated vapor of adipoyl chloride.

The mixed particles were then exposed to the super-saturated vapor of adipoyl chloride for 3 minutes, causing adipoyl chloride to condense on the surface of the mixed particles. By this means, a polycondensation reaction between 1,5-diaminonaphthalene contained in the mixed particles and adipoyl chloride took place on the surface of the mixed particles, producing polyamide resin. This yielded modified particles (5), made of C.I. Pigment Blue 199 covered with a film of polyamide resin. When measured by the optical detecting device 3, the diameters of the modified particles (5) were found to be substantially uniform, with an average primary diameter of 1.3 μm.

EXAMPLE 6

Using the particle modifying device 1 shown in FIG. 1, modified particles were manufactured according to a method equivalent to that of Example 2.

First, as the monomer B, 1,3-diaminopropane was placed in the condensing chamber 2 of the particle modifying device 1. The interior of the condensing chamber 2 was pressurized through the pressurizing/depressurizing opening 6 and heated to 393 K using the heating device 7, yielding a saturated vapor of 1,3-diaminopropane.

Next, as the particles, particles of 3,3',4,4'-benzophenontetracarboxylic dianhydride with an average geometric diameter of 1 μm were introduced, along with argon gas, through the particle intake 4 into the saturated vapor atmosphere of 1,3-diaminopropane. Then the saturated vapor of 1,3-diaminopropane was adiabatically expanded by reducing pressure through the pressurizing/depressurizing opening 6, yielding a super-saturated vapor of 1,3-diaminopropane.

The particles of 3,3',4,4'-benzophenontetracarboxylic dianhydride were then exposed to the super-saturated vapor of 1,3-diaminopropane for 2 minutes, causing 1,3-diaminopropane to condense on the surface of the particles of 3,3',4,4'-benzophenontetracarboxylic dianhydride. By this means, a polycondensation reaction between the particles of 3,3',4,4'-benzophenontetracarboxylic dianhydride and 1,3-diaminopropane took place, yielding modified particles (6), made of polyamic acid resin. When measured by the optical detecting device 3, the diameters of the modified particles (6) were found to be substantially uniform, with an average primary diameter of 1.5 μm.

EXAMPLE 7

Using the particle modifying device 1 shown in FIG. 1, modified particles were manufactured according to a method equivalent to that of Example 2.

First, as the monomer B, piperazine was placed in the condensing chamber 2 of the particle modifying device 1. The interior of the condensing chamber 2 was pressurized through the pressurizing/depressurizing opening 6 and heated to 403 K using the heating device 7, yielding a saturated vapor of piperazine.

Next, as the particles, particles of terephthaloyl chloride with an average geometric diameter of 0.9 μm were introduced, along with helium gas, through the particle intake 4 into the saturated vapor atmosphere of piperazine. Then the saturated vapor of piperazine was adiabatically expanded by reducing pressure through the pressurizing/depressurizing opening 6, yielding a super-saturated vapor of piperazine.

The particles of terephthaloyl chloride were then exposed to the super-saturated vapor of piperazine for 2 minutes, causing piperazine to condense on the surface of the particles of terephthaloyl chloride. By this means, a polycondensation reaction between the particles of terephthaloyl chloride and piperazine took place, yielding modified particles (7), made of polyamide resin. When measured by the optical detecting device 3, the diameters of the modified particles (7) were found to be substantially uniform, with an average primary diameter of 1.3 μm.

EXAMPLE 8

Using the particle modifying device 1 shown in FIG. 1, modified particles were manufactured according to a method equivalent to that of Example 2.

First, as the monomer B, piperazine was placed in the condensing chamber 2 of the particle modifying device 1. The interior of the condensing chamber 2 was pressurized through the pressurizing/depressurizing opening 6 and heated to 403 K using the heating device 7, yielding a saturated vapor of piperazine.

Next, as the particles, particles of isophthalaldehyde with an average geometric diameter of 0.8 μm were introduced, along with helium gas, through the particle intake 4 into the saturated vapor atmosphere of piperazine. Then the saturated vapor of piperazine was adiabatically expanded by reducing pressure through the pressurizing/depressurizing opening 6, yielding a super-saturated vapor of piperazine.

The particles of isophthalaldehyde were then exposed to the super-saturated vapor of piperazine for 2 minutes, causing piperazine to condense on the surface of the particles of isophthalaldehyde. By this means, a polycondensation reaction between the particles or isophthalaldehyde and piperazine took place, yielding modified particles (8), made of polyazomethine resin. When measured by the optical detecting device 3, the diameters of the modified particles (8) were found to be substantially uniform, with an average primary diameter of 1.2 μm.

EXAMPLE 9

Using the particle modifying device 1 shown in FIG. 1, modified particles were manufactured according to a method equivalent to that of Example 2.

First, as the monomer B, adipoyl chloride was placed in the condensing chamber 2 of the particle modifying device 1. The interior of the condensing chamber 2 was pressurized through the pressurizing/depressurizing opening 6 and heated to 443 K using the heating device 7, yielding a saturated vapor of adipoyl chloride.

Next, as the particles, particles of 4,4'-diaminostilbene with an average geometric diameter of 0.7 μm were introduced, along with helium gas, through the particle intake 4 into the saturated vapor atmosphere of adipoyl chloride. Then the saturated vapor of adipoyl chloride was adiabatically expanded by reducing pressure through the pressurizing/depressurizing opening 6, yielding a super-saturated vapor of adipoyl chloride.

The particles of 4,4'-diaminostilbene were then exposed to the super-saturated vapor of adipoyl chloride for 2 minutes, causing adipoyl chloride to condense on the surface of the particles of 4,4'-diaminostilbene. By this means, a polycondensation reaction between the particles of 4,4'-diaminostilbene and adipoyl chloride took place, yielding modified particles (9), made of polyamide resin. When measured by the optical detecting device 3, the diameters of the modified particles (9) were found to be substantially uniform, with an average primary diameter of 1 μm.

EXAMPLE 10

Modified particles were manufactured by using the particle modifying device 31 shown in FIG. 4 to perform particle modification processing equivalent to that of Example 1 on the modified particles (2) obtained in Example 2.

First, as the monomer A, 1,6-hexanediamine was placed in the condensing chamber 2 of the particle modifying device 1A. The interior of the condensing chamber 2 was pressurized through the pressurizing/depressurizing opening 6 and heated to 473 K using the heating device 7, yielding a saturated vapor of 1,6-hexanediamine.

Next, as the core particles, the modified particles (2) were introduced, along with nitrogen gas, through the particle intake 4 into the saturated vapor atmosphere of 1,6-hexanediamine. Then the saturated vapor of 1,6-hexanediamine was adiabatically expanded by reducing pressure through the pressurizing/depressurizing opening 6, yielding a super-saturated vapor of 1,6-hexanediamine. The modified particles (2) were then exposed to the super-saturated vapor of 1,6-hexanediamine for 2 minutes, causing 1,6-hexanediamine to condense on the surface of the modified particles (2).

Next, as the monomer B, adipoyl chloride was placed in the condensing chamber 2 of the particle modifying device 1. The interior of the condensing chamber 2 was pressurized through the pressurizing/depressurizing opening 6 and heated to 453 K using the heating device 7, yielding a saturated vapor of adipoyl chloride. Then the modified particles (2) with 1,6-hexanediamine condensed thereon were discharged from the condensing chamber 2 of the particle modifying device 1A, along with nitrogen gas, and introduced through the particle intake 4 into the saturated vapor atmosphere of adipoyl chloride in the condensing chamber 2 of the particle modifying device 1.

Then the saturated vapor of adipoyl chloride in the condensing chamber 2 of the particle modifying device 1 was adiabatically expanded by reducing pressure through the pressurizing/depressurizing opening 6, yielding a super-saturated vapor of adipoyl chloride. The modified particles (2) were then exposed to the super-saturated vapor of adipoyl chloride for 2 minutes, causing adipoyl chloride to condense on the surface of the modified particles (2).

By this means, a polycondensation reaction between 1,6-hexanediamine and adipoyl chloride took place on the surface of the modified particles (2), producing polyamide resin. This yielded modified particles (10), made of the modified particles (2) covered with a film of polyamide resin. When measured by the optical detecting device 3, the diameters of the modified particles (10) were found to be substantially uniform, with an average primary diameter of 1.4 μm.

EXAMPLE 11

Modified particles were manufactured by using the particle modifying device 31 shown in FIG. 4 to perform particle modification processing equivalent to that of Example 1 on the modified particles (2).

First, as the monomer A, 1,3-diaminopropane was placed in the condensing chamber 2 of the particle modifying device 1A. The interior of the condensing chamber 2 was pressurized through the pressurizing/depressurizing opening 6 and heated to 393 K using the heating device 7, yielding a saturated vapor of 1,3-diaminopropane.

Next, as the core particles, the modified particles (2) were introduced, along with nitrogen gas, through the particle intake 4 into the saturated vapor atmosphere of 1,3-diaminopropane. Then the saturated vapor of 1,3-diaminopropane was adiabatically expanded by reducing pressure through the pressurizing/depressurizing opening 6, yielding a super-saturated vapor of 1,3-diaminopropane. The modified particles (2) were then exposed to the super-saturated vapor of 1,3-diaminopropane for 2 minutes, causing 1,3-diaminopropane to condense on the surface of the modified particles (2).

Next, as the monomer B, sebacoyl chloride was placed in the condensing chamber 2 of the particle modifying device 1. The interior of the condensing chamber 2 was pressurized through the pressurizing/depressurizing opening 6 and heated to 453 K using the heating device 7, yielding a saturated vapor of sebacoyl chloride. Then the modified particles (2) with 1,3-diaminopropane condensed thereon were discharged from the condensing chamber 2 of the particle modifying device 1A, along with nitrogen gas, and introduced through the particle intake 4 into the saturated vapor atmosphere of adipoyl chloride in the condensing chamber 2 of the particle modifying device 1.

Then the saturated vapor of sebacoyl chloride in the condensing chamber 2 of the particle modifying device 1 was adiabatically expanded by reducing pressure through the pressurizing/depressurizing opening 6, yielding a super-saturated vapor of sebacoyl chloride. The modified particles (2) were then exposed to the super-saturated vapor of sebacoyl chloride for 2 minutes, causing sebacoyl chloride to condense on the surface of the modified particles (2).

By this means, a polycondensation reaction between 1,3-diaminopropane and sebacoyl chloride took place on the surface of the modified particles (2), producing polyamide resin. This yielded modified particles (11), made of the modified particles (2) covered with a film of polyamide resin. When measured by the optical detecting device 3, the diameters of the modified particles (11) were found to be substantially uniform, with an average primary diameter of 1.5 $\mu$m.

EXAMPLE 12

Using the particle modifying device 21 shown in FIG. 2, modified particles were prepared according to the method discussed in the foregoing first embodiment.

First, as the monomer B, adipoyl chloride was placed in the reservoir section 26c of the particle modifying device 21, and, at atmospheric pressure, heated to 433 K using the heating device 7, producing a saturated vapor of adipoyl chloride in the space 26b.

Next, the saturated vapor of adipoyl chloride was introduced into the processing space 22b. Then, particles made of a mixed water solution of C.I. Acid Red 8 (a dye), 1,6-hexanediamine, and sodium hydroxide (a catalyst) were cooled, along with helium gas, by the cooling device 29, and introduced, through the particle intake 4 and the particle introducing pipe 24, into the saturated vapor atmosphere of adipoyl chloride in the processing space 22b.

Then the saturated vapor of adipoyl chloride was cooled by the foregoing particles, putting it in a super-saturated state, and the foregoing particles were exposed to the super-saturated vapor of adipoyl chloride for 1 minute. By this means, a polycondensation reaction between 1,6-hexanediamine contained in the foregoing particles and adipoyl chloride took place on the surface of the foregoing particles, producing polyamide resin. This yielded modified particles (12), having on their surface a film of polyamide resin which includes C.I. Acid Red 8. When measured by the optical detecting device 3, the diameters of the modified particles (12) were found to be substantially uniform, with an average primary diameter of 2 $\mu$m.

EXAMPLE 13

Using the particle modifying device 1 shown in FIG. 1, modified particles were prepared according to a method equivalent to that of Example 2.

First, as the monomer B, 1,3-diaminopropane was placed in the condensing chamber 2 of the particle modifying device 1. The interior of the condensing chamber 2 was pressurized through the pressurizing/depressurizing opening 6 and heated to 413 K using the heating device 7, yielding a saturated vapor of 1,3-diaminopropane.

Next, isophthalaldehyde, as the monomer A, was mixed with carbon black, yielding mixed particles. The mixed particles were introduced, along with nitrogen gas, through the particle intake 4 into the saturated vapor atmosphere of 1,3-diaminopropane. Then the saturated vapor of 1,3-diaminopropane was adiabatically expanded by reducing pressure through the pressurizing/depressurizing opening 6, yielding a super-saturated vapor of 1,3-diaminopropane.

The mixed particles were then exposed to the super-saturated vapor of 1,3-diaminopropane for 5 minutes, causing 1,3-diaminopropane to condense on the surface of the mixed particles. By this means, a polycondensation reaction between isophthalaldehyde contained in the mixed particles and 1,3-diaminopropane took place on the surface of the mixed particles, producing polyazomethine resin. This yielded modified particles (13), made of carbon black covered with a film of polyazomethine resin. When measured by the optical detecting device 3, the diameters of the modified particles (13) were found to be substantially uniform, with an average primary diameter of 2 $\mu$m.

EXAMPLE 14

Using the particle modifying device 31 shown in FIG. 4, modified particles were prepared according to a method equivalent to that of Example 1.

First, as the monomer A, 1,3-diaminopropane was placed in the condensing chamber 2 of the particle modifying device 1A. The interior of the condensing chamber 2 was pressurized through the pressurizing/depressurizing opening 6 and heated to 413 K using the heating device 7, yielding a saturated vapor of 1,3-diaminopropane.

Next, as the core particles, particles of 1,6-hexanediamine were introduced, along with nitrogen gas, through the particle intake 4 into the saturated vapor atmosphere of 1,3-diaminopropane. Then the saturated vapor of 1,3-diaminopropane was adiabatically expanded by reducing pressure through the pressurizing/depressurizing opening 6, yielding a super-saturated vapor of 1,3-diaminopropane. The particles of 1,6-hexanediamine were then exposed to the super-saturated vapor of 1,3-diaminopropane for 2 minutes, causing 1,3-diaminopropane to condense on the surface of the particles of 1,6-hexanediamine.

Next, as the monomer B, sebacoyl chloride was placed in the condensing chamber 2 of the particle modifying device 1. The interior of the condensing chamber 2 was pressurized through the pressurizing/depressurizing opening 6 and heated to 453 K using the heating device 7, yielding a saturated vapor of sebacoyl chloride. Then the particles of 1,6-hexanediamine with 1,3-diaminopropane condensed thereon were discharged from the condensing chamber 2 of the particle modifying device 1A, along with nitrogen gas, and introduced through the particle intake 4 into the saturated vapor atmosphere of sebacoyl chloride in the condensing chamber 2 of the particle modifying device 1.

Then the saturated vapor of sebacoyl chloride in the condensing chamber 2 of the particle modifying device 1 was adiabatically expanded by reducing pressure through the pressurizing/depressurizing opening 6, yielding a super-saturated vapor of sebacoyl chloride. The particles of 1,6-hexanediamine were then exposed to the super-saturated vapor of sebacoyl chloride for 2 minutes, causing sebacoyl chloride to condense on the surface of the 1,6-hexanediamine particles. By this means, a polycondensation reaction took place among the particles of 1,6-hexanediamine, 1,3-diaminopropane, and sebacoyl chloride, yielding modified particles (14), made of polyamide resin. When measured by the optical detecting device 3, the diameters of the modified particles (14) were found to be substantially uniform, with an average primary diameter of 2 $\mu$m.

EXAMPLE 15

Using the particle modifying device 1 shown in FIG. 1, modified particles were prepared according to a method equivalent to that of Example 2.

First, as the monomer B, 1,3-diaminopropane was placed in the condensing chamber 2 of the particle modifying device 1. The interior of the condensing chamber 2 was pressurized through the pressurizing/depressurizing opening 6 and heated to 413 K using the heating device 7, yielding a saturated vapor of 1,3-diaminopropane.

Next, mixed particles made of a mixture of 1,4,5,8-naphthalentetracarboxylic dianhydride, as the monomer A, and 3,3',4,4'-benzophenontetracarboxylic dianhydride were introduced, along with nitrogen gas, through the particle intake 4 into the saturated vapor atmosphere of 1,3-diaminopropane in the condensing chamber 2. Then the saturated vapor of 1,3-diaminopropane in the condensing chamber 2 was adiabatically expanded by reducing pressure through the pressurizing/depressurizing opening 6, yielding a super-saturated vapor of 1,3-diaminopropane.

The mixed particles were then exposed to the super-saturated vapor of 1,3-diaminopropane for 3 minutes, causing 1,3-diaminopropane to condense on the surface of the mixed particles. By this means, a polycondensation reaction took place among 1,4,5,8-naphthalentetracarboxylic dianhydride, 3,3',4,4'-benzophenontetracarboxylic dianhydride, and 1,3-diaminopropane, yielding modified particles (15), made of polyamic acid resin. When measured by the optical detecting device 3, the diameters of the modified particles (15) were found to be substantially uniform, with an average primary diameter of 2 $\mu$m.

EXAMPLE 16

Using the particle modifying device 1 shown in FIG. 1, modified particles were prepared according to a method equivalent to that of Example 2.

First, as the monomer B, 1,3-diaminopropane was placed in the condensing chamber 2 of the particle modifying device 1. The interior of the condensing chamber 2 was pressurized through the pressurizing/depressurizing opening 6 and heated to 413 K using the heating device 7, yielding a saturated vapor of 1,3-diaminopropane.

Next, mixed particles made of terephthalaldehyde and terephthaloyl chloride as the monomer A, and carbon black, were introduced, along with nitrogen gas, through the particle intake 4 into the saturated vapor atmosphere of 1,3-diaminopropane in the condensing chamber 2. Then the saturated vapor of 1,3-diaminopropane was adiabatically expanded by reducing pressure through the pressurizing/depressurizing opening 6, yielding a super-saturated vapor of 1,3-diaminopropane.

The mixed particles were then exposed to the super-saturated vapor of 1,3-diaminopropane for 3 minutes, causing 1,3-diaminopropane to condense on the surface of the mixed particles. By this means, on the surface of the mixed particles, a condensation reaction took place between 1,3-diaminopropane and terephthalaldehyde, and a condensation reaction between 1,3-diaminopropane and terephthaloyl chloride, producing a resin having both a polyazomethine chain and a polyamide chain. This yielded modified particles (16), made of carbon black covered with a film of the foregoing resin. When measured by the optical detecting device 3, the diameters of the modified particles (16) were found to be substantially uniform, with an average primary diameter of 2 $\mu$m.

[Third Embodiment]

The following will explain a method of manufacturing modified particles according to a further embodiment of the present invention.

The method of manufacturing modified particles according to the present embodiment is a method of performing surface modification exposing particles containing a monomer A to a super-saturated atmosphere of a monomer B, causing the monomer B to condense on the surface of the particles, and causing a polymerization reaction between the monomers A and B on the surface of the particles, thereby forming a polymer film on the particles, in which a compound having two or more sulfonyl halide groups is used for either the monomer A or the monomer B.

Further, modified particles according to the present embodiment have a structure obtained according to the foregoing method. In the present embodiment, for ease of explanation, a clear distinction will be made by referring to the foregoing particles on which surface modification is to be performed as the "base particles," and referring to the modified particles according to the present embodiment, obtained by modifying the surface of the base particles, as the "modified particles."

Specific examples of base particles include the various inorganic particles listed in the first embodiment above, such as particles made of water (water droplets), and the various organic particles listed in the first embodiment above. In other words, any compound which can take a form such as aerosol particles or mist particles, regardless of its structure, may be used for the base particles according to the present embodiment. In referring to organic compounds, "saturated" will mean that there are no unsaturated carbon-carbon bonds other than an aromatic ring or heterocyclic ring; "unsaturated" will mean that there are unsaturated carbon-carbon bonds other than an aromatic ring or heterocyclic ring.

A single one of the foregoing compounds, or a combination of two or more of them, may be used as the base particles. In the method of manufacturing modified particles according to the present embodiment, the base particles may be solid or liquid at room temperature and atmospheric pressure. In other words, in the method of manufacturing modified particles according to the present embodiment, compounds which are liquid at room temperature and atmospheric pressure may be used for the base particles. Consequently, regardless of whether the base particles are solid or liquid, the surface properties thereof can be modified. Incidentally, in the present embodiment, "room temperature" will mean 293 K, and "atmospheric pressure" will mean 1 atmosphere.

Even when the base particles are liquid at room temperature and atmospheric pressure, surface modification thereof can be performed in the same way as with solid base particles, by polymerizing the monomers A and B on the surface of the base particles to form a polymer film covering the surface thereof. For this reason, since the polymer film in this case functions as a so-called capsule, modified particles can be obtained which are solid, but which enclose base particles which are liquid at room temperature and atmospheric pressure.

The base particles may be made of the monomer A (to be discussed below) alone. Again, as mentioned above, a combination of two or more compounds may be used for the base particles, and accordingly, other compounds may be added to the monomer A as needed, according to the use to which the modified particles are to be put. By structuring the base particles of a plurality of substances in this way, i.e., by using a combination (a mixture, for instance) of two or more compounds as the base particles, it is easy to obtain modified particles which contain compounds having a plurality of functions.

Further, when using a combination of two or more compounds, if at least one of the compounds is water, modified particles containing water can be obtained. In addition, when using a combination of two or more compounds, if at least one of the compounds is a pigment or a dye, modified particles of a desired color can be obtained.

The base particles are not limited to any specific primary particle diameter or average geometric particle diameter. Further, when a mixture of two or more compounds is used as the base particles, the respective compounds may be solids, or they may be liquids, or a combination of solids and liquids may be used.

The method of preparing the base particles of the foregoing compound (or mixture of a plurality of compounds) is not limited to any method in particular; specific examples of methods include (1) grinding, and then classification; (2) dissolving in a solvent (to be discussed below), and then preparing aerosol particles or mist particles of this solution; (3) dispersing in a solvent, and then preparing aerosol particles or mist particles of this dispersion; and (4) vaporizing, and then preparing fume by aggregating this gas (vapor).

In the present embodiment, base particles made of the monomer A (to be discussed below) alone may be used; in this case, if the monomer A is under room temperature and atmospheric pressure, base particles made of the monomer A alone may be suitably obtained by means of the foregoing method (4). However, when base particles are prepared using two or more compounds including the monomer A, a method of preparing the base particles including any of the foregoing methods (1) through (4) can be selected as necessary, depending to the compounds other than the monomer A.

The solvents used in the foregoing methods (2) and (3) are not limited to any solvents in particular, but specific examples of solvents which may be used include water; alcohols such as methyl alcohol, ethyl alcohol, propyl alcohol, and butyl alcohol; polyhydric alcohols such as glycerin, ethylene glycol, diethylene glycol, triethylene glycol, propylene glycol, dipropylene glycol, and tripropylene glycol; ketones such as methylethyl ketone and methylisobutyl ketone; nitrogen-containing heterocyclic compounds such as N-methyl-2-pyrrolidone, and ε-caprolactam; aliphatic hydrocarbons such as hexane and cyclohexane; aromatic hydrocarbons such as toluene and xylene; amides such as N-methylform amide and N,N-dimethylform amide; ethers such as diethyl ether; amines such as diethyl amine and triethyl amine; and compounds containing sulfur, such as dimethyl sulfoxide. One of the foregoing solvents may be used alone, or two or more may be used in combination. Incidentally, the solvent is one of the compounds making up the base particles. In other words, in the method of manufacturing modified particles according to the present embodiment, a mixture including a solvent is treated as the base particles.

The modified particles according to the present embodiment are obtained by first including the monomer A in the base particles, and then condensing the monomer B on the surface of the base particles to form thereon a film of surface modification agent made of resin.

In other words, in the method of manufacturing modified particles according to the present embodiment, by polymerizing two monomer substances on the surface of the base particles, a polymer film of surface modification agent is formed thereon.

In the present method of manufacturing modified particles, there is no danger of the base particles becoming electrically charged due to friction, etc., and surface modification of the base particles can be performed in a gas phase. For these reasons, surface modification of particles can be performed using simpler operations and in a shorter time than with conventional methods.

Further, by selecting the monomer substances as needed, a film of a surface modification agent (polymer) can be obtained which is suited to the use to which the modified particles are to be put. Furthermore, since the monomers to be used may be chosen from among a wide variety of monomers (provided they are polymerizable on the surface of the base particles), a variety of polymers can be formed as surface modification agents.

In particular, as discussed above, the base particles may be made solely of the monomer A. In this case, without using another compound for the base particles, modified particles made solely of a polymer of the monomers A and B can be obtained. Further, since the modified particles obtained in such a case are more uniformly spherical, spherical resin particles made of the foregoing polymer can be obtained more simply.

Here, "monomer A" refers to the monomer substance included in the base particles, and "monomer B" refers to the monomer substance to be condensed on the surface of the base particles which include the monomer A.

In the present method of manufacturing modified particles, a compound having two or more sulfonyl halide groups is used for either the monomer A or the monomer B. The compound used for the other of the monomer A or the monomer B is not limited to any compound in particular, provided it is polymerizable on the surface of the base particles with the compound having two or more sulfonyl halide groups, but preferably is a compound having two or more functional groups capable of a condensation reaction with the sulfonyl halide groups.

Further, it is preferable if the combination of the monomer A and the monomer B is a combination in which (1) one of the monomer A and the monomer B is a compound having two or more sulfonyl halide groups, and the other is a compound having two or more hydroxyl groups (hereinafter "combination A"); (2) one of the monomer A and the monomer B is a compound having two or more sulfonyl halide groups, and the other is a compound having two or more mercapto groups (hereinafter "combination B"); (3) one of the monomer A and the monomer B is a compound having two or more sulfonyl halide groups, and the other is a compound having two or more primary and/or secondary amino groups (hereinafter "combination C"); or (4) one of the monomer A and the monomer B is a compound having two or more sulfonyl halide groups, and the other is a compound having at least one each of two or more kinds of substitution group, chosen from among a hydroxyl group, a mercapto group, a primary amino group, and a secondary amino group (hereinafter "combination D").

In the present embodiment, a "sulfonyl halide group" means a monatomic group shown by the chemical formula —$SO_2X$ (where X is a halogen atom, i.e., a fluorine atom, a chlorine atom, a bromine atom, or an iodine atom). Accordingly, compounds having a sulfonyl halide group can be called sulfonyl halides.

Further, a "compound having two or more primary and/or secondary amino groups" refers to the following three types of compounds having at least one primary or secondary amino group: (1) compounds having two or more primary amino groups; (2) compounds having two or more secondary amino groups; and (3) compounds having at least one primary amino group and at least one secondary amino group.

Further, a "primary amino group" means a monatomic group shown by the chemical formula —$NH_2$, i.e., a functional group normally referred to simply as an "amino group." A "secondary amino group," on the other hand, means a monatomic group shown by the chemical formula NHR (where R is a substitution group such as an alkyl group). In other words, a "secondary amino group" is a functional group in which the hydrogen atom in one of the two nitrogen-hydrogen bonds of a primary amino group is replaced with a substitution group such as an alkyl group. Accordingly, compounds having a primary amino group and compounds having a secondary amino group can be called primary and secondary amines, respectively.

Specific examples of the foregoing compound having two or more sulfonyl halide groups (hereinafter referred to as "compound S") include 1,2-ethanedisulfonyl chloride, 1,3-propanedisulfonyl chloride, 1,4-butanedisulfonyl chloride, acetonedisulfonyl chloride, 1,3-benzenedisulfonyl chloride, 4,4'-biphenyldisulfonyl chloride, 4,4'-stilbenedisulfonyl chloride, piperazine-1,4-bis(2-ethansulfonyl chloride), 2,4-mesitylensulfonyl chloride, 2,7-dihydroxynaphthalene-3,6-disulfonyl chloride, naphthalene-1,3,6-trisulfonyl chloride, 2,4,5,6-tetramethylbenzenedisulfonyl chloride, and piperazine-1,4-bis(2-hydroxypropanedisulfonyl chloride).

Specific examples of the foregoing compound having two or more hydroxyl groups (hereinafter referred to as "compound A") include ethylene glycol, glycerol, diethylene glycol, triethylene glycol, 1,4-hydroquinone, 1,6-hexanediol, bisphenol A, 2,5-dihydroxytoluene, 4,4'-dihydroxybiphenyl, and 1,4-butanediol.

Specific examples of the foregoing compound having two or more mercapto groups (hereinafter referred to as "compound B") include ethanedithiol, 1,3-propanedithiol, 1,4-butanedithiol, 1,10-decanedithiol, 1,4-benzenedithiol, di(2-mercaptoethyl) ether, 1,5-dimercaptonaphthalene, 2,3-dimercapto succinic acid, 2,5-dimercapto-1,3,4-thiadiazole, dimercapto-1,3,4-thiadiazole, and 1,4-bis(mercaptomethyl) benzene.

Specific examples of the foregoing compound having two or more primary and/or secondary amino groups (hereinafter referred to as "compound C") include 1,3-diaminopropane, 1,6-diaminohexane, 1,4-diaminocyclohexane, piperazine, dimethyl piperazine, 1,10-diaminodecane, 1,12-diaminododecane, urea, thiourea, 1,2-phenylenediamine, 1,2,4-triaminobenzene, 2,4-diaminotoluene, 2,6-diaminotoluene, 3,3'-diaminobenzidine, 3,3'-diaminobenzophenone, and 4,4'-diaminodicyclohexylmethane.

Specific examples of the foregoing compound having at least one each of two or more kinds of substitution group chosen from among a hydroxyl group, a mercapto group, a primary amino group, and a secondary amino group (hereinafter referred to as "compound D") include 1,4-dimercapto-2,3-butanediol, 2,5-diamino-1,4-benzenedithiol, 2-amino-4-cresol, 4-aminocyclohexanol, 2-aminoethanethiol, 2-(2-aminoethylamino) ethanol, 6-amino-2-mercaptobenzothiazole, 2-amino-5-mercapto-1,3,4-thiadiazole, mercaptoethanol, 2-aminobenzenethiol, and 2-aminophenol.

It is particularly preferable if the secondary amino group in compound C and in compound D is a monoalkyl amino group. A monoalkyl amino group is a functional group in which the hydrogen in one of the two nitrogen-hydrogen bonds of a primary amino group is replaced by a alkyl group.

Further, the foregoing compounds S, A, B, and C may be compounds in which a saturated aliphatic hydrocarbon, an unsaturated aliphatic hydrocarbon, a saturated aromatic hydrocarbon, an unsaturated aromatic hydrocarbon, a saturated heterocyclic compound, or an unsaturated heterocyclic compound includes two or more of the respective functional groups, i.e. sulfonyl halide groups for the compound S, hydroxyl groups for the compound A, mercapto groups for the compound B, and primary or secondary amino groups for the compound C.

In the same way, the compound D may be a compound in which a saturated aliphatic hydrocarbon, an unsaturated aliphatic hydrocarbon, a saturated aromatic hydrocarbon, an unsaturated aromatic hydrocarbon, a saturated heterocyclic compound, or an unsaturated heterocyclic compound includes at least one each of two or more kinds of substitution group, selected from among a hydroxyl group, a mercapto group, a primary amino group, and a secondary amino group.

Each of the foregoing saturated aliphatic hydrocarbon, unsaturated aliphatic hydrocarbon, saturated aromatic hydrocarbon, unsaturated aromatic hydrocarbon, saturated heterocyclic compound, and unsaturated heterocyclic compound may have a functional group such as an amide group, a hydroxyl group, a carbonyl group, a carboxyl group, a halogen group, a nitro group, or a sulfonyl group; and may have a bond such as an ester.

In the present Specification, "hydrocarbon" refers, not only to the compounds made up of only carbon and hydrogen atoms which are generally called hydrocarbons (hereinafter referred to as "true hydrocarbons"), but also to derivatives of the true hydrocarbons. Accordingly, along with saturated aliphatic hydrocarbons, unsaturated aliphatic hydrocarbons, saturated aromatic hydrocarbons, and unsaturated aromatic hydrocarbons are included derivatives of the true hydrocarbons generally referred to as saturated aliphatic hydrocarbons, unsaturated aliphatic hydrocarbons, saturated aromatic hydrocarbons, and unsaturated aromatic hydrocarbons, such as compounds in which a hydrogen atom of one of the foregoing true hydrocarbons is replaced with a functional group such as an amide group, a hydroxyl group, a carbonyl group, a carboxyl group, a halogen group, a nitro group, or a sulfonyl group; and compounds in which an ester bond is inserted in a carbon-carbon bond of one of the foregoing true hydrocarbons (one having two or more carbon atoms).

Here, when one of the foregoing saturated aliphatic hydrocarbons, unsaturated aliphatic hydrocarbons, saturated aromatic hydrocarbons, unsaturated aromatic hydrocarbons, saturated heterocyclic compounds, and unsaturated heterocyclic compounds includes in its structure one of the foregoing functional groups, it is sufficient if its structure includes a total of two or more functional groups (including the foregoing functional group).

For example, in the case of the compound A, examples of the compound A are 1,2-propanediol and glycerol. In both of these compounds, 2-propanol, a saturated aliphatic hydrocarbon with a carbon number of 3, provides the basic structure, and a hydroxyl group is attached to one (or two) of the 3 carbon atoms of the 2-propanol. In other words, in 1,2-propanediol, a hydroxyl group is attached to the carbon atom in position 1 of the saturated aliphatic hydrocarbon 2-propanol, and in glycerol, a hydroxyl group is attached to each of the carbon atoms in positions 1 and 3 of the 2-propanol.

Again, in the case of the compound C, examples of the compound C are 1,2-phenylenediamine and 1,2,4-triaminobenzene.

In both of these compounds, aniline, a saturated aromatic hydrocarbon with a carbon number of 6, provides the basic structure, and an amino group is attached to one (or two) of the 6 carbon atoms of the aniline. In other words, in 1,2-phenylenediamine, an amino group (primary amino group) is attached to the carbon atom in position 2 of the saturated aromatic hydrocarbon aniline, and in 1,2,4-triaminobenzene, an amino group (primary amino group) is attached to each of the carbon atoms in positions 2 and 4 of the aniline.

Again, in the case of the compound D, examples of the compound D are 2-aminobenzenethiol and 2,5-diamino-1,4-benzenedithiol. In both of these compounds, thiophenol, a saturated aromatic hydrocarbon with a carbon number of 6, provides the basic structure, and an amino group (primary amino group) and/or a mercapto group are attached to one or several of the 6 carbon atoms of the thiophenol. In other words, in 2-aminobenzenethiol, an amino group (primary amino group) is attached to the carbon atom in position 2 of the saturated aromatic hydrocarbon thiophenol, and in 2,5-diamino-1,4-benzenedithiol, an amino group (primary amino group) is attached to each of the carbon atoms in positions 2 and 5 of the thiophenol, and a mercapto group to the carbon atom in position 4 of the thiophenol.

However, the expression used above, to the effect that the foregoing functional groups are "attached" to the saturated aliphatic hydrocarbons and other compounds which provide the basic structures, does not mean that they are attached to the basic structures through a chemical reaction such as an addition reaction or a transfer reaction. Rather, the expression to the effect that the foregoing functional groups are "attached" to the foregoing basic structures is merely used for convenience in explaining the structure of the compounds S, A, B, C, and D in more detail.

Incidentally, in manufacturing the compounds to be used for the compounds S, A, B, C, and D, when it is possible to chemically attach the foregoing functional groups to the saturated aliphatic hydrocarbons and other compounds which provide the basic structures, and when it is industrially advantageous to do so (when, for example, manufacturing a compound by attaching a functional group can reduce increases in manufacturing cost or yield a compound of high quality), then it is, of course, suitable to use such a manufacturing method of chemically attaching a functional group to a basic structure.

In the foregoing combinations A, B, C, and D, the monomer A may be either the compound S or the compound A, B, C, or D, respectively. In other words, in the foregoing combinations A, B, C, and D, the compound S may be either the monomer A or the monomer B. The modified particles according to the present third embodiment may be obtained by using as the combination of the monomer A and the monomer B a combination of the compound S and any of the compounds A, B, C, and D.

Of the compounds listed above as examples of the compounds S, A, B, C, and D, a single compound may be used alone for the monomer substance, or two or more compounds may be used. In other words, the film of surface modification agent obtained by polymerization of the monomers A and B may be a co-polymer obtained by polymerization of three or more compounds. However, the three or more compounds used must be used as the monomers A and B, and should preferably fall under one of the foregoing combinations A, B, C, and D.

In the method of manufacturing modified particles according to the present third embodiment, a compound having two or more sulfonyl halide groups is used for either the monomer A or the monomer B, or preferably, one of the foregoing combinations A, B, C, or D is used for the monomers A and B. Consequently, with the present method, reactivity between the functional groups of the monomer A and the functional groups of the monomer B is improved, and thus the polymerization reaction proceeds faster than when other combinations of monomers are used, and a polymer film can be formed more easily on the surface of the base particles.

It is preferable if at least the monomer B is a liquid at room temperature and atmospheric pressure. By this means, it is easier to obtain a saturated vapor of the monomer substance(s), and easier to introduce the monomer substance(s) into the particle modifying device which performs surface modification. With the monomer B, in particular, in order to obtain a super-saturated vapor thereof, the monomer B should preferably be liquid at room temperature and atmospheric pressure. Further, using a monomer A which is also liquid at room temperature and atmospheric pressure has the advantage that it is easy to include the monomer A in the base particles.

A polymerization reaction between the monomers A and B takes place through contact of the respective monomer substances, but when a polymerization reaction is difficult to induce, a catalyst may be used as necessary. By using such a catalyst, the polymerization reaction can be expedited. The catalyst may be selected as needed, and may be either solid or liquid at room temperature and atmospheric pressure.

The method of adding the foregoing catalyst to the polymerization reaction system of the monomers A and B is not limited to any method in particular, and a method may be used whereby the catalyst is previously included in the base particles. With this method, various methods for including the monomer A in the base particles may be used.

It is preferable to use the foregoing catalyst in the polymerization reaction between the monomers A and B. Provided it is a true catalyst which does not obstruct the polymerization reaction and increases reaction rate, the catalyst used is not limited to any catalyst in particular. Examples of organic catalysts include amines such as triethylamine, triethylenediamine, and triethanoldiamine; and nitrogen-containing heterocyclic compounds such as pyridine, 2,6-dimethyl pyridine, 2,3,5,6-tetramethyl pyridine, and pyrazine. Further, examples of inorganic catalysts include alkali metal salts such as sodium hydroxide, potassium hydroxide, sodium carbonate, sodium hydrogencarbonate, potassium acetate, and tert-butoxypotassium.

In the foregoing method, the monomer A is included in the base particles. Examples of methods of adding the monomer A to the base particles include the condensation method, in which the monomer A is condensed on the surface of the base particles, and then the monomer B is condensed on the surface of the base particles with the monomer A condensed thereon; and the mixing method, in which one or more solid or liquid compounds making up the base particles are mixed with the monomer A, yielding a mixture, of which particles are prepared, yielding the base particles. However, the method of adding the monomer A is not limited to the foregoing two methods, and any method is acceptable provided the monomer A is included in the base particles in such a manner that it may be polymerized with the monomer B.

Of the foregoing methods, in the condensation method, since the monomer A is condensed on the surface of the base particles, a film of polymer (surface modification agent) can be suitably formed regardless of the state of the surface of the base particles. However, since the monomer B must also be condensed on the surface of the base particles, two particle modifying devices for condensing monomer substances are necessary. With the mixing method, on the other hand, only one particle modifying device, for condensing the monomer B, is necessary, but, depending on the compound (s) used for the base particles, there may be cases in which the monomer A cannot be mixed therewith. Consequently, the method of adding the monomer may be selected as needed in accordance with the type of compound(s) to be used for the base particles, and the use to which the modified particles are to be put.

The method of bringing the base particles into contact with super-saturated vapors of the monomer A and/or the monomer B and attaching the monomer substance to the surface of the base particles is not limited to any method in particular, but a suitable method is one in which the base particles are exposed to a super-saturated vapor of the monomer substance, causing the monomer substance to condense on the surface of the base particles. Specific examples include methods in which, after forming a saturated vapor of the monomer substance in a particle modifying device, (1) the base particles are introduced therein, and a super-saturated vapor is obtained by adiabatic expansion of the saturated vapor, causing the monomer substance to condense on the surface of the base particles, (2) the base particles are introduced therein, and a super-saturated vapor is obtained by super-cooling the saturated vapor, causing the monomer substance to condense on the surface of the base particles, or (3) cooled base particles (base particles of a lower temperature than the saturated vapor) are introduced therein, and temperature difference between the monomer substance and the base particles causes the monomer substance to condense on the surface of the base particles. However, the method used is not limited to the foregoing methods; any method may be used provided the conditions thereof do not give rise to mutual aggregation or alteration of the base particles. In this way, a film is formed of the monomer substance condensed on the surface of the base particles.

When the foregoing film of the monomer substance is a film of the monomer A, the state of attachment of the monomer A to the surface of the base particles is not limited to any state in particular, provided that it is a state in which the monomer A is polymerizable with the monomer B later to be condensed on the surface of the base particles. However, it is preferable if the monomer A is merely attached to the surface of the base particles. It is not preferable for the monomer A to be bonded thereto by chemical reaction, etc., because this may obstruct the polymerization reaction.

By selecting the monomer substances to be used from among the foregoing combinations A, B, C, and D, and from among the specific compounds listed for each of the combinations A, B, C, and D, the modified particles obtained may be given various functions. Incidentally, since a polymer film of surface modification agent which is solid at room temperature and atmospheric pressure is formed on the surface of the base particles, i.e., since a solid polymer film of surface modification agent is attached so as to cover the surface of the base particles, even if the base particles are liquid at room temperature and atmospheric pressure, the polymer film can function as a so-called capsule to enclose the liquid base particles. In other words, base particles which are liquid at room temperature and atmospheric pressure can be surface-modified.

The method of introducing the base particles into the particle modifying device filled with the saturated vapor of the monomer substance is not limited to any method in particular, but a simple method is one in which, using one of the foregoing inert gases as a carrier, the base particles are introduced along with the inert gas. In other words, in the method of manufacturing modified particles according to the present embodiment, the base particles may be brought into contact with the super-saturated vapor of the monomer substance in the presence of an inert gas.

As discussed above, in the present method of manufacturing modified particles, it is preferable if the combination of the monomer A and the monomer B is one of (1) combination A, in which one of the monomer A and the monomer B is a compound having two or more sulfonyl halide groups, and the other is a compound having two or more hydroxyl groups; (2) combination B, in which one of the monomer A and the monomer B is a compound having two or more sulfonyl halide groups, and the other is a compound having two or more mercapto groups; (3) combination C, in which one of the monomer A and the monomer B is a compound having two or more sulfonyl halide groups, and the other is a compound having two or more primary and/or secondary amino groups; or (4) combination D, in which one of the monomer A and the monomer B is a compound having two or more sulfonyl halide groups, and the other is a compound having at least one each of two or more kinds of substitution group, chosen from among a hydroxyl group, a mercapto group, a primary amino group, and a secondary amino group.

If the combination of the monomer A and the monomer B is one of the foregoing combinations, the reactivity between the functional groups of the monomer A and the functional groups of the monomer B can be improved. Consequently, the polymerization reaction proceeds faster than when other combinations of monomers are used, and a polymer film can be formed more easily on the surface of the base particles. In particular, it is preferable to use monomer substances which are liquid, because this makes it easier to vaporize the monomer substance, include the monomer substance in the base particles, etc.

In addition, the base particles may be liquid at room temperature and atmospheric pressure, and may be made of the monomer A alone. Again, the base particles may be made of a plurality of substances. In the method of manufacturing modified particles according to the present embodiment, since a variety of substances may be used for the base particles, it is easy to obtain modified particles having functions suited to the purpose for which they are used.

Furthermore, in the present method of manufacturing modified particles, the process for forming a polymer film can be performed a plurality of times. Consequently, by selecting the number of times to perform the process for forming the polymer film, it is possible to adjust the total thickness of the polymer film obtained. Further, by using different monomers each time the process is performed, the surface properties of the base particles can be modified by a plurality of surface modification agents (polymer films). Thus highly functional modified particles can be obtained more easily.

As discussed above, the modified particles according to the present embodiment have a structure obtained according to the foregoing method. By this means, modified particles, made of base particles on the surface of which is formed a film of surface modification agent made of a polymer obtained by polymerization of a monomer A and a monomer B, can be easily provided. Further, even if the base particles are, for example, liquid at room temperature and atmospheric pressure, the modified particles obtained are solid, and can thus be handled simply and easily. In other words, it is possible to provide modified particles which enable liquid base particles to be handled as solids. Moreover, modified particles having a film of surface modification agent (polymer) of a desired thickness, and highly functional modified particles, can be provided.

The modified particles according to the present embodiment are suitable for use for such purposes as pharmaceuticals, cosmetics, paint and other coatings, printing inks, toners (developers), ceramics, electronic materials, etc.

The particle modifying devices shown in FIGS. 1 through 5, having operations and effects equivalent to those explained in the first and second embodiments above, are examples of particle modifying devices which can be suitably used in the method of manufacturing modified particles using base particles and surface modification agents structured as described in the present third embodiment.

In what follows, the present invention will be explained in greater detail by means of Examples 17 through 43 according to the third embodiment, but the present invention is not limited in any way by these specific Examples.

EXAMPLE 17

First, in the particle modifying device 1A shown in FIG. 4, 1,4-butanedisulfonyl chloride, as the monomer A, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then, as the base particles, titanium oxide particles having a primary diameter of 0.5 $\mu$m were introduced, along with nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced base particles were exposed thereto for 3 minutes. Consequently, 1,4-butanedisulfonyl chloride condensed on the surface of the base particles.

Next, in the particle modifying device 1 shown in FIG. 4, 1,6-hexanediol, as the monomer B, was supplied to the condensing chamber 2. The interior of the condensing chamber 2 was pressurized through the pressurizing/depressurizing opening 6, and heated to 453 K by the heating device 7, producing a vapor of 1,6-hexanediol. Then the foregoing base particles with 1,4-butanedisulfonyl chloride condensed thereon were introduced, along with the nitrogen gas, through the particle intake 4 into the vapor atmosphere of 1,6-hexanediol in the condensing chamber 2.

Next, the 1,6-hexanediol vapor in the condensing chamber 2 was adiabatically expanded, and the introduced base particles were exposed thereto for 15 minutes. Consequently, a polymerization reaction between 1,4-butanedisulfonyl chloride and 1,6-hexanediol took place on the surface of the base particles, forming a film of 1,4-butanedisulfonylchloride-1,6-hexanediol co-polymer.

Formation of the foregoing co-polymer film yielded modified particles (17) according to the present embodiment. When measured by the optical detecting device 3, the modified particles (17) were found to be substantially uniform in quality and size, with a primary diameter of 2 $\mu$m.

EXAMPLE 18

First, 1,4-benzenedithiol, as the monomer A, was mixed with triethylamine as a catalyst, forming base particles with an average geometric diameter of 1 $\mu$m.

Next, as the monomer B, 1,4-butanedisulfonyl chloride was supplied to the condensing chamber 2 of the particle modifying device 1 shown in FIG. 1. The interior of the condensing chamber 2 was pressurized through the pressurizing/depressurizing opening 6, and heated to 473 K by the heating device 7, producing a vapor of 1,4-butanedisulfonyl chloride.

Then the base particles were introduced, along with argon gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced base particles were exposed thereto for 15 minutes. Consequently, 1,4-butanedisulfonyl chloride condensed on the surface of the base particles. A polymerization reaction, using as a catalyst triethylamine contained in the base particles, took place between 1,4-butanedisulfonyl chloride condensed on the surface of the base particles and 1,4-benzenedithiol contained therein, forming a film of 1,4-benzenedithiol-1,4-butanedisulfonylchloride co-polymer on the surface of the base particles.

Formation of the foregoing co-polymer film yielded modified particles (18) according to the present embodiment. When measured by the optical detecting device 3, the modified particles (18) were found to be substantially uniform in quality and size, with a primary diameter of 1.5 $\mu$m.

EXAMPLE 19

First, 4,4'-stilbenedisulfonyl chloride, as the monomer A, was mixed with C.I. Pigment Blue 199 (Ciba-Geigy Japan Limited product; a phthalocyanine pigment), forming base particles with an average geometric diameter of 1 $\mu$m.

Next, as the monomer B, diethylene glycol was supplied to the condensing chamber 2 of the particle modifying device 1A shown in FIG. 4. The interior of the condensing chamber 2 was pressurized through the pressurizing/depressurizing opening 6, and heated to 443 K by the heating device 7, producing a vapor of diethylene glycol.

Then the base particles were introduced, along with nitrogen gas, through the particle intake 4 into the vapor atmosphere of diethylene glycol in the condensing chamber 2.

Next, the diethylene glycol vapor in the condensing chamber 2 was adiabatically expanded, and the introduced base particles were exposed thereto for 15 minutes. Consequently, diethylene glycol condensed on the surface of the base particles.

In the particle modifying device 1 shown in FIG. 4, triethylamine, as a catalyst, was supplied to the condensing chamber 2. The interior of the condensing chamber 2 was pressurized through the pressurizing/depressurizing opening 6, and heated to 353 K by the heating device 7, producing a vapor of triethylamine.

Then the foregoing base particles with diethylene glycol condensed thereon were introduced, along with the nitrogen gas, through the particle intake 4 into the vapor atmosphere of triethylamine in the condensing chamber 2.

Next, the triethylamine vapor in the condensing chamber 2 was adiabatically expanded, and the introduced base particles were exposed thereto for 20 minutes.

Consequently, triethylamine condensed on the surface of the base particles with diethylene glycol previously condensed thereon. A polymerization reaction, using as a catalyst triethylamine condensed on the surface of the base particles, took place between diethylene glycol condensed on the surface of the base particles and 4,4-stilbenedisulfonyl chloride contained therein, forming a film of 4,4'-stilbenedisulfonylchloride-diethylene glycol co-polymer on the surface of particles of C.I. Pigment Blue 199.

Formation of the foregoing co-polymer film yielded modified particles (19) according to the present embodiment. In other words, modified particles (19) were obtained by the same method as in Example 17 above. When measured by the optical detecting device 3, the modified particles (19) were found to be substantially uniform in quality and size, with a primary diameter of 2 µm.

EXAMPLE 20

First, 1,4-hydroquinone and triethylenediamine, as the monomer A, were dissolved in ethanol, and from this solution were formed base particles with an average geometric diameter of 1 µm.

Next, as the monomer B, 1,3-propanedisulfonyl chloride was supplied to the condensing chamber 2 of the particle modifying device 1 shown in FIG. 1. The interior of the condensing chamber 2 was pressurized through the pressurizing/depressurizing opening 6, and heated to 463 K by the heating device 7, producing a vapor of 1,3-propanedisulfonyl chloride.

Then the base particles were introduced, along with argon gas, through the particle intake 4 into the vapor atmosphere of 1,3-propanedisulfonyl chloride in the condensing chamber 2.

Next, the 1,3-propanedisulfonyl chloride vapor in the condensing chamber 2 was adiabatically expanded, and the introduced base particles were exposed thereto for 15 minutes. Consequently, 1,3-propanedisulfonyl chloride condensed on the surface of the base particles. A polymerization reaction took place between 1,3-propanedisulfonyl chloride condensed on the surface of the base particles and 1,4-hydroquinone contained therein, forming a film of 1,4-hydroquinone-1,3-propanedisulfonylchloride co-polymer on the surface of the base particles.

Formation of the foregoing co-polymer film yielded modified particles (20) according to the present embodiment. When measured by the optical detecting device 3, the modified particles (20) were found to be substantially uniform in quality and size, with a primary diameter of 1.7 µm.

EXAMPLE 21

First, in the particle modifying device 1A shown in FIG. 4, 1,4-butanedisulfonyl chloride, as the monomer A, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then, as the base particles, the modified particles (17) obtained in Example 17 (primary diameter: 2 µm) were introduced, along with nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced modified particles (17) were exposed thereto for 2 minutes. Consequently, 1,4-butanedisulfonyl chloride condensed on the surface of the modified particles (17).

Next, in the particle modifying device 1 shown in FIG. 4, 1,6-hexanediol, as the monomer B, was supplied to the condensing chamber 2. The interior of the condensing chamber 2 was pressurized through the pressurizing/depressurizing opening 6, and heated to 453 K by the heating device 7, producing a vapor of 1,6-hexanediol. Then, the modified particles (17) with the 1,4-butanedisulfonyl chloride condensed thereon were introduced, along with the nitrogen gas, through the particle intake 4 into the vapor atmosphere of 1,6-hexanediol in the condensing chamber 2.

Next, the 1,6-hexanediol vapor in the condensing chamber 2 was adiabatically expanded, and the introduced modified particles (17) were exposed thereto for 18 minutes. Consequently, a further polymerization reaction between 1,4-butanedisulfonyl chloride and 1,6-hexanediol took place on the surface of the modified particles (17), forming a film of 1,4-butanedisulfonylchloride-1,6-hexanediol co-polymer.

Formation of the foregoing co-polymer film yielded modified particles (21) according to the present embodiment. In other words, modified particles (21) were obtained by the same method as in Example 17 above. When measured by the optical detecting device 3, the modified particles (21) were found to be substantially uniform in quality and size, with a primary diameter of 3.5 µm.

EXAMPLE 22

First, in the particle modifying device 1A shown in FIG. 4, 2,4-mesitylenedisulfonyl chloride, as the monomer A, was supplied to the condensing chamber 2. The interior of the condensing chamber 2 was pressurized through the pressurizing/depressurizing opening 6, and heated to 493 K by the heating device 7, producing a vapor of 2,4-mesitylenedisulfonyl chloride.

Then, as the base particles, the modified particles (19) obtained in Example 19 (primary diameter: 2 µm) were introduced, along with nitrogen gas, through the particle intake 4 into the vapor atmosphere of 2,4-mesitylenedisulfonyl chloride in the condensing chamber 2.

Next, the 2,4-mesitylenedisulfonyl chloride vapor in the condensing chamber 2 was adiabatically expanded, and the introduced modified particles (19) were exposed thereto for 3 minutes. Consequently, 2,4-mesitylenedisulfonyl chloride condensed on the surface of the modified particles (19).

Next, in the particle modifying device 1 shown in FIG. 4, 1,4-benzenedithiol, as the monomer B, was supplied to the condensing chamber 2. The interior of the condensing chamber 2 was pressurized through the pressurizing/depressurizing opening 6, and heated to 463 K by the heating device 7, producing a vapor of 1,4-benzenedithiol. Then the foregoing modified particles (19) with the 2,4-mesitylenedisulfonyl chloride condensed thereon were introduced, along with the nitrogen gas, through the particle intake 4 into the vapor atmosphere of 1,4-benzenedithiol in the condensing chamber 2.

Next, the 1,4-benzenedithiol vapor in the condensing chamber 2 was adiabatically expanded, and the introduced base particles were exposed thereto for 30 minutes. Consequently, a further polymerization reaction between 2,4-mesitylenedisulfonyl chloride and 1,4-benzenedithiol took place on the surface of the modified particles (19), forming a film of 2,4-mesitylenedisulfonylchloride-1,4-benzenedithiol co-polymer.

Formation of the foregoing co-polymer film yielded modified particles (22) according to the present embodiment. In other words, modified particles (22) were obtained by the same method as in Example 17 above. When measured by the optical detecting device 3, the modified particles (22) were found to be substantially uniform in quality and size, with a primary diameter of 4 µm.

EXAMPLE 23

First, as the monomer B, 1,4-butanedisulfonyl chloride was placed in the reservoir section 26c of the condensing chamber 26 of the particle modifying device 21 shown in FIG. 2, and, by heating to 463 K at atmospheric pressure using the heating device 7, a vapor of 1,4-butanedisulfonyl chloride was produced.

The base particles used were a mixture of C.I. Acid Red 8 (Tokyo Kasei Kogyo Co., Ltd. product), triethylenediamine as a catalyst, di(2-mercaptoethyl)ether as the monomer A, and water dissolving the foregoing. These base particles had an average geometric diameter of 3 μm.

The base particles, along with helium gas, were cooled and introduced through the particle intake 4 into the vapor atmosphere of 1,4-butanedisulfonyl chloride in the condensing chamber 26. Next, in the mixing section 22, the vapor of 1,4-butanedisulfonyl chloride was cooled, and the introduced base particles were exposed thereto for 10 minutes. Consequently, a polymerization reaction, using as a catalyst triethylenediamine contained in the base particles, took place on the surface of the base particles between di(2-mercaptoethyl)ether and 1,4-butanedisulfonyl chloride, forming a film of di(2-mercaptoethyl)ether-1,4-butanedisulfonyl chloride co-polymer.

Formation of the foregoing co-polymer film yielded modified particles (23) according to the present embodiment. When measured by the optical detecting device 3, the modified particles (23) were found to be substantially uniform in quality and size, with a primary diameter of 4 μm.

EXAMPLE 24

First, in the first-stage particle modifying device 21A shown in FIG. 5, 1,4-butanedisulfonyl chloride, as the monomer A, was placed in the reservoir section 26c of the condensing chamber 26, and, by heating to 463 K at atmospheric pressure using the heating device 7, a vapor of 1,4-butanedisulfonyl chloride was produced.

The base particles used were a mixture of carbon black and polystyrene resin. These base particles had an average geometric diameter of 1.5 μm.

The base particles, along with argon gas, were cooled and introduced through the particle intake 4 into the vapor atmosphere of 1,4-butanedisulfonyl chloride in the condensing chamber 26. Next, in the mixing section 22, the vapor of 1,4-butanedisulfonyl chloride was cooled, and the introduced base particles were exposed thereto for 5 minutes. Consequently, 1,4-butanedisulfonyl chloride condensed on the surface of the base particles.

Next, ethylene glycol, as the monomer B, was mixed with triethylamine as a catalyst, with a volume ratio of 95 to 5. The mixture obtained thereby was placed in the reservoir section 26c of the condensing chamber 26 of the second-stage particle modifying device 21B shown in FIG. 5, and, by heating to 403 K at atmospheric pressure using the heating device 7, a mixed vapor of ethylene glycol and triethylamine was produced.

Then the foregoing base particles with 1,4-butanedisulfonyl chloride condensed thereon, along with the argon gas, were cooled and introduced through the particle intake 4 into the mixed vapor atmosphere of ethylene glycol and triethylamine in the condensing chamber 26.

Next, in the mixing section 22, the mixed vapor atmosphere of ethylene glycol and triethylamine was cooled, and the introduced base particles were exposed thereto for 15 minutes. Consequently, a polymerization reaction using triethylamine as a catalyst took place on the surface of the base particles between 1,4-butanedisulfonyl chloride and ethylene glycol, forming a film of 1,4-butanedisulfonylchloride-ethylene glycol co-polymer.

Formation of the foregoing co-polymer film yielded modified particles (24) according to the present embodiment. When measured by the optical detecting device 3, the modified particles (24) were found to be substantially uniform in quality and size, with a primary diameter of 3 μm.

EXAMPLE 25

First, in the first-stage particle modifying device 21A shown in FIG. 5, 2,4-mesitylenedisulfonyl chloride, as the monomer A, was placed in the reservoir section 26c of the condensing chamber 26, and, by heating to 493 K at atmospheric pressure using the heating device 7, a vapor of 2,4-mesitylenedisulfonyl chloride was produced.

The base particles used were a mixture of C.I. Acid Blue 92 (Tokyo Kasei Kogyo Co., Ltd. product), sodium hydroxide, bisphenol A as the monomer A, and water dissolving the foregoing. These base particles had an average geometric diameter of 2.0 μm.

The base particles, along with argon gas, were cooled and introduced through the particle intake 4 into the vapor atmosphere of 2,4-mesitylenedisulfonyl chloride in the condensing chamber 26. Next, in the mixing section 22, the vapor of 2,4-mesitylenedisulfonyl chloride was cooled, and the introduced base particles were exposed thereto for 10 minutes. Consequently, 2,4-mesitylenedisulfonyl chloride condensed on the surface of the base particles.

Next, in the second-stage particle modifying device 21B shown in FIG. 5, 1,4-butanedisulfonyl chloride, as the monomer B, was placed in the reservoir section 26c of the condensing chamber 26, and, by heating to 463 K at atmospheric pressure using the heating device 7, a vapor of 1,4-butanedisulfonyl chloride was produced.

Then the foregoing base particles with 2,4-mesitylenedisulfonyl chloride condensed thereon, along with the argon gas, were cooled and introduced through the particle intake 4 into the vapor atmosphere of 1,4-butanedisulfonyl chloride in the condensing chamber 26.

Next, in the mixing section 22, the vapor atmosphere of 1,4-butanedisulfonyl chloride was cooled, and the introduced base particles were exposed thereto for 15 minutes. Consequently, a polymerization reaction took place on the surface of the base particles between 2,4-mesitylenedisulfonyl chloride and 1,4-butanedisulfonyl chloride, on the one hand, and bisphenol A on the other, forming a film of a co-polymer of 2,4-mesitylenedisulfonyl chloride and 1,4-butanedisulfonyl chloride, on the one hand, and bisphenol A on the other.

Formation of the foregoing co-polymer film yielded modified particles (25) according to the present embodiment. In other words, modified particles (25) were obtained by the same method as in Example 24 above. When measured by the optical detecting device 3, the modified particles (25) were found to be substantially uniform in quality and size, with a primary diameter of 3 μm.

EXAMPLE 26

First, in the particle modifying device 1A shown in FIG. 4, 1,4-butanedisulfonyl chloride, as the monomer A, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then, as the base particles, titanium oxide particles having a primary diameter of 0.5 μm were introduced, along with nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced base particles were exposed thereto for 3 minutes. Consequently, 1,4-butanedisulfonyl chloride condensed on the surface of the base particles.

Next, in the particle modifying device 1 shown in FIG. 4, 1,6-diaminohexane, as the monomer B, was supplied to the condensing chamber 2. The interior of the condensing chamber 2 was pressurized through the pressurizing/depressurizing opening 6, and heated to 423 K by the heating device 7, producing a vapor of 1,6-diaminohexane. Then the foregoing base particles with 1,4-butanedisulfonyl chloride condensed thereon were introduced, along with the nitrogen gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced base particles were exposed thereto for 3 minutes. Consequently, a polymerization reaction between 1,4-butanedisulfonyl chloride and 1,6-diaminohexane took place on the surface of the base particles, forming a film of 1,4-butanedisulfonylchloride-1,6-diaminohexane co-polymer.

Formation of the foregoing co-polymer film yielded modified particles (26) according to the present embodiment. When measured by the optical detecting device 3, the modified particles (26) were found to be substantially uniform in quality and size, with a primary diameter of 3 μm.

EXAMPLE 27

First, 1,3-benzenedisulfonyl chloride, as the monomer A, was mixed with carbon black, forming base particles with an average geometric diameter of 1.5 μm.

Next, as the monomer B, 1,6-diaminohexane was supplied to the condensing chamber 2 of the particle modifying device 1 shown in FIG. 1. The interior of the condensing chamber 2 was pressurized through the pressurizing/depressurizing opening 6, and heated to 423 K by the heating device 7, producing a vapor of 1,6-diaminohexane.

Then the base particles were introduced, along with argon gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced base particles were exposed thereto for 3 minutes. Consequently, 1,6-diaminohexane condensed on the surface of the base particles. A polymerization reaction took place between 1,6-diaminohexane condensed on the surface of the base particles and 1,3-benzenedisulfonyl chloride contained therein, forming a film of 1,3-benzenedisulfonylchloride-1,6-diaminohexane co-polymer.

Formation of the foregoing co-polymer film yielded modified particles (27) according to the present embodiment. When measured by the optical detecting device 3, the modified particles (27) were found to be substantially uniform in quality and size, with a primary diameter of 2 μm.

EXAMPLE 28

First, 4,4'-stilbenedisulfonyl chloride, as the monomer A, was mixed with C.I. Pigment Blue 199 (Ciba-Geigy Japan Limited product; a phthalocyanine pigment), forming base particles with an average geometric diameter of 1 μm.

Next, as the monomer B, piperazine was supplied to the condensing chamber 2 of the particle modifying device 1 shown in FIG. 1. The interior of the condensing chamber 2 was pressurized through the pressurizing/depressurizing opening 6, and heated to 443 K by the heating device 7, producing a vapor of piperazine.

Then the base particles were introduced, along with nitrogen gas, through the particle intake 4 into the vapor atmosphere of piperazine in the condensing chamber 2.

Next, the piperazine vapor in the condensing chamber 2 was adiabatically expanded, and the introduced base particles were exposed thereto for 3 minutes. Consequently, piperazine condensed on the surface of the base particles. A polymerization reaction took place between piperazine condensed on the surface of the base particles and 4,4'-stilbenedisulfonyl chloride contained therein, forming a film of 4,4'-stilbenedisulfonyl chloride-piperazine co-polymer on the surface of the base particles.

Formation of the foregoing co-polymer film yielded modified particles (28) according to the present embodiment. When measured by the optical detecting device 3, the modified particles (28) were found to be substantially uniform in quality and size, with a primary diameter of 2 μm.

EXAMPLE 29

First, as the monomer A, particles of 1,3-propanedisulfonyl chloride with an average geometric diameter of 1 μm, which could also be used as the base particles, were used.

Next, as the monomer B, 1,3-diaminopropane was supplied to the condensing chamber 2 of the particle modifying device 1 shown in FIG. 1. The interior of the condensing chamber 2 was pressurized through the pressurizing/depressurizing opening 6, and heated to 373 K by the heating device 7, producing a vapor of 1,3-diaminopropane.

Then the base particles were introduced, along with argon gas, through the particle intake 4 into the vapor atmosphere of 1,3-diaminopropane in the condensing chamber 2.

Next, the 1,3-diaminopropane vapor in the condensing chamber 2 was adiabatically expanded, and the introduced base particles were exposed thereto for 2 minutes. Consequently, 1,3-diaminopropane condensed on the surface of the base particles. A polymerization reaction took place between 1,3-diaminopropane condensed on the surface of the base particles and 1,3-propanedisulfonyl chloride making up the base particles, forming a film of 1,3-propanedisulfonylchloride-1,3-diaminopropane co-polymer on the surface of the base particles.

Formation of the foregoing co-polymer film yielded modified particles (29) according to the present embodiment. In other words, modified particles (29) were obtained by the same method as in Example 26 above. When measured by the optical detecting device 3, the modified particles (29) were found to be substantially uniform in quality and size, with a primary diameter of 2 μm.

EXAMPLE 30

First, in the particle modifying device 1A shown in FIG. 4, 1,4-butanedisulfonyl chloride, as the monomer A, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then, as the base particles, the modified particles (26) obtained in Example 26 (primary diameter: 3 μm) were introduced, along with nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced modified particles (26) were exposed thereto for 2 minutes. Consequently, 1,4-butanedisulfonyl chloride condensed on the surface of the modified particles (26).

Next, in the particle modifying device 1 shown in FIG. 4, 1,6-diaminohexane, as the monomer B, was supplied to the condensing chamber 2. The interior of the condensing chamber 2 was pressurized through the pressurizing/depressurizing opening 6, and heated to 423 K by the heating device 7, producing a vapor of 1,6-diaminohexane. Then the foregoing modified particles (26) with 1,4-butanedisulfonyl chloride condensed thereon were introduced, along with the nitrogen gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced modified particles (26) were exposed thereto for 2 minutes. Consequently, a further polymerization reaction between 1,4-butanedisulfonyl chloride and 1,6-diaminohexane took place on the surface of the modified particles (26), forming a film of 1,4-butanedisulfonylchloride-1,6-diaminohexane co-polymer.

Formation of the foregoing co-polymer film yielded modified particles (30) according to the present embodiment. When measured by the optical detecting device 3, the modified particles (30) were found to be substantially uniform in quality and size, with a primary diameter of 5 μm.

EXAMPLE 31

First, in the particle modifying device 1A shown in FIG. 4, 2,4-mesitylenedisulfonyl chloride, as the monomer A, was supplied to the condensing chamber 2. The interior of the condensing chamber 2 was pressurized through the pressurizing/depressurizing opening 6, and heated to 493 K by the heating device 7, producing a vapor of 2,4-mesitylenedisulfonyl chloride.

Then, as the base particles, the modified particles (27) obtained in Example 27 (primary diameter: 2 μm) were introduced, along with nitrogen gas, through the particle intake 4 into the vapor atmosphere of 2,4-mesitylenedisulfonyl chloride in the condensing chamber 2.

Next, the 2,4-mesitylenedisulfonyl chloride vapor in the condensing chamber 2 was adiabatically expanded, and the introduced modified particles (27) were exposed thereto for 2 minutes. Consequently, 2,4-mesitylenedisulfonyl chloride condensed on the surface of the modified particles (27).

Next, in the particle modifying device 1 shown in FIG. 4, 1,4-diaminocyclohexane, as the monomer B, was supplied to the condensing chamber 2. The interior of the condensing chamber 2 was pressurized through the pressurizing/depressurizing opening 6, and heated to 433 K by the heating device 7, producing a vapor of 1,4-diaminocyclohexane. Then the foregoing modified particles (27) with 2,4-mesitylenedisulfonyl chloride condensed thereon were introduced, along with the nitrogen gas, through the particle intake 4 into the vapor atmosphere of 1,4-diaminocyclohexane in the condensing chamber 2.

Next, the 1,4-diaminocyclohexane vapor in the condensing chamber 2 was adiabatically expanded, and the introduced modified particles (27) were exposed thereto for 2 minutes. Consequently, a further polymerization reaction between 2,4-mesitylenedisulfonyl chloride and 1,4-diaminocyclohexane took place on the surface of the modified particles (27), forming a film of 2,4-mesitylenedisulfonyl chloride-1,4-diaminocyclohexane co-polymer.

Formation of the foregoing co-polymer film yielded modified particles (31) according to the present embodiment. When measured by the optical detecting device 3, the modified particles (31) were found to be substantially uniform in quality and size, with a primary diameter of 4 μm.

EXAMPLE 32

First, as the monomer B, 1,4-butanedisulfonyl chloride was placed in the reservoir section 26c of the condensing chamber 26 of the particle modifying device 21 shown in FIG. 2, and, by heating to 443 K at atmospheric pressure using the heating device 7, a vapor of 1,4-butanedisulfonyl chloride was produced.

The base particles used were a mixture of C.I. Acid Red 8 (Tokyo Kasei Kogyo Co., Ltd. product) and a mixed solution, to dissolve the C.I. Acid Red 8, of water, ethylene glycol, and 1,6-diaminohexane, as the monomer A. These base particles had an average geometric diameter of 3 μm.

The base particles, along with helium gas, were cooled and introduced through the particle intake 4 into the vapor atmosphere of 1,4-butanedisulfonyl chloride in the condensing chamber 26. Next, in the mixing section 22, the vapor of 1,4-butanedisulfonyl chloride was cooled, and the introduced base particles were exposed thereto for 5 minutes. Consequently, a polymerization reaction took place on the surface of the base particles between 1,6-diaminohexane and 1,4-butanedisulfonyl chloride, forming a film of 1,6-diaminohexane-1,4-butanedisulfonyl chloride co-polymer.

Formation of the foregoing co-polymer film yielded modified particles (32) according to the present embodiment. When measured by the optical detecting device 3, the modified particles (32) were found to be substantially uniform in quality and size, with a primary diameter of 4 μm.

EXAMPLE 33

First, in the first-stage particle modifying device 21A shown in FIG. 5, 1,4-butanedisulfonyl chloride, as the monomer A, was placed in the reservoir section 26c of the condensing chamber 26, and, by heating to 443 K at atmospheric pressure using the heating device 7, a vapor of 1,4-butanedisulfonyl chloride was produced.

The base particles used were a mixture of carbon black and polystyrene resin. These base particles had an average geometric diameter of 2 μm.

The base particles, along with argon gas, were cooled and introduced through the particle intake 4 into the vapor atmosphere of 1,4-butanedisulfonyl chloride in the condensing chamber 26. Next, in the mixing section 22, the vapor of 1,4-butanedisulfonyl chloride was cooled, and the introduced base particles were exposed thereto for 3 minutes. Consequently, 1,4-butanedisulfonyl chloride condensed on the surface of the base particles.

Next, 1,10-diaminodecane, as the monomer B, was placed in the reservoir section 26c of the condensing chamber 26 of the second-stage particle modifying device 21B shown in FIG. 5, and, by heating to 453 K at atmospheric pressure using the heating device 7, a vapor of 1,10-diaminodecane was produced.

Then the foregoing base particles with 1,4-butanedisulfonyl chloride condensed thereon, along with the argon gas, were cooled and introduced through the particle introducing pipe 24 into the vapor atmosphere of 1,10-diaminodecane in the condensing chamber 26.

Next, in the mixing section 22, the vapor atmosphere of 1,10-diaminodecane was cooled, and the introduced base particles were exposed thereto for 5 minutes. Consequently, a polymerization reaction took place on the surface of the base particles between 1,4-butanedisulfonyl chloride and 1,10-diaminodecane, forming a film of 1,4-butanedisulfonylchloride-1,10-diaminodecane co-polymer.

Formation of the foregoing co-polymer film yielded modified particles (33) according to the present embodiment. When measured by the optical detecting device 3, the modified particles (33) were found to be substantially uniform in quality and size, with a primary diameter of 3 μm.

EXAMPLE 34

First, in the first-stage particle modifying device 21A shown in FIG. 5, 1,12-diaminodecane, as the monomer A, was placed in the reservoir section 26c of the condensing chamber 26, and, by heating to 463 K at atmospheric pressure using the heating device 7, a vapor of 1,12-diaminodecane was produced.

The base particles used were a mixture of C.I. Acid Blue 92 (Tokyo Kasei Kogyo Co., Ltd. product) and water dissolving the C.I. Acid Blue 92. These base particles had an average geometric diameter of 2 μm.

The base particles, along with argon gas, were cooled and introduced through the particle intake 4 into the vapor atmosphere of 1,12-diaminodecane in the condensing chamber 26. Next, in the mixing section 22, the vapor of 1,12-diaminodecane was cooled, and the introduced base particles were exposed thereto for 10 minutes. Consequently, 1,12-diaminodecane condensed on the surface of the base particles.

Next, 1,3-propanedisulfonyl chloride, as the monomer B, was placed in the reservoir section 26c of the condensing chamber 26 of the second-stage particle modifying device 21B shown in FIG. 5, and, by heating to 453 K at atmospheric pressure using the heating device 7, a vapor of 1,3-propanedisulfonyl chloride was produced. Then the foregoing base particles with 1,12-diaminodecane condensed thereon, along with the argon gas, were cooled and introduced through the particle introducing pipe 24 into the vapor atmosphere of 1,3-propanedisulfonyl chloride in the condensing chamber 26.

Next, in the mixing section 22, the vapor atmosphere of 1,3-propanedisulfonyl chloride was cooled, and the introduced base particles were exposed thereto for 10 minutes. Consequently, a polymerization reaction took place on the surface of the base particles between 1,12-diaminodecane and 1,3-propanedisulfonyl chloride, forming a film of 1,12-diaminodecane-1,3-propanedisulfonyl chloride co-polymer.

Formation of the foregoing co-polymer film yielded modified particles (34) according to the present embodiment. In other words, the modified particles (34) were obtained by the same method as in Example 33. When measured by the optical detecting device 3, the modified particles (34) were found to be substantially uniform in quality and size, with a primary diameter of 3 μm.

EXAMPLE 35

First, in the particle modifying device 1A shown in FIG. 4, 2,5-diamino-1,4-benzenedithiol, as the monomer A, was supplied to the condensing chamber 2. The interior of the condensing chamber 2 was pressurized through the pressurizing/depressurizing opening 6, and heated to 530 K by the heating device 7, producing a vapor of 2,5-diamino-1,4-benzenedithiol.

Then, as the base particles, titanium oxide particles having a primary diameter of 0.5 μm were introduced, along with nitrogen gas, through the particle intake 4 into the vapor atmosphere of 2,5-diamino-1,4-benzenedithiol in the condensing chamber 2.

Next, the 2,5-diamino-1,4-benzenedithiol vapor in the condensing chamber 2 was adiabatically expanded, and the introduced base particles were exposed thereto for 3 minutes. Consequently, 2,5-diamino-1,4-benzenedithiol condensed on the surface of the base particles.

Next, in the particle modifying device 1 shown in FIG. 4, 1,4-butanedisulfonyl chloride, as the monomer B, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then the foregoing base particles with 2,5-diamino-1,4-benzenedithiol condensed thereon were introduced, along with the nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced base particles were exposed thereto for 8 minutes. Consequently, a polymerization reaction between 2,5-diamino-1,4-benzenedithiol and 1,4-butanedisulfonyl chloride took place on the surface of the base particles, forming a film of 2,5-diamino-1,4-benzenedithiol-1,4-butanedisulfonyl chloride co-polymer.

Formation of the foregoing co-polymer film yielded modified particles (35) according to the present embodiment. When measured by the optical detecting device 3, the modified particles (35) were found to be substantially uniform in quality and size, with a primary diameter of 3 μm.

EXAMPLE 36

First, 6-amino-2-mercaptobenzothiazole, as the monomer A, was mixed with triethylamine as a catalyst, forming base particles with an average geometric diameter of 1.5 μm.

Next, as the monomer B, 1,4-butanedisulfonyl chloride was supplied to the condensing chamber 2 of the particle modifying device 1 shown in FIG. 1. The interior of the condensing chamber 2 was pressurized through the pressurizing/depressurizing opening 6, and heated to 473 K by the heating device 7, producing a vapor of 1,4-butanedisulfonyl chloride.

Then the base particles were introduced, along with argon gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced base particles were exposed thereto for 15 minutes. Consequently, 1,4-butanedisulfonyl chloride condensed on the surface of the base particles. A polymerization reaction, using as a catalyst triethylamine contained in the base particles, took place between 1,4-butanedisulfonyl chloride condensed on the surface of the base particles and 6-amino-2-mercaptobenzothiazole contained therein, forming a film of 6-amino-2-mercaptobenzothiazole-1,4-butanedisulfonyl chloride co-polymer on the surface of the base particles.

Formation of the foregoing co-polymer film yielded modified particles (36) according to the present embodiment. When measured by the optical detecting device 3, the modified particles (36) were found to be substantially uniform in quality and size, with a primary diameter of 3 µm.

EXAMPLE 37

First, 4,4'-stilbenedisulfonyl chloride, as the monomer A, was mixed with C.I. Pigment Blue 199 (Ciba-Geigy Japan Limited product; a phthalocyanine pigment), forming base particles with an average geometric diameter of 1 µm.

Next, as the monomer B, 4-aminocyclohexanol was supplied to the condensing chamber 2 of the particle modifying device 1A shown in FIG. 4. The interior of the condensing chamber 2 was pressurized through the pressurizing/depressurizing opening 6, and heated to 503 K by the heating device 7, producing a vapor of 4-aminocyclohexanol.

Then the base particles were introduced, along with nitrogen gas, through the particle intake 4 into the vapor atmosphere of 4-aminocyclohexanol in the condensing chamber 2.

Next, the 4-aminocyclohexanol vapor in the condensing chamber 2 was adiabatically expanded, and the introduced base particles were exposed thereto for 7 minutes. Consequently, 4-aminocyclohexanol condensed on the surface of the base particles.

In the particle modifying device 1 shown in FIG. 4, triethylamine, as a catalyst, was supplied to the condensing chamber 2. The interior of the condensing chamber 2 was pressurized through the pressurizing/depressurizing opening 6, and heated to 353 K by the heating device 7, producing a vapor of triethylamine. Then the foregoing base particles with 4-aminocyclohexanol condensed thereon were introduced, along with the nitrogen gas, through the particle intake 4 into the vapor atmosphere of triethylamine in the condensing chamber 2.

Next, the triethylamine vapor in the condensing chamber 2 was adiabatically expanded, and the introduced base particles were exposed thereto for 15 minutes. Consequently, triethylamine condensed on the surface of the base particles with 4-aminocyclohexanol previously condensed thereon. A polymerization reaction, using as a catalyst triethylamine condensed on the base particles, took place on the surface of the base particles between 4-aminocyclohexanol condensed on the surface thereof and 4,4'-stilbenedisulfonyl chloride contained therein, forming a film of 4,4'-stilbenedisulfonylchloride-4-aminocyclohexanol co-polymer on the surface of particles of C.I. Pigment Blue 199.

Formation of the foregoing co-polymer film yielded modified particles (37) according to the present embodiment. In other words, the modified particles were obtained by the same method as in Example 35. When measured by the optical detecting device 3, the modified particles (37) were found to be substantially uniform in quality and size, with a primary diameter of 2 µm.

EXAMPLE 38

First, using a solution of 2-amino-5-mercapto-1,3,4-thiadiazole, as the monomer A, and triethylenediamine dissolved in ethanol, base particles with an average geometric diameter of 1.5 µm were obtained.

Next, as the monomer B, 1,3-propanedisulfonyl chloride was supplied to the condensing chamber 2 of the particle modifying device 1 shown in FIG. 1. The interior of the condensing chamber 2 was pressurized through the pressurizing/depressurizing opening 6, and heated to 463 K by the heating device 7, producing a vapor of 1,3-propanedisulfonyl chloride.

Then the base particles were introduced, along with argon gas, through the particle intake 4 into the vapor atmosphere of 1,3-propanedisulfonyl chloride in the condensing chamber 2.

Next, the 1,3-propanedisulfonyl chloride vapor in the condensing chamber 2 was adiabatically expanded, and the introduced base particles were exposed thereto for 10 minutes. Consequently, 1,3-propanedisulfonyl chloride condensed on the surface of the base particles. A polymerization reaction took place between 1,3-propanedisulfonyl chloride condensed on the surface of the base particles and 2-amino-5-mercapto-1,3,4-thiadiazole contained therein, forming a film of 2-amino-5-mercapto-1,3,4-thiadiazole-1,3-propanedisulfonyl chloride co-polymer on the surface of the base particles.

Formation of the foregoing co-polymer film yielded modified particles (38) according to the present embodiment. When measured by the optical detecting device 3, the modified particles (38) were found to be substantially uniform in quality and size, with a primary diameter of 3 µm.

EXAMPLE 39

First, in the particle modifying device 1A shown in FIG. 4, 1,4-butanedisulfonyl chloride, as the monomer A, was supplied to the condensing chamber 2. The interior of the condensing chamber 2 was pressurized through the pressurizing/depressurizing opening 6, and heated to 473 K by the heating device 7, producing a vapor of 1,4-butanedisulfonyl chloride.

Then, as the base particles, the modified particles (35) obtained in Example 35 (primary diameter: 3 µm) were introduced, along with nitrogen gas, through the particle intake 4 into the vapor atmosphere of 1,4-butanedisulfonyl chloride in the condensing chamber 2.

Next, the 1,4-butanedisulfonyl chloride vapor in the condensing chamber 2 was adiabatically expanded, and the introduced modified particles (35) were exposed thereto for 4 minutes. Consequently, 1,4-butanedisulfonyl chloride condensed on the surface of the modified particles (35).

Next, in the particle modifying device 1 shown in FIG. 4, 2,5-diamino-1,4-benzenedithiol, as the monomer B, was supplied to the condensing chamber 2. The interior of the condensing chamber 2 was pressurized through the pressurizing/depressurizing opening 6, and heated to 453 K by the heating device 7, producing a vapor of 2,5-diamino-1,4-benzenedithiol. Then the modified particles (35) with 1,4-butanedisulfonyl chloride condensed thereon were introduced, along with the nitrogen gas, through the particle intake 4 into the vapor atmosphere of 2,5-diamino-1,4-benzenedithiol in the condensing chamber 2.

Next, the 2,5-diamino-1,4-benzenedithiol vapor in the condensing chamber 2 was adiabatically expanded, and the introduced modified particles (35) were exposed thereto for 18 minutes. Consequently, a further polymerization reaction between 1,4-butanedisulfonyl chloride and 2,5-diamino-1,4-benzenedithiol took place on the surface of the modified particles (35), forming a film of 1,4-butanedisulfonylchloride-2,5-diamino-1,4-benzenedithiol co-polymer.

Formation of the foregoing co-polymer film yielded modified particles (39) according to the present embodiment. In other words, the modified particles (39) were obtained by the same method as in Example 35. When measured by the optical detecting device 3, the modified particles (39) were found to be substantially uniform in quality and size, with a primary diameter of 5 µm.

EXAMPLE 40

First, in the particle modifying device 1A shown in FIG. 4, 2,4-mesitylenedisulfonyl chloride, as the monomer A, was supplied to the condensing chamber 2, and, by heating to 493 K at atmospheric pressure by the heating device 7, a vapor of 2,4-mesitylenedisulfonyl chloride was produced.

Then, as the base particles, the modified particles (37) obtained in Example 37 (primary diameter: 2 µm) were introduced, along with nitrogen gas, through the particle intake 4 into the vapor atmosphere of 2,4-mesitylenedisulfonyl chloride in the condensing chamber 2.

Next, the 2,4-mesitylenedisulfonyl chloride vapor in the condensing chamber 2 was adiabatically expanded, and the introduced modified particles (37) were exposed thereto for 3 minutes. Consequently, 2,4-mesitylenedisulfonyl chloride condensed on the surface of the modified particles (37).

Next, 2-mercaptoethanol, as the monomer B, was mixed with triethanolamine as a catalyst, with a volume ratio of 5 to 1. The mixture obtained thereby was supplied to the condensing chamber 2 of the particle modifying device 1 shown in FIG. 4. The interior of the condensing chamber 2 was pressurized through the pressurizing/depressurizing opening 6, and heated to 453 K by the heating device 7, producing a mixed vapor of 2-mercaptoethanol and triethanolamine.

Then the modified particles (37) with 2,4-mesitylenedisulfonyl chloride condensed thereon were introduced, along with the nitrogen gas, through the particle intake 4 into the mixed vapor atmosphere of 2-mercaptoethanol and triethanolamine in the condensing chamber 2.

Next, the mixed vapor of 2-mercaptoethanol and triethanolamine in the condensing chamber 2 was adiabatically expanded, and the introduced modified particles (37) were exposed thereto for 30 minutes. Consequently, a further polymerization reaction, using triethanolamine as a catalyst, took place on the surface of the modified particles (37) between 2,4-mesitylenedisulfonyl chloride and 2-mercaptoethanol, forming a film of 2,4-mesitylenedisulfonylchloride-2-mercaptoethanol co-polymer.

Formation of the foregoing co-polymer film yielded modified particles (40) according to the present embodiment. In other words, the modified particles (40) were obtained by the same method as in Example 19. When measured by the optical detecting device 3, the modified particles (40) were found to be substantially uniform in quality and size, with a primary diameter of 4 µm.

EXAMPLE 41

First, as the monomer B, 1,4-benzenedisulfonyl chloride was placed in the reservoir section 26c of the condensing chamber 26 of the particle modifying device 21 shown in FIG. 2, and, by heating to 493 K at atmospheric pressure using the heating device 7, a vapor of 1,4-benzenedisulfonyl chloride was produced.

The base particles used were a mixture of C.I. Acid Red 8 (Tokyo Kasei Kogyo Co., Ltd. product), triethylenediamine as a catalyst, 4-aminocyclohexanol as the monomer A, and water dissolving the foregoing. These base particles had an average geometric diameter of 4 µm.

The base particles, along with helium gas, were cooled and introduced through the particle intake 4 into the vapor atmosphere of 1,4-benzenedisulfonyl chloride in the condensing chamber 26.

Next, in the mixing section 22, the vapor of 1,4-benzenedisulfonyl chloride was cooled, and the introduced base particles were exposed thereto for 10 minutes. Consequently, a polymerization reaction using triethylenediamine as a catalyst took place on the surface of the base particles between 4-aminocyclohexanol and 1,4-benzenedisulfonyl chloride, forming a film of 4-aminocyclohexanol-1,4-benzenedisulfonyl chloride co-polymer.

Formation of the foregoing co-polymer film yielded modified particles (41) according to the present embodiment. When measured by the optical detecting device 3, the modified particles (41) were found to be substantially uniform in quality and size, with a primary diameter of 5 µm.

EXAMPLE 42

First, in the first-stage particle modifying device 21A shown in FIG. 5, 1,4-benzenedisulfonyl chloride, as the monomer A, was placed in the reservoir section 26c of the condensing chamber 26, and, by heating to 493 K at atmospheric pressure using the heating device 7, a vapor of 1,4-benzenedisulfonyl chloride was produced.

The base particles used were a mixture of carbon black and polystyrene resin. These base particles had an average geometric diameter of 2 µm.

The base particles, along with argon gas, were cooled and introduced through the particle intake 4 into the vapor atmosphere of 1,4-benzenedisulfonyl chloride in the condensing chamber 26.

Next, in the mixing section 22, the vapor of 1,4-benzenedisulfonyl chloride was cooled, and the introduced base particles were exposed thereto for 10 minutes. Consequently, 1,4-benzenedisulfonyl chloride condensed on the surface of the base particles.

Next, 2-mercaptoethanol, as the monomer B, was mixed with triethanolamine as a catalyst, with a volume ratio of 5 to 1. The mixture obtained thereby was placed in the reservoir section 26c of the condensing chamber 26 of the second-stage particle modifying device 21B shown in FIG. 5, and, by heating to 453 K at atmospheric pressure using the heating device 7, a mixed vapor of 2-mercaptoethanol and triethanolamine was produced. Then the foregoing base particles with 1,4-benzenedisulfonyl chloride condensed thereon, along with the argon gas, were cooled and introduced through the particle introducing pipe 24 into the mixed vapor atmosphere of 2-mercaptoethanol and triethanolamine in the condensing chamber 26.

Next, in the mixing section 22, the mixed vapor atmosphere of 2-mercaptoethanol and triethanolamine was cooled, and the introduced base particles were exposed thereto for 10 minutes. Consequently, a polymerization reaction using triethanolamine as a catalyst took place on the surface of the base particles between 1,4-benzenedisulfonyl chloride and 2-mercaptoethanol, forming a film of 1,4-benzenedisulfonylchloride-2-mercaptoethanol co-polymer.

Formation of the foregoing co-polymer film yielded modified particles (42) according to the present embodiment. When measured by the optical detecting device 3, the modified particles (42) were found to be substantially uniform in quality and size, with a primary diameter of 3 μm.

EXAMPLE 43

First, in the first-stage particle modifying device 21A shown in FIG. 5, 2,4-mesitylenedisulfonyl chloride, as the monomer B, was placed in the reservoir section 26c of the condensing chamber 26, and, by heating to 493 K at atmospheric pressure using the heating device 7, a vapor of 2,4-mesitylenedisulfonyl chloride was produced.

The base particles used were a mixture of C.I. Acid Blue 92 (Tokyo Kasei Kogyo Co., Ltd. product), sodium hydroxide, 1,4-dimercapto-2,3-butanediol as the monomer A, and water dissolving the foregoing. These base particles had an average geometric diameter of 2.5 μm.

The base particles, along with argon gas, were cooled and introduced through the particle intake 4 into the vapor atmosphere of 2,4-mesitylenedisulfonyl chloride in the condensing chamber 26.

Next, in the mixing section 22, the vapor of 2,4-mesitylenedisulfonyl chloride was cooled, and the introduced base particles were exposed thereto for 15 minutes. Consequently, 2,4-mesitylenedisulfonyl chloride condensed on the surface of the base particles.

Next, 1,3-propanedisulfonyl chloride, as the monomer B, was placed in the reservoir section 26c of the condensing chamber 26 of the second-stage particle modifying device 21B shown in FIG. 5, and, by heating to 463 K at atmospheric pressure using the heating device 7, a vapor of 1,3-propanedisulfonyl chloride was produced. Then the foregoing base particles with 2,4-mesitylenedisulfonyl chloride condensed thereon, along with the argon gas, were cooled and introduced through the particle introducing pipe 24 into the vapor atmosphere of 1,3-propanedisulfonyl chloride in the condensing chamber 26.

Next, in the mixing section 22, the vapor atmosphere of 1,3-propanedisulfonyl chloride was cooled, and the introduced base particles were exposed thereto for 15 minutes. Consequently, a polymerization reaction took place on the surface of the base particles between 2,4-mesitylenedisulfonyl chloride and 1,3-propanedisulfonyl chloride, on the one hand, and 1,4-dimercapto-2,3-butanediol on the other, forming a film of a co-polymer of 2,4-mesitylenedisulfonyl chloride and 1,3-propanedisulfonyl chloride, on the one hand, and 1,4-dimercapto-2,3-butanediol on the other.

Formation of the foregoing co-polymer film yielded modified particles (43) according to the present embodiment. In other words, the modified particles (43) were obtained by the same method as in Example 26. When measured by the optical detecting device 3, the modified particles (43) were found to be substantially uniform in quality and size, with a primary diameter of 4 μm.

[Fourth Embodiment]

The following will explain a method of manufacturing modified particles according to the fourth embodiment of the present invention. In the present method, instead of the respective monomers A and B used in the methods set forth in the first through third embodiments above, one of the monomers A and B is a compound X having at least two isocyanate groups or two isothiocyanate groups, and the other of the monomers A and B is a compound Y having a functional group forming a cross-linked structure by a bond with an isocyanate group or an isothiocyanate group (hereinafter referred to as "combination E").

Alternatively, in another method of manufacturing modified particles according to the fourth embodiment, instead of the respective monomers A and B used in the methods set forth in the first through third embodiments above, one of the monomers A and B is a compound Z having two or more halogenated acyl groups, and the other of the monomers A and B is a compound Y having a functional group forming a cross-linked structure by a bond with a halogenated acyl group (hereinafter referred to as "combination F").

The compound Y is a compound, discussed in the third embodiment above, which has as functional groups two or more hydroxyl groups, two or more mercapto groups, two or more primary and/or secondary amino groups, or at least two functional groups chosen from among a hydroxyl group, a mercapto group, a primary amino group, and a secondary amino group. In the method of manufacturing modified particles according to the fourth embodiment, the manufacturing devices discussed in each of the first through third embodiments above, for example, may be suitably used.

Specific examples of the foregoing compound having two or more isocyanate groups (hereinafter referred to as "compound $X_1$") include 1,6-diisocyanate hexane, 1,4-diisocyanate butane, 1,3-phenylenediisocyanate, 1,4-phenylenediisocyanate, toluene-2,4-diisocyanate, toluene-2,6-diisocyanate, 4,4'-diisocyanate-3,3'-dimethylbiphenyl, 4,4'-diisocyanate-3,3'-dimethyldiphenyl methane, isophoronediisocyanate, 3,3'-dichlorodiphenyl-4,4'-diisocyanate, 4,4'-diphenylmethanediisocyanate, and dicyclohexylmethane-4,4'-diisocyanate.

Specific examples of the foregoing compound having two or more isothiocyanate groups (hereinafter referred to as "compound $X_2$") include 1,4-phenylenediisothiocyanate and silicontetraisothiocyanate.

Specific examples of the compound Z, having two or more halogenated acyl groups, include adipoyl chloride, sebacoyl chloride, terephthaloyl chloride, and isophthaloyl chloride. In the combination of the compound Z and the compound Y, it is preferable if the compound Y has two or more hydroxyl groups and/or mercapto groups.

Specific examples of the compound Y include the foregoing compounds A, B, C, and D. Further, the foregoing compounds $X_1$, $X_2$, Y, and Z may be compounds in which a saturated aliphatic hydrocarbon, an unsaturated aliphatic hydrocarbon, a saturated aromatic hydrocarbon, an unsaturated aromatic hydrocarbon, a saturated heterocyclic compound, or an unsaturated heterocyclic compound includes two or more of the respective functional groups, i.e. isocyanate groups, isothiocyanate groups, halogenated acyl groups, mercapto groups, hydroxyl groups, primary amino groups, and secondary amino groups, or includes one each of two or more kinds of functional group, chosen from among a mercapto group, a hydroxyl group, a primary amino group, and a secondary amino group.

Here, when a saturated aliphatic hydrocarbon, unsaturated aliphatic hydrocarbon, saturated aromatic hydrocarbon, unsaturated aromatic hydrocarbon, saturated heterocyclic compound, or unsaturated heterocyclic compound referred to above as "compound (I)" or "compound (II)" includes one of the foregoing functional groups in its structure, it is sufficient if the compound includes a total of two or more functional groups (including the foregoing functional group).

In combination E of the compound X and the compound Y, the compound $X_1$ or $X_2$ and the compound Y may be either the monomer A or the monomer B; and in combination F of the compound Z and the compound Y, the compound Z and the compound Y may be either the monomer A or the monomer B. In other words, the modified particles according to the present fourth embodiment may be obtained by using the foregoing compounds specified in combination E or combination F as the combination of the monomer A and the monomer B.

Of the compounds listed above as examples of the compounds $X_1$, $X_2$, Z, and Y, a single compound may be used alone for the monomer substance, or two or more compounds may be used. In other words, the film of surface modification agent obtained by polymerization of the monomers A and B may be a co-polymer obtained by polymerization of three or more compounds. However, the three or more compounds used must be divisible into the monomers A and B, and must fall under combination E or combination F.

In the method of manufacturing modified particles according to the present fourth embodiment, the substances used for the monomers A and B are the respective compounds of combination E or combination F. Consequently, reactivity between the functional groups of the monomer A and the functional groups of the monomer B is improved, and thus the polymerization reaction proceeds faster than when other combinations of monomers are used, and a polymer film can be formed more easily on the surface of the base particles.

It is preferable if the monomers A and B are liquid at room temperature and atmospheric pressure. By this means, it is easier to obtain super-saturated vapors of the monomers, and easier to introduce the monomers into the particle modifying device which performs surface modification. With the monomer B, in particular, in order to obtain a super-saturated vapor thereof, the monomer B should preferably be liquid at room temperature and atmospheric pressure. Further, using a monomer A which is also liquid at room temperature and atmospheric pressure has the advantage that it is easy to include the monomer A in the base particles.

A polymerization reaction between the monomers A and B takes place through contact of the respective monomer substances, but when a polymerization reaction is difficult to induce, as in the foregoing embodiments, a catalyst may be used as necessary. By using such a catalyst, the polymerization reaction can be expedited. The catalyst may be selected as needed, and may be either solid or liquid at room temperature and atmospheric pressure.

The method of adding the foregoing catalyst to the polymerization reaction system of the monomers A and B is not limited to any method in particular, and the methods discussed in the foregoing embodiments may be used.

In the method of manufacturing modified particles according to the fourth embodiment, the monomer A is included in the base particles. Examples of methods of adding the monomer A to the base particles include the methods discussed in the first through third embodiments above. Further, in the present method, as in the foregoing embodiments, the thickness of the polymer film can be adjusted by selecting, as necessary, processing conditions such as processing duration, etc.

Further, in the present method, as in the foregoing embodiments, the process for forming a polymer film by exposing the base particles to the super-saturated vapor of the monomer B can be performed a plurality of times. Consequently, it is possible to form a film of surface modification agent of a desired thickness, and to obtain modified particles of a desired diameter. Further, in the present method, by using surface modification agents of different composition each time the process is performed, it is easy to obtain highly functional modified particles which have a plurality of properties.

As discussed above, the modified particles according to the fourth embodiment have a structure obtained according to the foregoing method. By this means, modified particles, made of base particles on the surface of which is formed a film of surface modification agent made of a polymer obtained by polymerization of a monomer A and a monomer B, can be easily provided.

Further, with the foregoing structure, even if the base particles are, for example, liquid at room temperature and atmospheric pressure, the modified particles obtained are solid, and can thus be handled simply and easily. In other words, it is possible to provide modified particles which enable liquid base particles to be handled as solids. Moreover, modified particles having a film of surface modification agent (polymer) of a desired thickness, and highly functional modified particles, can be provided.

The modified particles according to the fourth embodiment, like those discussed in the first through third embodiments above, are suitable for use for such purposes as pharmaceuticals, cosmetics, paint and other coatings, printing inks, toners (developers), ceramics, electronic materials, etc.

In what follows, the present invention will be explained in greater detail by means of Examples 44 through 75 according to the fourth embodiment, but the present invention is not limited in any way by these specific Examples.

EXAMPLE 44

First, in the particle modifying device 1A shown in FIG. 4, 1,6-diisocyanate hexane, as the monomer A, was supplied to the condensing chamber 2. The interior of the condensing chamber 2 was pressurized through the pressurizing/depressurizing opening 6, and heated to 473 K by the heating device 7, producing a vapor of 1,6-diisocyanate hexane.

Then, as the base particles, titanium oxide particles having a primary diameter of 0.5 $\mu$m were introduced, along with nitrogen gas, through the particle intake 4 into the vapor atmosphere of 1,6-diisocyanate hexane in the condensing chamber 2.

Next, the 1,6-diisocyanate hexane vapor in the condensing chamber 2 was adiabatically expanded, and the introduced base particles were exposed thereto for 3 minutes. Consequently, 1,6-diisocyanate hexane condensed on the surface of the base particles.

Next, in the particle modifying device 1 shown in FIG. 4, 1,6-diaminohexane, as the monomer B, was supplied to the condensing chamber 2. The interior of the condensing chamber 2 was pressurized through the pressurizing/depressurizing opening 6, and heated to 423 K by the heating device 7, producing a vapor of 1,6-diaminohexane. Then the foregoing base particles with 1,6-diisocyanate hexane condensed thereon were introduced, along with the nitrogen gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced base particles were exposed thereto for 3 minutes. Consequently, a polymerization reaction between 1,6-diisocyanate hexane and 1,6-diaminohexane took place on the surface of the base particles, forming a film of 1,6-diisocyanatehexane-1,6-diaminohexane co-polymer.

Formation of the foregoing co-polymer film yielded modified particles (44) according to the present embodiment. When measured by the optical detecting device 3, the modified particles (44) were found to be substantially uniform in quality and size, with a primary diameter of 3 $\mu$m.

EXAMPLE 45

First, 1,3-phenylenediisocyanate, as the monomer A, was mixed with carbon black, forming base particles with an average geometric diameter of 1 µm.

Next, as the monomer B, 1,6-diaminohexane was supplied to the condensing chamber 2 of the particle modifying device 1 shown in FIG. 1. The interior of the condensing chamber 2 was pressurized through the pressurizing/depressurizing opening 6, and heated to 423 K by the heating device 7, producing a vapor of 1,6-diaminohexane.

Then the base particles were introduced, along with nitrogen gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced base particles were exposed thereto for 3 minutes. Consequently, 1,6-diaminohexane condensed on the surface of the base particles. A polymerization reaction took place between 1,6-diaminohexane condensed on the surface of the base particles and 1,3-phenylenediisocyanate contained therein, forming a film of 1,3-phenylenediisocyanate-1,6-diaminohexane co-polymer on the surface of the base particles.

Formation of the foregoing co-polymer film yielded modified particles (45) according to the present embodiment. When measured by the optical detecting device 3, the modified particles (45) were found to be substantially uniform in quality and size, with a primary diameter of 2 µm.

EXAMPLE 46

First, piperazine, as the monomer A, was mixed with C.I. Pigment Blue 199 (Ciba-Geigy Japan Limited product; a phthalocyanine pigment), forming base particles with an average geometric diameter of 1 µm.

Next, as the monomer B, 1,4-diisocyanate butane was supplied to the condensing chamber 2 of the particle modifying device 1 shown in FIG. 1. The interior of the condensing chamber 2 was pressurized through the pressurizing/depressurizing opening 6, and heated to 413 K by the heating device 7, producing a vapor of 1,4-diisocyanate butane.

Then the base particles were introduced, along with nitrogen gas, through the particle intake 4 into the vapor atmosphere of 1,4-diisocyanate butane in the condensing chamber 2.

Next, the 1,4-diisocyanate butane vapor in the condensing chamber 2 was adiabatically expanded, and the introduced base particles were exposed thereto for 3 minutes. Consequently, 1,4-diisocyanate butane condensed on the surface of the base particles. A polymerization reaction took place between 1,4-diisocyanate butane condensed on the surface of the base particles and piperazine contained therein, forming a film of piperazine-1,4-diisocyanatebutane co-polymer on the surface of the base particles.

Formation of the foregoing co-polymer film yielded modified particles (46) according to the present embodiment. In other words, the modified particles (46) were obtained by the same method as in Example 45. When measured by the optical detecting device 3, the modified particles (46) were found to be substantially uniform in quality and size, with a primary diameter of 2 µm.

EXAMPLE 47

First, as the monomer A, particles of 1,4-phenylenediisocyanate with an average geometric diameter of 1 µm, which could also be used as the base particles, were used.

Next, as the monomer B, 1,3-diaminopropane was supplied to the condensing chamber 2 of the particle modifying device 1 shown in FIG. 1. The interior of the condensing chamber 2 was pressurized through the pressurizing/depressurizing opening 6, and heated to 373 K by the heating device 7, producing a vapor of 1,3-diaminopropane.

Then the base particles were introduced, along with argon gas, through the particle intake 4 into the vapor atmosphere of 1,3-diaminopropane in the condensing chamber 2.

Next, the 1,3-diaminopropane vapor in the condensing chamber 2 was adiabatically expanded, and the introduced base particles were exposed thereto for 2 minutes. Consequently, 1,3-diaminopropane condensed on the surface of the base particles. A polymerization reaction took place between 1,3-diaminopropane condensed on the surface of the base particles and the base particles of 1,4-phenylenediisocyanate, forming a film of 1,4-phenylenediisocyanate-1,3-diaminopropane co-polymer on the surface of the base particles.

Formation of the foregoing co-polymer film yielded modified particles (47) according to the present embodiment. In other words, the modified particles (47) were obtained by the same method as in Example 2. When measured by the optical detecting device 3, the modified particles (47) were found to be substantially uniform in quality and size, with a primary diameter of 2 µm.

EXAMPLE 48

First, in the particle modifying device 1A shown in FIG. 4, 1,6-diisocyanate hexane, as the monomer A, was supplied to the condensing chamber 2. The interior of the condensing chamber 2 was pressurized through the pressurizing/depressurizing opening 6, and heated to 423 K by the heating device 7, producing a vapor of 1,6-diisocyanate hexane.

Then, as the base particles, the modified particles (44) obtained in Example 44 (primary diameter: 3 µm) were introduced, along with nitrogen gas, through the particle intake 4 into the vapor atmosphere of 1,6-diisocyanate hexane in the condensing chamber 2.

Next, the 1,6-diisocyanate hexane vapor in the condensing chamber 2 was adiabatically expanded, and the introduced modified particles (44) were exposed thereto for 2 minutes. Consequently, 1,6-diisocyanate hexane condensed on the surface of the modified particles (44).

Next, in the particle modifying device 1 shown in FIG. 4, 1,6-diaminohexane, as the monomer B, was supplied to the condensing chamber 2. The interior of the condensing chamber 2 was pressurized through the pressurizing/depressurizing opening 6, and heated to 473 K by the heating device 7, producing a vapor of 1,6-diaminohexane. Then the modified particles (44) with 1,6-diisocyanate hexane condensed thereon were introduced, along with nitrogen gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced modified particles (44) were exposed thereto for 2 minutes. Consequently, a further polymerization reaction between 1,6-diisocyanate hexane and 1,6-diaminohexane took place on the surface of the modified particles (44), forming a film of 1,6-diisocyanatehexane-1,6-diaminohexane co-polymer.

Formation of the foregoing co-polymer film yielded modified particles (48) according to the present embodiment. In other words, the modified particles (48) were obtained by the same method as in Example 44. When measured by the optical detecting device 3, the modified particles (48) were found to be substantially uniform in quality and size, with a primary diameter of 5 μm.

EXAMPLE 49

First, in the particle modifying device 1A shown in FIG. 4, isophoronediisocyanate, as the monomer A, was supplied to the condensing chamber 2. The interior of the condensing chamber 2 was pressurized through the pressurizing/depressurizing opening 6, and heated to 443 K by the heating device 7, producing a vapor of isophoronediisocyanate.

Then, as the base particles, the modified particles (45) obtained in Example 45 (primary diameter: 2 μm) were introduced, along with nitrogen gas, through the particle intake 4 into the vapor atmosphere of isophoronediisocyanate in the condensing chamber 2.

Next, the isophoronediisocyanate vapor in the condensing chamber 2 was adiabatically expanded, and the introduced modified particles (45) were exposed thereto for 2 minutes. Consequently, isophoronediisocyanate condensed on the surface of the modified particles (45).

Next, in the particle modifying device 1 shown in FIG. 4, piperazine, as the monomer B, was supplied to the condensing chamber 2. The interior of the condensing chamber 2 was pressurized through the pressurizing/depressurizing opening 6, and heated to 403 K by the heating device 7, producing a vapor of piperazine. Then the modified particles (45) with isophoronediisocyanate condensed thereon were introduced, along with the nitrogen gas, through the particle intake 4 into the vapor atmosphere of piperazine in the condensing chamber 2.

Next, the piperazine vapor in the condensing chamber 2 was adiabatically expanded, and the introduced modified particles (45) were exposed thereto for 2 minutes. Consequently, a polymerization reaction between isophoronediisocyanate and piperazine took place on the surface of the modified particles (45), forming a film of isophoronediisocyanate-piperazine co-polymer.

Formation of the foregoing co-polymer film yielded modified particles (49) according to the present embodiment. In other words, the modified particles (49) were obtained by the same method as in Example 44. When measured by the optical detecting device 3, the modified particles (49) were found to be substantially uniform in quality and size, with a primary diameter of 3.5 μm.

EXAMPLE 50

First, as the monomer B, 1,4-diisocyanate butane was placed in the condensing chamber 26 of the particle modifying device 21 shown in FIG. 2, and, by heating to 393 K at atmospheric pressure using the heating device 7, a vapor of 1,4-diisocyanate butane was produced.

The base particles used were a mixture of C.I. Acid Red 8 (Tokyo Kasei Kogyo Co., Ltd. product) and a mixed solution of water to dissolve the C.I. Acid Red 8, ethylene glycol, and 1,3-diaminopropane as the monomer A. These base particles had an average geometric diameter of 3 μm.

The base particles, along with helium gas, were cooled and introduced through the particle intake 4 into the vapor atmosphere of 1,4-diisocyanate butane in the condensing chamber 26. Next, in the mixing section 22, the vapor of 1,4-diisocyanate butane was cooled, and the introduced base particles were exposed thereto for 1 minute. Consequently, a polymerization reaction took place on the surface of the base particles between 1,3-diaminopropane and 1,4-diisocyanate butane, forming a film of 1,3-diaminopropane-1,4-diisocyanatebutane co-polymer.

Formation of the foregoing co-polymer film yielded modified particles (50) according to the present embodiment. When measured by the optical detecting device 3, the modified particles (50) were found to be substantially uniform in quality and size, with a primary diameter of 4 μm.

EXAMPLE 51

First, in the first-stage particle modifying device 21A shown in FIG. 5, 1,6-diisocyanate hexane, as the monomer A, was placed in the reservoir section 26c of the condensing chamber 26, and, by heating to 453 K at atmospheric pressure using the heating device 7, a vapor of 1,6-diisocyanate hexane was produced.

The base particles used were a mixture of carbon black and polystyrene resin. These base particles had an average geometric diameter of 1 μm.

The base particles, along with argon gas, were cooled and introduced through the particle intake 4 into the vapor atmosphere of 1,6-diisocyanate hexane in the mixing section 22. Next, the vapor of 1,6-diisocyanate hexane was cooled, and the introduced base particles were exposed thereto for 1 minute. Consequently, 1,6-diisocyanate hexane condensed on the surface of the base particles.

Next, 1,10-diaminodecane, as the monomer B, was placed in the condensing chamber 26 of the second-stage particle modifying device 21B shown in FIG. 5, and, by heating to 473 K at atmospheric pressure using the heating device 7, a vapor of 1,10-diaminodecane was produced.

Then the foregoing base particles with 1,6-diisocyanate hexane condensed thereon, along with the argon gas, were cooled and introduced through the particle introducing pipe 24 into the vapor atmosphere of 1,10-diaminodecane in the condensing chamber 26.

Next, in the mixing section 22, the vapor atmosphere of 1,10-diaminodecane was cooled, and the introduced base particles were exposed thereto for 1 minute. Consequently, a polymerization reaction took place on the surface of the base particles between 1 6-diisocyanate hexane and 1,10-diaminodecane, forming a film of 1,6 -diisocyanatehexane-1,10-diaminodecane co-polymer.

Formation of the foregoing co-polymer film yielded modified particles (51) according to the present embodiment. When measured by the optical detecting device 3, the modified particles (51) were found to be substantially uniform in quality and size, with a primary diameter of 3 μm.

EXAMPLE 52

First, in the first-stage particle modifying device 21A shown in FIG. 5, 1,12-diaminodecane, as the monomer A, was placed in the condensing chamber 26, and, by heating to 493 K at atmospheric pressure using the heating device 7, a vapor of 1,12-diaminodecane was produced.

The base particles used were a mixture of C.I. Acid Blue 92 (Tokyo Kasei Kogyo Co., Ltd. product; a dye) and water dissolving the dye. These base particles had an average geometric diameter of 1.5 μm.

The base particles, along with helium gas, were cooled and introduced through the particle intake 4 into the vapor atmosphere of 1,12-diaminodecane in the mixing section 22. Next, the vapor of 1,12-diaminodecane was cooled, and the introduced base particles were exposed thereto for 2 minutes. Consequently, 1,12-diaminodecane condensed on the surface of the base particles.

Next, toluene-2,6-diisocyanate, as the monomer B, was placed in the condensing chamber 26 of the second-stage particle modifying device 21B shown in FIG. 5, and, by heating to 433 K at atmospheric pressure using the heating device 7, a vapor of toluene-2,6-diisocyanate was produced.

Then the foregoing base particles with 1,12-diaminodecane condensed thereon, along with the argon gas, were cooled and introduced through the particle introducing pipe 24 into the vapor atmosphere of toluene-2,6-diisocyanate in the mixing section 22.

Next, in the mixing section 22, the vapor atmosphere of toluene-2,6-diisocyanate was cooled, and the introduced base particles were exposed thereto for 2 minutes. Consequently, a polymerization reaction took place on the surface of the base particles between 1,12-diaminodecane and toluene-2,6-diisocyanate, forming a film of 1,12-diaminodecane-toluene-2,6-diisocyanate co-polymer.

Formation of the foregoing co-polymer film yielded modified particles (52) according to the present embodiment. In other words, the modified particles (52) were obtained by the same method as in Example 51. When measured by the optical detecting device 3, the modified particles (52) were found to be substantially uniform in quality and size, with a primary diameter of 3 µm.

EXAMPLE 53

First, as the monomer A, particles of 1,4-phenylenediisocyanate with an average geometric diameter of 2 µm, which could also be used as the base particles, were used.

Next, as the monomer B, 1,6-diaminohexane was supplied to the condensing chamber 2 of the particle modifying device 1 shown in FIG. 1. The interior of the condensing chamber 2 was pressurized through the pressurizing/depressurizing opening 6, and heated to 443 K by the heating device 7, producing a vapor of 1,6-diaminohexane.

Then the base particles were introduced, along with helium gas, through the particle intake 4 into the vapor atmosphere of 1,6-diaminohexane in the condensing chamber 2.

Next, the 1,6-diaminohexane vapor in the condensing chamber 2 was adiabatically expanded, and the introduced base particles were exposed thereto for 2 minutes. Consequently, 1,6-diaminohexane condensed on the surface of the base particles. A polymerization reaction took place between 1,6-diaminohexane condensed on the surface of the base particles and the base particles of 1,4-phenylenediisocyanate, forming a film of 1,4-phenylenediisocyanate-1,6-diaminohexane co-polymer on the surface of the base particles.

Formation of the foregoing co-polymer film yielded modified particles (53) according to the present embodiment. In other words, the modified particles (53) were obtained by the same method as in Example 45. When measured by the optical detecting device 3, the modified particles (53) were found to be substantially uniform in quality and size, with a primary diameter of 3 µm.

EXAMPLE 54

First, ethylene glycol, as the monomer A, was mixed with triethylamine as a catalyst, with a volume ratio of 100 to 1. This mixture was supplied to the condensing chamber 2 of the particle modifying device 1A shown in FIG. 4. The interior of the condensing chamber 2 was pressurized through the pressurizing/depressurizing opening 6, and heated to 443 K by the heating device 7, producing a mixed vapor of ethylene glycol and triethylamine.

Then, as the base particles, titanium oxide particles having a primary diameter of 0.3 µm were introduced, along with nitrogen gas, through the particle intake 4 into the mixed vapor atmosphere of ethylene glycol and triethylamine in the condensing chamber 2.

Next, the mixed vapor of ethylene glycol and triethylamine in the condensing chamber 2 was adiabatically expanded, and the introduced base particles were exposed thereto for 3 minutes. Consequently, ethylene glycol and triethylamine condensed on the surface of the base particles.

Next, in the particle modifying device 1 shown in FIG. 4, adipoyl chloride, as the monomer B, was supplied to the condensing chamber 2. The interior of the condensing chamber 2 was pressurized through the pressurizing/depressurizing opening 6, and heated to 423 K by the heating device 7, producing a vapor of adipoyl chloride. Then the foregoing base particles with ethylene glycol and triethylamine condensed thereon were introduced, along with the nitrogen gas, through the particle intake 4 into the vapor atmosphere of adipoyl chloride in the condensing chamber 2.

Next, the adipoyl chloride vapor in the condensing chamber 2 was adiabatically expanded, and the introduced base particles were exposed thereto for 3 minutes. Consequently, a polymerization reaction, using as a catalyst triethylamine condensed on the surface of the base particles, took place on the surface of the base particles between ethylene glycol and adipoyl chloride, forming a film of ethylene glycol-adipoyl chloride copolymer.

Formation of the foregoing co-polymer film yielded modified particles (54) according to the present embodiment. When measured by the optical detecting device 3, the modified particles (54) were found to be substantially uniform in quality and size, with a primary diameter of 4 µm.

EXAMPLE 55

First, 1,4-hydroquinone, as the monomer A, was mixed with carbon black and triethylamine as a catalyst, forming base particles with an average geometric diameter of 2 µm.

Next, as the monomer B, adipoyl chloride was supplied to the condensing chamber 2 of the particle modifying device 1 shown in FIG. 1. The interior of the condensing chamber 2 was pressurized through the pressurizing/depressurizing opening 6, and heated to 423 K by the heating device 7, producing a vapor of adipoyl chloride.

Then the base particles were introduced, along with nitrogen gas, through the particle intake 4 into the vapor atmosphere of adipoyl chloride in the condensing chamber 2.

Next, the adipoyl chloride vapor in the condensing chamber 2 was adiabatically expanded, and the introduced base particles were exposed thereto for 3 minutes. Consequently, adipoyl chloride condensed on the surface of the base particles. A polymerization reaction, using as a catalyst triethylamine contained in the base particles, took place between adipoyl chloride condensed on the surface of the base particles and 1,4-hydroquinone contained therein, forming a film of 1,4-hydroquinone-adipoyl chloride co-polymer on the surface of the base particles.

Formation of the foregoing co-polymer film yielded modified particles (55) according to the present embodiment. When measured by the optical detecting device 3, the modified particles (55) were found to be substantially uniform in quality and size, with a primary diameter of 4 μm.

EXAMPLE 56

First, 1,6-hexanediol, as the monomer A, was mixed with C.I. Pigment Blue 199 (Ciba-Geigy Japan Limited product; a phthalocyanine pigment) and triethylamine as a catalyst, forming base particles with an average geometric diameter of 2 μm.

Next, as the monomer B, adipoyl chloride was supplied to the condensing chamber 2 of the particle modifying device 1 shown in FIG. 1. The interior of the condensing chamber 2 was pressurized through the pressurizing/depressurizing opening 6, and heated to 423 K by the heating device 7, producing a vapor of adipoyl chloride.

Then the base particles were introduced, along with nitrogen gas, through the particle intake 4 into the vapor atmosphere of adipoyl chloride in the condensing chamber 2.

Next, the adipoyl chloride vapor in the condensing chamber 2 was adiabatically expanded, and the introduced base particles were exposed thereto for 3 minutes. Consequently, adipoyl chloride condensed on the surface of the base particles. A polymerization reaction, using as a catalyst triethylamine contained in the base particles, took place between adipoyl chloride condensed on the surface of the base particles and 1,6-hexanediol contained therein, forming a film of 1,6-hexanediol-adipoyl chloride co-polymer on the surface of the base particles.

Formation of the foregoing co-polymer film yielded modified particles (56) according to the present embodiment. In other words, the modified particles (56) were obtained by the same method as in Example 55. When measured by the optical detecting device 3, the modified particles (56) were found to be substantially uniform in quality and size, with a primary diameter of 3 μm.

EXAMPLE 57

First, as the monomer A, particles of bisphenol A with an average geometric diameter of 2 μm, which could also be used as the base particles, were used.

Next, as the monomer B, terephthaloyl chloride was supplied to the condensing chamber 2 of the particle modifying device 1 shown in FIG. 1. The interior of the condensing chamber 2 was pressurized through the pressurizing/depressurizing opening 6, and heated to 473 K by the heating device 7, producing a vapor of terephthaloyl chloride.

Then the base particles were introduced, along with argon gas, through the particle intake 4 into the vapor atmosphere of terephthaloyl chloride in the condensing chamber 2.

Next, the terephthaloyl chloride vapor in the condensing chamber 2 was adiabatically expanded, and the introduced base particles were exposed thereto for 2 minutes. Consequently, terephthaloyl chloride condensed on the surface of the base particles. A polymerization reaction took place between terephthaloyl chloride condensed on the surface of the base particles and bisphenol A of the base particles, forming a film of bisphenol A—terephthaloyl chloride co-polymer on the surface of the base particles.

Formation of the foregoing co-polymer film yielded modified particles (57) according to the present embodiment. In other words, the modified particles (57) were obtained by the same method as in Example 55. When measured by the optical detecting device 3, the modified particles (57) were found to be substantially uniform in quality and size, with a primary diameter of 4 μm.

EXAMPLE 58

First, in the particle modifying device 1A shown in FIG. 4, ethylene glycol, as the monomer A, was mixed with triethylamine as a catalyst, with a volume ratio of 100 to 1. The mixture obtained thereby was supplied to the condensing chamber 2. The interior of the condensing chamber 2 was pressurized through the pressurizing/depressurizing opening 6, and heated to 443 K by the heating device 7, producing a mixed vapor of ethylene glycol and triethylamine.

Then, as the base particles, the modified particles (54) obtained in Example 54 (primary diameter: 4 μm) were introduced, along with nitrogen gas, through the particle intake 4 into the mixed vapor atmosphere of ethylene glycol and triethylamine in the condensing chamber 2.

Next, the mixed vapor of ethylene glycol and triethylamine in the condensing chamber 2 was adiabatically expanded, and the introduced modified particles (54) were exposed thereto for 2 minutes. Consequently, ethylene glycol and triethylamine condensed on the surface of the modified particles (54).

Next, in the particle modifying device 1 shown in FIG. 4, sebacoyl chloride, as the monomer B, was supplied to the condensing chamber 2. The interior of the condensing chamber 2 was pressurized through the pressurizing/depressurizing opening 6, and heated to 423 K by the heating device 7, producing a vapor of sebacoyl chloride. Then the modified particles (54) with ethylene glycol and triethylamine condensed thereon were introduced, along with the nitrogen gas, through the particle intake 4 into the vapor atmosphere of sebacoyl chloride in the condensing chamber 2.

Next, the sebacoyl chloride vapor in the condensing chamber 2 was adiabatically expanded, and the introduced modified particles (54) were exposed thereto for 10 minutes. Consequently, a polymerization reaction, using as a catalyst triethylamine, took place on the surface of the base particles between ethylene glycol and sebacoyl chloride, forming a film of ethylenglycol-sebacoyl chloride co-polymer.

Formation of the foregoing co-polymer film yielded modified particles (58) according to the present embodiment. In other words, the modified particles (58) were obtained by the same method as in Example 54. When measured by the optical detecting device 3, the modified particles (58) were found to be substantially uniform in quality and size, with a primary diameter of 7 μm.

EXAMPLE 59

First, triethylene glycol, as the monomer A, was mixed with triethanolamine as a catalyst, with a volume ratio of 20 to 1. The mixture obtained thereby was supplied to the condensing chamber 2 in the particle modifying device 1A shown in FIG. 4. The interior of the condensing chamber 2 was pressurized through the pressurizing/depressurizing opening 6, and heated to 513 K by the heating device 7, producing a mixed vapor of triethylene glycol and triethanolamine.

Then, as the base particles, the modified particles (55) obtained in Example 55 (primary diameter: 4 μm) were introduced, along with nitrogen gas, through the particle intake 4 into the mixed vapor atmosphere of triethylene glycol and triethanolamine in the condensing chamber 2.

Next, the mixed vapor of triethylene glycol and triethanolamine in the condensing chamber 2 was adiabatically expanded, and the introduced modified particles (55) were exposed thereto for 2 minutes. Consequently, triethylene glycol and triethanolamine condensed on the surface of the modified particles (55).

Next, in the particle modifying device 1 shown in FIG. 4, isophthaloyl chloride, as the monomer B, was supplied to the condensing chamber 2. The interior of the condensing chamber 2 was pressurized through the pressurizing/depressurizing opening 6, and heated to 473 K by the heating device 7, producing a vapor of isophthaloyl chloride. Then the modified particles (55) with triethylene glycol and triethanolamine condensed thereon were introduced, along with the nitrogen gas, through the particle intake 4 into the vapor atmosphere of isophthaloyl chloride in the condensing chamber 2.

Next, the isophthaloyl chloride vapor in the condensing chamber 2 was adiabatically expanded, and the introduced modified particles (55) were exposed thereto for 10 minutes. Consequently, a polymerization reaction, using as a catalyst triethanolamine condensed on the surface of the modified particles (55), took place on the surface of the modified particles (55) between triethylene glycol and isophthaloyl chloride, forming a film of triethylene glycol-isophthaloyl chloride co-polymer.

Formation of the foregoing co-polymer film yielded modified particles (59) according to the present embodiment. In other words, the modified particles (59) were obtained by the same method as in Example 54. When measured by the optical detecting device 3, the modified particles (59) were found to be substantially uniform in quality and size, with a primary diameter of 6 µm.

EXAMPLE 60

First, as the monomer B, sebacoyl chloride was placed in the condensing chamber 26 of the particle modifying device 21 shown in FIG. 2, and, by heating to 443 K at atmospheric pressure using the heating device 7, a vapor of sebacoyl chloride was produced.

The base particles used were a mixture of C.I. Acid Red 8 (Tokyo Kasei Kogyo Co., Ltd. product), water dissolving the C.I. Acid Red 8, ethylene glycol as the monomer A, and triethylamine as a catalyst. These base particles had an average geometric diameter of 4 µm.

The base particles, along with helium gas, were cooled and introduced through the particle intake 4 into the vapor atmosphere of sebacoyl chloride in the mixing section 22. Next, in the mixing section 22, the vapor of sebacoyl chloride was cooled, and the introduced base particles were exposed thereto for 2 minutes. Consequently, a polymerization reaction, using as a catalyst triethylamine contained in the base particles, took place on the surface of the base particles between sebacoyl chloride and ethylene glycol, forming a film of ethylene glycol-sebacoyl chloride co-polymer.

Formation of the foregoing co-polymer film yielded modified particles (60) according to the present embodiment. When measured by the optical detecting device 3, the modified particles (60) were found to be substantially uniform in quality and size, with a primary diameter of 7 µm.

EXAMPLE 61

First, ethylene glycol, as the monomer A, was mixed with triethylamine as a catalyst, with a volume ratio of 50 to 1. The mixture obtained thereby was placed in the condensing chamber 26 of the first-stage particle modifying device 21A shown in FIG. 5, and, by heating to 423 K at atmospheric pressure using the heating device 7, a mixed vapor of ethylene glycol and triethylamine was produced.

The base particles used were a mixture of carbon black and polystyrene resin. These base particles had an average geometric diameter of 1 µm.

The base particles, along with argon gas, were cooled and introduced through the particle intake 4 into the mixed vapor atmosphere of ethylene glycol and triethylamine in the mixing section 22. Next, in the mixing section 22, the mixed vapor of ethylene glycol and triethylamine was cooled, and the introduced base particles were exposed thereto for 2 minutes. Consequently, ethylene glycol and triethylamine condensed on the surface of the base particles.

Next, in the second-stage particle modifying device 21B shown in FIG. 5, adipoyl chloride, as the monomer B, was placed in the condensing chamber 26, and, by heating to 393 K at atmospheric pressure using the heating device 7, a vapor of adipoyl chloride was produced.

Then the foregoing base particles with ethylene glycol and triethylamine condensed thereon, along with the argon gas, were cooled and introduced through the particle introducing pipe 24 into the vapor atmosphere of adipoyl chloride in the condensing chamber 26.

Next, in the mixing section 22, the adipoyl chloride vapor was cooled, and the introduced base particles were exposed thereto for 3 minutes. Consequently, a polymerization reaction, using as a catalyst triethylamine condensed on the surface of the particles, took place on the surface of the base particles between ethylene glycol and adipoyl chloride, forming a film of ethylene glycol-adipoyl chloride co-polymer.

Formation of the foregoing co-polymer film yielded modified particles (61) according to the present embodiment. When measured by the optical detecting device 3, the modified particles (61) were found to be substantially uniform in quality and size, with a primary diameter of 3 µm.

EXAMPLE 62

First, in the first-stage particle modifying device 21A shown in FIG. 5, glycerol, as the monomer A, was placed in the condensing chamber 26, and, by heating to 523 K at atmospheric pressure using the heating device 7, a vapor of glycerol was produced.

The base particles used were a mixture of C.I. Acid Blue 92 (Tokyo Kasei Kogyo Co., Ltd. product; a dye), water to dissolve the dye, and sodium hydroxide as a catalyst. These base particles had an average geometric diameter of 1 µm.

The base particles, along with argon gas, were cooled and introduced through the particle intake 4 into the vapor atmosphere of glycerol in the mixing section 22. Next, in the mixing section 22, the vapor of glycerol was cooled, and the introduced base particles were exposed thereto for 2 minutes. Consequently, glycerol condensed on the surface of the base particles.

Next, in the second-stage particle modifying device 21B shown in FIG. 5, isophthaloyl chloride, as the monomer B, was placed the condensing chamber 26, and, by heating to 423 K at atmospheric pressure using the heating device 7, a vapor of isophthaloyl chloride was produced.

Then the foregoing base particles with glycerol condensed thereon, along with the argon gas, were cooled and introduced through the particle introducing pipe 24 into the vapor atmosphere of isophthaloyl chloride in the mixing section 22.

Next, in the mixing section 22, the vapor atmosphere of isophthaloyl chloride was cooled, and the introduced base particles were exposed thereto for 3 minutes. Consequently, a polymerization reaction, using as a catalyst sodium hydroxide contained in the base particles, took place on the surface of the base particles between glycerol and isophthaloyl chloride, forming a film of glycerol-isophthaloyl chloride co-polymer.

Formation of the foregoing co-polymer film yielded modified particles (62) according to the present embodiment. In other words, the particles (62) were obtained by means of the same method as in Example 61. When measured by the optical detecting device 3, the modified particles (62) were found to be substantially uniform in quality and size, with a primary diameter of 3 μm.

EXAMPLE 63

First, particles of 1,4-butanedithiol, as the monomer A with an average geometric diameter of 1 μm, which could also be used as the base particles, were mixed with triethylamine as a catalyst, with a weight ratio of 1 to 1.

Next, as the monomer B, terephthaloyl chloride was supplied to the condensing chamber 2 of the particle modifying device 1 shown in FIG. 1. The interior of the condensing chamber 2 was pressurized through the pressurizing/depressurizing opening 6, and heated to 483 K by the heating device 7, producing a vapor of terephthaloyl chloride.

Then the base particles were introduced, along with helium gas, through the particle intake 4 into the vapor atmosphere of terephthaloyl chloride in the condensing chamber 2.

Next, the terephthaloyl chloride vapor in the condensing chamber 2 was adiabatically expanded, and the introduced base particles were exposed thereto for 3 minutes. Consequently, terephthaloyl chloride condensed on the surface of the base particles. A polymerization reaction, using as a catalyst triethylamine, took place between terephthaloyl chloride condensed on the surface of the base particles and 1,4-butanedithiol contained therein, forming a film of 1,4-butanedithiol-terephthaloyl chloride co-polymer on the surface of the base particles.

Formation of the foregoing co-polymer film yielded modified particles (63) according to the present embodiment. In other words, the modified particles (63) were obtained by the same method as in Example 55. When measured by the optical detecting device 3, the modified particles (63) were found to be substantially uniform in quality and size, with a primary diameter of 2 μm.

EXAMPLE 64

First, 2-mercaptoethanol, as the monomer A, was mixed with triethylamine as a catalyst, with a volume ratio of 50 to 1. The mixture obtained thereby was placed in the condensing chamber 26 of the first-stage particle modifying device 21A shown in FIG. 5, and, by heating to 373 K at atmospheric pressure using the heating device 7, a mixed vapor of 2-mercaptoethanol and triethylamine was produced.

The base particles used were particles of carbon black with an average geometric diameter of 1 μm.

The base particles, along with argon gas, were cooled and introduced through the particle intake 4 into the mixed vapor atmosphere of 2-mercaptoethanol and triethylamine in the mixing section 22. Next, in the mixing section 22, the mixed vapor of 2-mercaptoethanol and triethylamine was cooled, and the introduced base particles were exposed thereto for 2 minutes. Consequently, 2-mercaptoethanol and triethylamine condensed on the surface of the base particles.

Next, in the second-stage particle modifying device 21B shown in FIG. 5, terephthaloyl chloride, as the monomer B, was placed in the condensing chamber 26, and, by heating to 483 K at atmospheric pressure using the heating device 7, a vapor of terephthaloyl chloride was produced.

Then the foregoing base particles with 2-mercaptoethanol and triethylamine condensed thereon, along with the argon gas, were cooled and introduced through the particle introducing pipe 24 into the vapor atmosphere of terephthaloyl chloride in the mixing section 22.

Next, in the mixing section 22, the vapor atmosphere of terephthaloyl chloride was cooled, and the introduced base particles were exposed thereto for 2 minutes. Consequently, a polymerization reaction, using as a catalyst triethylamine contained in the base particles, took place on the surface of the base particles between 2-mercaptoethanol and terephthaloyl chloride, forming a film of 2-mercaptoethanol-terephthaloyl chloride co-polymer.

Formation of the foregoing co-polymer film yielded modified particles (64) according to the present embodiment. In other words, the base particles (64) were obtained by the same method as in Example 61. When measured by the optical detecting device 3, the modified particles (64) were found to be substantially uniform in quality and size, with a primary diameter of 4 μm.

EXAMPLE 65

First, in the particle modifying device 1A shown in FIG. 4, 1,6-diisocyanate hexane, as the monomer A, was supplied to the condensing chamber 2. The interior of the condensing chamber 2 was pressurized through the pressurizing/depressurizing opening 6, and heated to 483 K by the heating device 7, producing a vapor of 1,6-diisocyanate hexane.

Then, as the base particles, titanium oxide particles having a primary diameter of 0.5 μm were introduced, along with nitrogen gas, through the particle intake 4 into the vapor atmosphere of 1,6-diisocyanate hexane in the condensing chamber 2.

Next, the 1,6-diisocyanate hexane vapor in the condensing chamber 2 was adiabatically expanded, and the introduced base particles were exposed thereto for 3 minutes. Consequently, 1,6-diisocyanate hexane condensed on the surface of the base particles.

Next, in the particle modifying device 1 shown in FIG. 4, 1,6-hexanediol, as the monomer B, was supplied to the condensing chamber 2. The interior of the condensing chamber 2 was pressurized through the pressurizing/depressurizing opening 6, and heated to 463 K by the heating device 7, producing a vapor of 1,6-hexanediol. Then the foregoing base particles with 1,6-diisocyanate hexane condensed thereon were introduced, along with the nitrogen gas, through the particle intake 4 into the vapor atmosphere of 1,6-hexanediol in the condensing chamber 2.

Next, the 1,6-hexanediol vapor in the condensing chamber 2 was adiabatically expanded, and the introduced base particles were exposed thereto for 20 minutes. Consequently, a polymerization reaction between 1,6-diisocyanate hexane and 1,6-hexanediol took place on the surface of the base particles, forming a film of a resin resulting from this polymerization reaction.

Formation of the foregoing resin film yielded modified particles (65) according to the present embodiment. When measured by the optical detecting device 3, the modified particles (65) were found to be substantially uniform in quality and size, with a primary diameter of 2.5 µm.

EXAMPLE 66

Using the particle modifying device 1 shown in FIG. 1, 1,3-phenylenediisocyanate, as the monomer B, was pressurized and heated to 533 K, producing a vapor thereof. Then 1,4-benzenedithiol, as the monomer A, was mixed with triethylamine, forming, as the base particles, mixed particles with an average geometric diameter of Then the mixed particles were introduced, along with argon gas, into the vapor atmosphere of 1,3-phenylenediisocyanate in the condensing chamber 2 of the particle modifying device 1. Next, the foregoing vapor was adiabatically expanded, and the introduced mixed particles were exposed thereto for 15 minutes, condensing 1,3-phenylenediisocyanate on the surface of the mixed particles. Consequently, a polymerization reaction took place between 1,3-phenylenediisocyanate and 1,4-benzenedithiol, forming a film of a resin resulting from this polymerization reaction.

Formation of the foregoing resin film yielded modified particles (66) according to the present embodiment. When measured by the optical detecting device 3, the modified particles (66) were found to be substantially uniform in quality and size, with a primary diameter of 2 µm.

EXAMPLE 67

Using the device shown in FIG. 4, modified particles (67) were prepared by the same operations as in Example 65. First, in the condensing chamber 2 of the particle modifying device 1A, diethylene glycol, as the monomer B, was pressurized and heated to 443 K, producing a vapor thereof. Then 1,4-phenylenediisocyanate, as the monomer A, was mixed with C.I. Pigment Blue (Ciba-Geigy Japan Limited product; a phthalocyanine pigment), forming, as the base particles, mixed particles with an average geometric diameter of 1 µm.

Then, in the condensing chamber 2 of the particle modifying device 1, triethylamine, as a catalyst, was pressurized and heated to 353 K, producing a vapor thereof.

Next, the mixed particles were introduced, along with nitrogen gas, through the particle intake 4 into the vapor atmosphere of diethylene glycol in the condensing chamber 2 of the particle modifying device 1A. Then the foregoing vapor in the condensing chamber 2 was adiabatically expanded, condensing diethylene glycol on the surface of the mixed particles.

Next, the mixed particles with diethylene glycol condensed thereon were introduced into the vapor of triethylamine in the condensing chamber 2 of the particle modifying device 1, after which the foregoing vapor was adiabatically expanded, and the mixed particles were exposed thereto for 20 minutes. Consequently, a polymerization reaction between 1,4-phenylenediisocyanate and diethylene glycol took place on the surface of the particles of C.I. Pigment Blue 199, forming a film of a resin resulting from this polymerization reaction.

Formation of the foregoing resin film yielded the modified particles (67) according to the present embodiment. When measured by the optical detecting device 3, the modified particles (67) were found to be substantially uniform in quality and size, with a primary diameter of 2 µm.

EXAMPLE 68

Using the device shown in FIG. 1, modified particles (68) were prepared by the same operations as in Example 66.

First, isophoronediisocyanate, as the monomer B, was pressurized and heated to 483 K, producing a vapor thereof. Particles of a solution of 4-mercaptophenol, as the monomer A, dissolved in ethanol, with an average geometric diameter of 1 µm, were introduced, as the base particles, along with argon gas, into the vapor atmosphere of isophoronediisocyanate.

Then the foregoing vapor was adiabatically expanded, and the introduced particles were exposed thereto for 15 minutes, condensing isophoronediisocyanate on the surface of the particles of the ethanol solution of 4-mercaptophenol. Consequently, a polymerization reaction took place between 4-mercaptophenol and isophoronediisocyanate, forming a film of a resin resulting from this polymerization reaction.

Formation of the foregoing resin film yielded the modified particles (68) according to the present embodiment. When measured by the optical detecting device 3, the modified particles (68) were found to be substantially uniform in quality and size, with a primary diameter of 3 µm.

EXAMPLE 69

Using the device shown in FIG. 4, modified particles (69) were prepared by the same operations as in Example 65. First, in the condensing chamber 2 of the particle modifying device 1A, 1,6-diisocyanate hexane, as the monomer A, was pressurized and heated to 483 K, producing a vapor thereof. Then, using as the base particles the modified particles (65) obtained in Example 65, the modified particles (65) were introduced, along with nitrogen gas, into the vapor atmosphere of 1,6-diisocyanate hexane. Then the foregoing vapor was adiabatically expanded, and the introduced modified particles (65) were exposed thereto for 2 minutes. Consequently, 1,6-diisocyanate hexane condensed on the surface of the modified particles (65).

Then, in the condensing chamber 2 of the particle modifying device 1,1,6-hexanediol, as the monomer B, was pressurized and heated to 463 K, producing a vapor thereof.

Next, the modified particles (65) with 1,6-diisocyanate hexane condensed thereon were introduced into the vapor atmosphere of 1,6-hexanediol. Then the vapor of 1,6-hexanediol was adiabatically expanded, and the modified particles (65) were exposed thereto for 20 minutes. Consequently, a polymerization reaction between 1,6-diisocyanate hexane and 1,6-hexanediol took place on the surface of the modified particles (65) on which a resin film was previously formed, forming a further film of a different resin.

Formation of the foregoing resin film yielded the modified particles (69) according to the present embodiment. When measured by the optical detecting device 3, the modified particles (69) were found to be substantially uniform in quality and size, with a primary diameter of 4 µm.

EXAMPLE 70

Using the device shown in FIG. 4, modified particles (70) were prepared by the same operations as in Example 65. First, in the condensing chamber 2 of the particle modifying device 1A, 1,3-phenylenediisocyanate, as the monomer A, was pressurized and heated to 533 K, producing a vapor thereof. Then, using as the base particles the modified particles (67) obtained in Example 67, the modified particles (67) were introduced, along with nitrogen gas, into the vapor atmosphere of 1,3-phenylenediisocyanate. Then the foregoing vapor was adiabatically expanded, and the introduced modified particles (67) were exposed thereto for 3 minutes.

Consequently, 1,3-phenylenediisocyanate condensed on the surface of the modified particles (67).

Then, in the condensing chamber 2 of the particle modifying device 1,1,4-benzenedithiol, as the monomer B, was pressurized and heated to 463 K, producing a vapor thereof.

Next, the modified particles (67) with 1,3-phenylenediisocyanate condensed thereon were introduced into the vapor atmosphere of 1,4-benzenedithiol. Then the vapor of 1,4-benzenedithiol was adiabatically expanded, and the modified particles (67) were exposed thereto for 30 minutes. Consequently, a polymerization reaction between 1,3-phenylenediisocyanate and 1,4-benzenedithiol took place on the surface of the modified particles (67) on which a resin film was previously formed, forming a further film of a different resin.

Formation of the foregoing resin film yielded the modified particles (70) according to the present embodiment. When measured by the optical detecting device 3, the modified particles (70) were found to be substantially uniform in quality and size, with a primary diameter of 3.5 μm.

EXAMPLE 71

Using the particle modifying device 21 shown in FIG. 2, 1,3-phenylenediisocyanate, as the monomer A, was placed in the reservoir section 26c of the condensing chamber 26, and, by heating to 533 K at atmospheric pressure using the heating device 7, a vapor of 1,3-phenylenediisocyanate was produced.

The base particles used were a mixture of C.I. Acid Red 8 (Tokyo Kasei Kogyo Co., Ltd. product; a dye), triethylenediamine as a catalyst, di(2-mercaptoethyl)ether as the monomer B, and water dissolving the foregoing. These base particles, along with helium gas, were cooled and introduced into the vapor atmosphere of 1,3-phenylenediisocyanate.

Next, in the processing space 22b, the vapor of 1,3-phenylenediisocyanate was cooled, and the introduced base particles were exposed to the super-saturated vapor obtained thereby, thus condensing 1,3-phenylenediisocyanate on the surface of the base particles. Consequently, a polymerization reaction took place on the surface of the base particles between 1,3-phenylenediisocyanate and di(2-mercaptoethyl)ether, forming a film of a resin, so as to cover the surface of the base particles.

Formation of the foregoing resin film yielded modified particles (71) according to the present embodiment. When measured by the optical detecting device 3, the modified particles (71) were found to be substantially uniform in size, with a primary diameter of 3 μm.

EXAMPLE 72

Using the device shown in FIG. 5, 1,4-diisocyanate butane, as the monomer A, was placed in the reservoir section 26c of the first-stage particle modifying device 21A, and, by heating to 463 K using the heating device 7, the space 26b and the processing space 22b of the first-stage particle modifying device 21A were filled with a vapor of 1,4-diisocyanate butane.

The base particles used were a mixture of carbon black and polystyrene resin (average geometric diameter: 1 μm). These base particles, along with argon gas, were introduced through the particle introducing pipe 24 into the vapor atmosphere of 1,4-diisocyanate butane in the processing space 22b of the first-stage particle modifying device 21A. Next, in the processing space 22b, the foregoing vapor was cooled, yielding a super-saturated vapor, and condensing 1,4-diisocyanate butane on the surface of the base particles.

Next, ethylene glycol, as the monomer B, was mixed with triethylamine as a catalyst, with a volume ratio of 95 to 5, and placed in the reservoir section 26c of the second-stage particle modifying device 21B, and heated to 403 K using the heating device 7, producing a vapor thereof.

Then the foregoing base particles with 1,4-diisocyanate butane condensed thereon, along with the argon gas, were cooled and introduced through the particle intake 4 into the vapor of ethylene glycol and triethylamine in the second-stage particle modifying device 21B.

Next, in the mixing section 22, the foregoing vapor was cooled, yielding a super-saturated vapor, and condensing ethylene glycol and triethylamine on the surface of the base particles with 1,4-diisocyanate butane previously condensed thereon. Consequently, a polymerization reaction took place on the surface of the base particles between 1,4-diisocyanate butane and ethylene glycol, forming a film of a resin.

Formation of the foregoing resin film yielded modified particles (72) according to the present embodiment. When measured by the optical detecting device 3, the modified particles (72) were found to be substantially uniform in size, with a primary diameter of 4 μm.

EXAMPLE 73

Using the device shown in FIG. 5, modified particles (73) were prepared by the same operations as in Example 72. First, in the first-stage particle modifying device 21A, isophoronediisocyanate, as the monomer B, was placed in the reservoir section 26c, and heated to 493 K, yielding a vapor thereof.

The base particles used were liquid particles made of a mixture of C.I. Acid Blue 92 (a dye), sodium hydroxide, bisphenol A as the monomer A, and water dissolving the foregoing. These liquid particles, along with helium gas, were cooled and introduced into the vapor atmosphere of isophoronediisocyanate. Next, the foregoing vapor was cooled, yielding a super-saturated vapor, and condensing isophoronediisocyanate on the surface of the liquid particles.

Next, in the second-stage particle modifying device 21B, 1,4-diisocyanate butane, as the monomer B, was placed in the reservoir section 26c and heated to 463 K, producing a vapor thereof. The liquid particles with isophoronediisocyanate condensed thereon, along with the argon gas, were introduced into the vapor of 1,4-diisocyanate butane.

Next, the foregoing vapor was cooled, yielding a super-saturated vapor, and, by exposing the liquid particles to the super-saturated vapor, 1,4-diisocyanate butane was further condensed on the surface of the liquid particles. Consequently, a polymerization reaction took place on the surface of the liquid particles among 1,4-diisocyanate butane, isophoronediisocyanate, and bisphenol A, forming a film of a resin so as to cover the surface of the liquid particles.

Formation of the foregoing resin film yielded the modified particles (73) according to the present embodiment. When measured by the optical detecting device 3, the modified particles (73) were found to be substantially uniform in size, with a primary diameter of 3.5 μm.

EXAMPLE 74

Using the device shown in FIG. 4, modified particles (74) were prepared by the same operations as in Example 65. First, in the particle modifying device 1A, 2-mercaptoethanol, as the monomer B, was pressurized and heated to 403 K, producing a vapor thereof. In the particle modifying device 1, triethylamine, as a catalyst, was pressurized and heated to 353 K, producing a vapor thereof. Meanwhile, solid particles of 1,4-phenylenediisothiocyanate, as the monomer A, were prepared as the base particles, with an average geometric diameter of 1.5 μm.

Next, the solid particles were introduced, along with nitrogen gas, into the vapor of 2-mercaptoethanol. Then the foregoing vapor was adiabatically expanded, condensing 2-mercaptoethanol on the surface of the solid particles.

Next, the solid particles with 2-mercaptoethanol condensed thereon were introduced into the vapor of triethylamine in the particle modifying device 1. Then the foregoing vapor was adiabatically expanded, and the solid particles were exposed thereto for 20 minutes. Consequently, a polymerization reaction between 1,4-phenylenediisothiocyanate and 2-mercaptoethanol took place on the surface of the solid particles, forming a film of a resin so as to cover the surface of the solid particles.

Formation of the foregoing resin film yielded the modified particles (74) according to the present embodiment. When measured by the optical detecting device 3, the modified particles (74) were found to be substantially uniform in quality and size, with a primary diameter of 3 μm.

EXAMPLE 75

Using the device shown in FIG. 4, modified particles (75) were prepared by the same operations as in Example 65. First, in the particle modifying device 1A, 1,4-benzenedithiol, as the monomer B, was pressurized and heated to 533 K, producing a vapor thereof. In the particle modifying device 1, triethylamine, as a catalyst, was pressurized and heated to 353 K, producing a vapor thereof. Meanwhile, solid particles of silicontetraisothiocyanate, as the monomer A, were prepared as the base particles, with an average geometric diameter of 1 μm.

Next, the solid particles were introduced, along with nitrogen gas, into the vapor of 1,4-benzenedithiol. Then the foregoing vapor was adiabatically expanded, condensing 1,4-benzenedithiol on the surface of the solid particles.

Next, the solid particles with 1,4-benzenedithiol condensed thereon were introduced into the vapor of triethylamine in the particle modifying device 1. Then the foregoing vapor was adiabatically expanded, and the solid particles were exposed thereto for 20 minutes. Consequently, a polymerization reaction between silicontetraisothiocyanate and 1,4-benzenedithiol took place on the surface of the solid particles, forming a film of a resin so as to cover the surface of the solid particles.

Formation of the foregoing resin film yielded the modified particles (75) according to the present embodiment. When measured by the optical detecting device 3, the modified particles (75) were found to be substantially uniform in and size, with a primary diameter of 2 μm.

As discussed above, in the surface modification method according to the present invention, surface modification could be suitably performed by exposing base particles including a monomer A to a super-saturated vapor of a monomer B, condensing the monomer B on the surface of the base particles, and causing a polymerization reaction between the monomers A and B on the surface of the base particles, thus forming a polymer film. Further, the modified particles according to the present invention, obtained by means of the foregoing method, were substantially uniform in quality and size.

Incidentally, examples of saturated aliphatic hydrocarbons, unsaturated aliphatic hydrocarbons, saturated aromatic hydrocarbons, unsaturated aromatic hydrocarbons, saturated heterocyclic compounds, and unsaturated heterocyclic compounds which may be used for the organic particles mentioned above are as set forth below. Further, the saturated heterocyclic compounds and unsaturated heterocyclic compounds may be polycyclic compounds.

Specific examples of saturated aliphatic hydrocarbons include n-eicosane, 1-eicosanol, acetoamide, acetylacetoamide, acetoxyacetic acid, N-acetylethylenediamine, 1,4-cyclooctanediol, 1,10-decanedicarboxylic acid, 1,2-decanediol, 1,2-hexadecanediol, decanoic acid, butanedioic acid, glyoxylic acid monohydrate, tetrahydrodicyclopentadiene, stearic acid, methyl tricosanate, 1,3-dichloroacetone, isopropyl myristate, [(1S)-endo-]-(−)-borneol, and diethyl-bis (hydroxymethyl) malonate. Specific examples of unsaturated aliphatic hydrocarbons include olefins such as 2-norbornene.

Specific examples of saturated aromatic hydrocarbons include 2-acetonaphthone, 4-acetylbenzonitryl, 2-aminobiphenyl, 2-amino-2',5-dichlorobenzophenon, decafluorobenzophenon, decanophenon, naphthalene, 2,4-dibromoaniline, 1,4-naphthoquinone, 1,4-diaminoanthraquinone, 1-naphthol, benzoic acid, and fluorene. Specific examples of unsaturated aromatic hydrocarbons include acenaphthylene.

Specific examples of saturated heterocyclic compounds include heterocyclic compounds having aromaticity, such as 2-acetyl-5-bromothiophen, 3-acetyl-2,4-dimethylpyrrole, 3-amino-2-chloropyridine, 3-hydroxy-2-nitropyridine, furfuryl sulfide, 2-furoic acid, 1,2,4-triazole, 2-thiopheneacetic acid, and 1-phenylpyrrole; and polycyclic compounds such as 3-acetylcumaline, 2-aminobenzothiazole, dibenzofuran, 1,7-phenanthroline, 7,8-benzoquinoline, benzimidazole, benzofuran-2-yl•methylketone, 2-chloroquinoline, quinoxaline, and phenothiazine.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A method of manufacturing modified particles comprising the steps of:
   (a) exposing particles which include a monomer A to a super-saturated vapor of a monomer B, which differs from the monomer A and is polymerizable therewith; and
   (b) condensing the monomer B on the surface of the particles due to the super-saturated vapor, and causing a polymerization reaction between the monomers A and B on the surface of the particles.

2. A method of manufacturing modified particles comprising the steps of:
   (a) exposing core particles to a super-saturated atmosphere of a monomer A, thus causing the monomer A to condense on the surface of the core particles;
   (b) exposing the core particles with the monomer A condensed on the surface thereof to a super-saturated atmosphere of a monomer B, which differs from the monomer A and is polymerizable therewith; and
   (c) condensing the monomer B on the surface of the core particles due to the super-saturated atmosphere, and causing a polymerization reaction between the monomers A and B on the surface of the core particles.

3. The method of manufacturing modified particles set forth in claim 1, further comprising the steps of:
   (c) exposing particles including a polymer produced by polymerization of the monomers A and B to a super-saturated vapor of a monomer C, thus causing the monomer C to condense on the surface of the particles including the polymer; and
   (d) exposing the particles including the polymer, with the monomer C condensed on the surface thereof, to a super-saturated vapor of a monomer D, which differs from the monomer C and is polymerizable therewith, thus condensing the monomer D on the surface of the particles including the polymer, and causing a polymerization reaction between the monomers C and D on the surface of the particles including the polymer.

4. The method of manufacturing modified particles set forth in claim 1, further comprising, after said step (b), the step of:
   (c) eliminating impurities contained in the particles obtained in said step (b).

5. The method of manufacturing modified particles set forth in claim 4, wherein:
   the impurities are eliminated by dissolution in water.

6. The method of manufacturing modified particles set forth in claim 1, wherein:
   of the monomer A and the monomer B, one includes a compound having at least two amino or imino groups, and the other includes a compound having at least two haloformyl groups.

7. The method of manufacturing modified particles set forth in claim 1, wherein:
   of the monomer A and the monomer B, one includes a compound having at least two amino or imino groups, and the other includes a compound having at least two carboxylic anhydride groups.

8. The method of manufacturing modified particles set forth in claim 1, wherein:
   of the monomer A and the monomer B, one includes a compound having at least two amino or imino groups, and the other includes a compound having at least two aldehyde groups.

9. The method of manufacturing modified particles set forth in claim 1, wherein:
   either the monomer A or the monomer B includes a compound having two or more sulfonyl halide groups.

10. The method of manufacturing modified particles set forth in claim 1, wherein:
    of the monomer A and the monomer B, one includes a compound having two or more sulfonyl halide groups, and the other includes a compound having two or more hydroxyl groups.

11. The method of manufacturing modified particles set forth in claim 1, wherein:
    of the monomer A and the monomer B, one includes a compound having two or more sulfonyl halide groups, and the other includes a compound having two or more mercapto groups.

12. The method of manufacturing modified particles set forth in claim 1, wherein:
    of the monomer A and the monomer B, one includes a compound having two or more sulfonyl halide groups, and the other includes a compound having two or more primary and/or secondary amino groups.

13. The method of manufacturing modified particles set forth in claim 1, wherein:
    of the monomer A and the monomer B, one includes a compound having two or more sulfonyl halide groups, and the other includes a compound having at least one each of two or more kinds of substitution group, chosen from among a hydroxyl group, a mercapto group, a primary amino group, and a secondary amino group.

14. The method of manufacturing modified particles set forth in claim 1, wherein:
    of the monomers A and B, at least the monomer B is liquid at room temperature.

15. The method of manufacturing modified particles set forth in claim 1, wherein:
    of the monomer A and the monomer B, one is a compound Z having as functional groups two or more halogenated acyl groups, and the other is a compound Y having as functional groups two or more hydroxyl groups, two or more mercapto groups, or at least one hydroxyl group and one mercapto group.

16. The method of manufacturing modified particles set forth in claim 1, wherein:
    of the monomer A and the monomer B, one is a compound X having as functional groups two or more isocyanate groups, and the other is a compound Y having as functional groups two or more hydroxyl groups, two or more mercapto groups, two or more primary and/or secondary amino groups, or at least two functional groups selected from among a hydroxyl group, a mercapto group, a primary amino group, and a secondary amino group.

17. The method of manufacturing modified particles set forth in claim 16, wherein:
    the particles are made of the monomer A alone.

18. The method of manufacturing modified particles set forth in claim 2, wherein:
    of the monomer A and the monomer B, one is a compound X having as functional groups two or more isocyanate groups, and the other is a compound Y having as functional groups two or more hydroxyl groups, two or more mercapto groups, two or more primary and/or secondary amino groups, or at least two functional groups selected from among a hydroxyl group, a mercapto group, a primary amino group, and a secondary amino group.

19. The method of manufacturing modified particles set forth in claim 1, wherein:
    of the monomer A and the monomer B, one is a compound X having as functional groups two or more isothiocyanate groups, and the other is a compound Y having as functional groups two or more hydroxyl groups, two or more mercapto groups, two or more primary and/or secondary amino groups, or at least two functional groups selected from among a hydroxyl group, a mercapto group, a primary amino group, and a secondary amino group.

20. The method of manufacturing modified particles set forth in claim 19, wherein:
    the particles are made of the monomer A alone.

21. The method of manufacturing modified particles set forth in claim 2, wherein:
    of the monomer A and the monomer B, one is a compound X having as functional groups two or more isothiocyanate groups, and the other is a compound Y having as functional groups two or more hydroxyl groups, two or more mercapto groups, two or more primary and/or secondary amino groups, or at least two functional groups selected from among a hydroxyl group, a mercapto group, a primary amino group, and a secondary amino group.

22. The method of manufacturing modified particles set forth in claim 1, wherein:

said step (b) for forming a resin film by polymerization of the monomers A and B is repeated a plurality of times.

23. The method of manufacturing modified particles set forth in claim 1, wherein:

said step (b) for forming a resin film by polymerization of the monomers A and B is repeated a plurality of times, using different respective monomers for at least two of the plurality of repetitions.

24. The method of manufacturing modified particles set forth in claim 1, wherein:

the particles are made of a mixture of two or more substances.

25. The method of manufacturing modified particles set forth in claim 1, wherein:

the particles are liquid.

26. The method of manufacturing modified particles set forth in claim 1, wherein:

the monomers A and B mutually co-polymerize, forming a cross-linked structure.

* * * * *